(12) United States Patent
Poltorak

(10) Patent No.: US 12,465,292 B2
(45) Date of Patent: Nov. 11, 2025

(54) MULTIPLE PARTIALLY REDUNDANT BIOMETRIC SENSING DEVICES

(71) Applicant: Poltorak Technologies LLC, Suffern, NY (US)

(72) Inventor: Alexander Poltorak, Monsey, NY (US)

(73) Assignee: Poltorak Technologies LLC, Pomona, NY (US)

( * ) Notice: Subject to any disclaimer, the term of this patent is extended or adjusted under 35 U.S.C. 154(b) by 699 days.

(21) Appl. No.: 17/532,922

(22) Filed: Nov. 22, 2021

(65) Prior Publication Data

US 2022/0160309 A1 May 26, 2022

Related U.S. Application Data

(60) Provisional application No. 63/116,164, filed on Nov. 20, 2020.

(51) Int. Cl.
*A61B 5/00* (2006.01)
*A61B 5/01* (2006.01)
(Continued)

(52) U.S. Cl.
CPC ............ *A61B 5/7246* (2013.01); *A61B 5/002* (2013.01); *A61B 5/0031* (2013.01); *A61B 5/01* (2013.01); *A61B 5/021* (2013.01); *A61B 5/14532* (2013.01); *A61B 5/14551* (2013.01); *A61B 5/1468* (2013.01); *A61B 5/318* (2021.01); *A61B 5/389* (2021.01); *A61B 5/681* (2013.01);
(Continued)

(58) Field of Classification Search
CPC ....... A61B 5/7246; A61B 5/0031; A61B 5/01; A61B 5/021; A61B 5/14532; A61B 5/14551; A61B 5/6817
See application file for complete search history.

(56) References Cited

U.S. PATENT DOCUMENTS

| | | | |
|---|---|---|---|
| 10,602,987 B2 * | 3/2020 | Khachaturian | G16H 10/60 |
| 2008/0188763 A1 * | 8/2008 | John | A61B 5/349 |
| | | | 600/516 |

(Continued)

FOREIGN PATENT DOCUMENTS

WO WO-2016110804 A1 * 7/2016 ............... A61B 3/16

*Primary Examiner* — Carl H Layno
*Assistant Examiner* — Maria Catherine Anthony
(74) *Attorney, Agent, or Firm* — Hoffberg & Associates; Steven M Hoffberg

(57) ABSTRACT

The present invention relates to a system and method for acquiring and analyzing physiological data from a user. The system includes a plurality of interconnected devices, which may communicate sensor data to a personal mobile electronic device. Each interconnected device includes at least one sensor to acquire physiological data. In addition, at least one sensor is operably connected to the body of the user. Further, the interconnected biometric devices may be implanted medical devices and/or wearable electronic devices. The personal mobile electronic device is wirelessly connected to each of the plurality of interconnected biometric devices. In addition, the personal mobile electronic device is configured to receive and analyze physiological data acquired by each of the plurality of interconnected devices and to compute the difference between the values of the same physiological parameter measured at a different location of the user's body.

19 Claims, 7 Drawing Sheets

(51) Int. Cl.
*A61B 5/021* (2006.01)
*A61B 5/145* (2006.01)
*A61B 5/1455* (2006.01)
*A61B 5/1468* (2006.01)
*A61B 5/318* (2021.01)
*A61B 5/389* (2021.01)

(52) U.S. Cl.
CPC .......... *A61B 5/6817* (2013.01); *A61B 5/6823* (2013.01); *A61B 5/6846* (2013.01); *A61B 5/6898* (2013.01); *A61B 5/7203* (2013.01); *A61B 5/7225* (2013.01); *A61B 5/7264* (2013.01)

(56) References Cited

U.S. PATENT DOCUMENTS

| | | | | |
|---|---|---|---|---|
| 2009/0012432 A1* | 1/2009 | Sharf | ................... | A61B 5/1116 600/588 |
| 2014/0378810 A1* | 12/2014 | Davis | ................... | G06F 16/248 600/407 |

* cited by examiner

MULTIPLE PARTIALLY REDUNDANT BIOMETRIC SENSING DEVICES

CROSS REFERENCE TO RELATED APPLICATIONS

The present application is a Non-provisional of, and claims benefit of priority under 35 U.S.C. § 119(e) from, U.S. Provisional Patent Application No. 63/116,164, filed Nov. 20, 2020, the entirety of which is expressly incorporated herein by reference.

FIELD OF THE INVENTION

The present invention relates to the field of physiological sensing, and more particularly, to systems and methods for measuring differences in parameter measurement from different parts of the body. More particularly, the present invention relates to the field of medical diagnostics and particularly in the field of wearable devices. The present invention specifically discloses a system for acquiring and analyzing biometric data using a plurality of wearable devices.

INCORPORATION BY REFERENCE

The present application incorporates by reference the entirety of each document identified herein. The nature of this incorporation is to demonstrate written description and enablement for the technologies disclosed therein, combinations of elements disclosed therein, possession of the invention by the present applicant, and the like. The applicant does not admit that the references cited herein are necessarily analogous art, nor do they define the relevant art.

BACKGROUND OF THE INVENTION

The sensing of physiological parameters is well known. However, the measurement of differences in nominally the same parameter is not well known. Examples of such measurements are stethoscopic examination, body imaging studies, and blood pressure differences in limbs.

With the advancements in technology in the last few decades, several suppliers are producing wearable devices for monitoring the health and activity of individuals using biometric sensors. For example, wearable devices include a bracelet, an anklet, a ring, a watch, glasses, and earpods. Nowadays, wearable devices are utilized by medical service providers to collect biometric information of individuals. Wearable devices may be placed on a wrist, a finger, an ankle, in an ear canal, or on another body surface. Wearable devices may also encompass implantable devices (though these are technically not "wearable") and record users' biometric information of the individuals. The biometric information includes any information about a physiological parameter (such as, by way of non-limiting examples, temperature, galvanic skin potential, pulse, blood pressure, blood oxygenation, muscle tone, EMG, EKG, EEG) and any measurable health-related information. Traditionally, doctors take the pulse on both wrists and measure blood pressure on both arms. There are studies that show that differences in blood pressure are correlated with mortality rate.

Spannella, Francesco, Federico Giulietti, Massimiliano Fedecostante, Maddalena Ricci, Paolo Balietti, Guido Cocci, Laura Landi et al. "Interarm blood pressure differences predict target organ damage in type 2 diabetes." The J. Clinical Hypertension 19, no. 5 (2017): 472-478;

Singer, Adam J., and Judd E. Hollander. "Blood pressure: assessment of interarm differences." Archives of internal medicine 156, no. 17 (1996): 2005-2008; Clark, C. E., J. L. Campbell, P. H. Evans, and A. Millward. "Prevalence and clinical implications of the inter-arm blood pressure difference: a systematic review." J. human hypertension 20, no. 12 (2006): 923-931;

Fotherby, Martin D., Barnabas Panayiotou, and John F. Potter. "Age-related differences in simultaneous interarm blood pressure measurements." Postgraduate med. J. 69, no. 809 (1993): 194-196;

Cassidy, P., and K. Jones. "A study of inter-arm blood pressure differences in primary care." J. human hypertension 15, no. 8 (2001): 519-522;

Lane, Deirdre, Michele Beevers, Nicola Barnes, James Bourne, Andrew John, Simon Malins, and D. Gareth Beevers. "Inter-arm differences in blood pressure: when are they clinically significant?." J. hypertension 20, no. 6 (2002): 1089-1095;

Orme, Susan, Susan G. Ralph, Andrew Birchall, Peter Lawson-Matthew, Katherine McLean, and Kevin S. Channer. "The normal range for inter-arm differences in blood pressure." Age and aging 28, no. 6 (1999): 537-542.

Clark, C. E., J. L. Campbell, and R. J. Powell. "The interarm blood pressure difference as predictor of cardiovascular events in patients with hypertension in primary care: cohort study." J. human hypertension 21, no. 8 (2007): 633-638.

Verberk, Willem J., Alfons G H Kessels, and Theo Thien. "Blood pressure measurement method and inter-arm differences: a meta-analysis." American J. hypertension 24, no. 11 (2011): 1201-1208.

Clark, Christopher E., John L. Campbell, Roy J. Powell, and John F. Thompson. "The inter-arm blood pressure difference and peripheral vascular disease: cross-sectional study." Family practice 24, no. 5 (2007): 420-426.

Clark, Christopher E., Colin J. Greaves, Philip H. Evans, Andy Dickens, and John L. Campbell. "Inter-arm blood pressure difference in type 2 diabetes: a barrier to effective management?." British J. General Practice 59, no. 563 (2009): 428-432.

Kim, Jinkwon, Tae-Jin Song, Dongbeom Song, Hye Sun Lee, Chung Mo Nam, Hyo Suk Nam, Young Dae Kim, and Ji Hoe Heo. "Interarm blood pressure difference and mortality in patients with acute ischemic stroke." Neurology 80, no. 16 (2013): 1457-1464.

Clark, Christopher E., Rod S. Taylor, Isabella Butcher, Marlene C W Stewart, Jackie Price, F. Gerald R. Fowkes, Angela C. Shore, and John L. Campbell. "Inter-arm blood pressure difference and mortality: a cohort study in an asymptomatic primary care population at elevated cardiovascular risk." British J. General Practice 66, no. 646 (2016): e297-e308.

Spatial variations in skin temperature and other biological parameter variations are less well studied, In many cases, variations may have a clear etiology. For example, a dissecting aortic aneurism may physically block blood flow in the ascending aorta, leading to obstructed blood flow different in one arm vs. the other. In other cases, spatial and temporal variations are less well understood.

However, statistics providing a normal type, range, variability, and other statistical characteristics of spatial variation with respect to continuous monitoring are not available.

SUMMARY OF THE INVENTION

The present invention provides a plurality of sensors, each sensing at least one physiological parameter, such that the plurality of sensors sense a corresponding physiological parameter at different body locations. The sensors are preferably wearable, and as such, are adapted to measure physiological parameters over time or continuously. The sensors may form a network.

The present invention provides systems and methods for measuring spatial differences in physiological parameters from a body, analyzing those differences, and reporting results. For example, differences in temperature, blood oxygenation or carbon dioxide, pulse waveform, galvanic skin response, EMG, EEG, EKG waveform, accelerometers, etc., are monitored and reported when exceeding a predetermined threshold.

The technique generally involves real-time and continuous sensing or periodic sampling, employing personal area networks to transfer information between sensors and a control module. Security technologies to ensure data integrity and privacy may employ such technologies as distributed control technology, distributed consensus algorithms (where appropriate), energy harvesting, nanopower technologies, IoT technologies, neural networks of various architecture, and statistical analysis.

Preferably, the wearable sensors are part of an ad hoc dynamically auto-configuring network, tolerant to device failure or unavailability and to addition or loss of nodes. In particular, while one node may be preferred as a master or central processing node, the network preferably does not need a particular such central processor and, if provided, the network is tolerant to its loss.

The rationale for fault tolerance is that wearable devices may have low reliability due to loss of power, interference, fragility, or the like. Demanding high reliability from components and the network as a whole increases cost and weight, and may reduce utility. Rather, by tolerating limitations, low-cost disposable sensors are feasible.

The system is preferably opportunistic, in terms of exploiting information from arbitrary sources, in its monitoring and analysis.

The devices may employ an alternate communication protocol strategy. According to one strategy, each device communicates a tagged message indicating its sensor type(s), spatial location, timecode, error detection and correction code, and data analysis. In addition, network state information and the like may be communicated. According to a different strategy, the sensors stream sensor readings with the sparse transmission of administrative data. Nodes may provide store and forward functionality to permit indirect communication between nodes.

One or more nodes receives and processes data from other nodes. Other nodes may receive and archive data without contemporaneous processing. A processing node may transmit its results for redundant archiving by other nodes or communicate outside the sensor network. If a processing node fails or withdraws, another node may be recruited to assume the role.

Sometimes, the difference between the value of the same parameter (such as temperature, pulse, blood pressure, oxygen saturation ECG, pressure or temperature inside the ear canal, etc.) on different extremities is of more diagnostic value than each value separately. This is true even of professional medical-grade diagnostic equipment used in hospitals. Therefore, a single node cannot generate and process the data required for the differential analysis. A minimum of two nodes is required, with one or both (or a separate processing node) performing primary calculations. Sensor data and processed results are preferably redundantly stored.

According to one embodiment, the partially redundant sensing is measuring electroencephalographic signals, which may be derived from scalp sensors, temple sensors, intraaural sensors, eyeglass frame sensors, or the like. Each sensor may be a pair of electrodes, or a more complex multielectrode arrangement. There are normal bilateral correlations and differences in EEG signals, so the analysis must determine the deviation of the sensor readings from a normal or usual (chronic) state. See, en.wikipedia.org/wiki/Correlation. Further, the same electrodes often pick up emissions from cranial nerves and the innervated facial muscles. For example, in transient ischemic attacks, bilateral asymmetry, and characteristic focal patterns have been observed.

The use of electroencephalography (EEG) as a diagnostic tool is based largely on a concept of human EEG normality defined by descriptive criteria, of which the alpha rhythm is the principal electrical activity (Berger 1929). One of the features of this activity is its tendency to be reduced in amplitude or to be blocked by either internal or external stimuli to the brain (Berger 1930). This event-related desynchronization (ERD) of the EEG may be used as a highly sensitive parameter in detecting even slight functional disturbances of the cortical activity (Pfurtscheller and Aranibar 1977), provided that analytic methods of quantifying these blocking reactions are available.

Focal Slow Wave Activity (FSWA) was the commonest EEG abnormality found in the early EEG of patients with possible TIA, but did not distinguish between TIA and seizure patients. In patients with seizures, FSWA was more common than EA, and its presence in the late EEG was more likely in patients with epileptic seizures than with TIA.

Therefore, analysis of EEG signals, and especially with spatial differentiation, may provide an early and specific indication of ischemic neurological events.

Nagata, Ken, Kazuta Yunoki, and Masahiro Mizukami. "Topographic electroencephalographic study of transient ischemic attacks." Electroencephalography and clin. neurophysiology 58, no. 4 (1984): 291-301.

Koerner, E., E. Ott, P. Kaiserfeld, R. Wolf, H. Lechner, G. Pfurtscheller, and G. Lindinger. "EEG mapping in patients with transient ischemic attacks: a follow-up study." In Topographic Brain Mapping of EEG and Evoked Potentials, pp. 209-218. Springer, Berlin, Heidelberg, 1989.

Bentes, Carla, Patricia Canhão, Ana Rita Peralta, Pedro Viana, Ana Catarina Fonseca, Ruth Geraldes, Teresa Pinho e Melo, Teresa Paiva, and Jose Manuel Ferro. "Usefulness of EEG for the differential diagnosis of possible transient ischemic attack." Clinical neurophysiology practice 3 (2018): 11-19.

Woolsey, Robert M., And George W. Hambrook. "EEG and arteriographical findings in carotid artery transient ischemic attacks (TIAs)." Stroke 4, no. 1 (1973): 7-11.

Brainwaves, e.g., EEG signals, may be acquired in various ways. Traditional signal acquisition by neurologists and encephalography/EEG technicians involves pasted-on electrodes or caps with arrays of electrodes, e.g., 20-256 electrodes positioned on the scalp. However, in some cases, especially where high spatial resolution is not required, and dominant brainwave patterns are sought, simpler and less controlled EEG acquisition systems may be employed, including through commercially available device intended to interface with smartphones. See, kokoon.io, www.thinkmindset.com/; www.choosemuse.com (Muse, Muse 2); Neurosky; getvi.com (Vi Sense); Strickland, Eliza, "In-Ear EEG Makes Unobtrusive Brain- Hacking Gadgets a Real Possibility", IEEE Spectrum Jul. 7, 2016; Strickland, Eliza, "Wireless Earbuds Will Record Your EEG, Send Brainwave Data To Your Phone", IEEE Spectrum May 17, 2016. The Unicorn "Hybrid Black" wearable EEG headset provides a headset with eight electrode channels and digital data acquisition electronics (24 bit, 250 Hz), intended to provide a brain-computer interface for artistic, control, and other tasks. See, www.unicorn-bi.com/. Starkey Laboratories, Inc. US 20190166434 discloses an ear-worn electronic device having a plurality of sensors for EEG signals from a wearer's ear, as a brain-computer interface. A number of designs provide in-ear headphones which integrate EEG electrodes that pick up signals from the ear canal.

The Muse 2 headset from InteraXon Inc., Toronto ON, Canada (choosemuse.com), is a Bluetooth-connected EEG headset device that uses a smartphone app to facilitate meditation. Corresponding devices are available from Neuralink, Brainlink, BrainCo, Emotiv, Kernel, MindMaze, NeuroSky, NeuroPro, Neurable, and Paradromics. Consumer-type EEG headsets do not require shaving hair, and have been used for brain-computer interface applications, biofeedback, and other applications. See:

Aldridge, Audrey, Eli Barnes, Cindy L. Bethel, Daniel W. Carruth, Marianna Kocturova, Matus Pleva, and Jozef Juhar. "Accessible Electroencephalograms (EEGs): A Comparative Review with OpenBCI's Ultracortex Mark IV Headset." In 2019 29th Int. Conf. Radioelektronika (RADIOELEKTRONIKA), pp. 1-6. IEEE, 2019.

Amjadzadeh, M., and K. Ansari-Asl. "An innovative emotion assessment using physiological signals based on the combination mechanism." Scientia Iranica 24, no. 6 (2017): 3157-3170.

Aracena, Claudio, Pablo Loyola, Gino Slanzi, and Juan D. Velasquez. "Towards An Unified Replication Repository for EEG-based Emotion Classification." (2015)

Aspinall, Peter, Panagiotis Mavros, Richard Coyne, and Jenny Roe. "The urban brain: analysing outdoor physical activity with mobile EEG." Br J Sports Med 49, no. 4 (2015): 272-276.

Ayata, Deger, Yusuf Yaslan, and Mustafa Kamaşak. "Emotion Recognition via Multi Channel EEG Signal Fusion and Pattern Recognition."

Ayata, Deger, Yusuf Yaslan, and Mustafa Kamaşak. "Emotion recognition via random forest and galvanic skin response: Comparison of time based feature sets, window sizes and wavelet approaches." In 2016 Medical Technologies National Congress (TIPTEKNO), pp. 1-4. IEEE, 2016.

Aznan, Nik Khadijah Nik, Stephen Bonner, Jason Connolly, Noura Al Moubayed, and Toby Breckon. "On the classification of SSVEP-based dry-EEG signals via convolutional neural networks." In 2018 IEEE Int. Conf Systems, Man, and Cybernetics (SMC), pp. 3726-3731. IEEE, 2018.

Becker, Hanna, Julien Fleureau, Philippe Guillotel, Fabrice Wendling, Isabelle Merlet, and Laurent Albera. "Emotion recognition based on high-resolution EEG recordings and reconstructed brain sources." IEEE Transactions on Affective Computing (2017).

Berka, Chris, Daniel J. Levendowski, Milenko M. Cvetinovic, Miroslav M. Petrovic, Gene Davis, Michelle N. Lumicao, Vladimir T. Zivkovic, Miodrag V. Popovic, and Richard Olmstead. "Real-time analysis of EEG indexes of alertness, cognition, and memory acquired with a wireless EEG headset." Int. J. Human-Computer Interaction 17, no. 2 (2004): 151-170.

Brown, Lindsay, Jef van de Molengraft, Refet Firat Yazicioglu, Tom Tort, Julien Penders, and Chris Van Hoof. "A low-power, wireless, 8-channel EEG monitoring headset." In 2010 Int. Conf. of the IEEE Engineering in Medicine and Biology, pp. 4197-4200. IEEE, 2010.

Calero, Jose Angel Miranda, Rodrigo Marino, Jose M. Lanza-Gutierrez, Teresa Riesgo, Mario Garcia-Valderas, and Celia Lopez-Ongil. "Embedded Emotion Recognition within Cyber-physical systems using physiological signals." In 2018 Conf Design of Circuits and Int. Systems (DCIS), pp. 1-6. IEEE, 2018.

Campbell, Andrew, Tanzeem Choudhury, Shaohan Hu, Hong Lu, Matthew K. Mukerjee, Mashfiqui Rabbi, and Rajeev D S Raizada. "NeuroPhone: brain-mobile phone interface using a wireless EEG headset." In Proceedings of the second ACM SIGCOMM workshop on Networking, systems, and applications on mobile handhelds, pp. 3-8. ACM, 2010.

Cernea, Daniel, Andreas Kerren, and Achim Ebert. "Detecting insight and emotion in visualization applications with a commercial EEG headset." In Proceedings of SIGRAD 2011. Evaluations of Graphics and Visualization—Efficiency; Usefulness; Accessibility; Usability; Nov. 17-18, 2011; KTH; Stockholm; Sweden, no. 065, pp. 53-60. Linkoping University Electronic Press, 2011.

Cernea, Daniel, Peter-Scott Olech, Achim Ebert, and Andreas Kerren. "EEG-based measurement of subjective parameters in evaluations." In Int. Conf Human-Computer Interaction, pp. 279-283. Springer, Berlin, Heidelberg, 2011.

Chen, Shiyu, Zhen Gao, and Shangfei Wang. "Emotion recognition from peripheral physiological signals enhanced by EEG." In 2016 IEEE Int. Conf Acoustics, Speech and Signal Processing (ICASSP), pp. 2827-2831. IEEE, 2016.

Chi, Yu M., Yijun Wang, Yu-Te Wang, Tzyy-Ping Jung, Trevor Kerth, and Yuchen Cao. "A practical mobile dry EEG system for human computer interfaces." In Int. Conf Augmented Cognition, pp. 649-655. Springer, Berlin, Heidelberg, 2013.

Chung, Seong Youb, and Hyun Joong Yoon. "Affective classification using Bayesian classifier and supervised learning." In 2012 12th Int. Conf Control, Automation and Systems, pp. 1768-1771. IEEE, 2012.

Conneau, Anne-Claire, Ayoub Hajlaoui, Mohamed Chetouani, and Slim Essid. "Emoeeg: A new multimodal dataset for dynamic eeg-based emotion recognition with audiovisual elicitation." In 2017 25th European Signal Processing Conf. (EUSIPCO), pp. 738-742. IEEE, 2017.

Dai, Yixiang, Xue Wang, Xuanping Li, and Pengbo Zhang. "Reputation-driven multimodal emotion recognition in wearable biosensor network." In 2015 IEEE Int. Instrumentation and Measurement Technology Conf. (I2MTC) Proceedings, pp. 1747-1752. IEEE, 2015.

Daimi, Syed Naser, and Goutam Saha. "Classification of emotions induced by music videos and correlation with participants' rating." Expert Systems with Applications 41, no. 13 (2014): 6057-6065.

Duvinage, Matthieu, Thierry Castermans, Mathieu Petieau, Thomas Hoellinger, Guy Cheron, and Thierry Dutoit. "Performance of the Emotiv Epoc headset for P300-based applications." Biomedical engineering online 12, no. 1 (2013): 56.

Duvinage, Matthieu, Thierry Castermans, Thierry Dutoit, M. Petieau, T. Hoellinger, C. De Saedeleer, K. Seetharaman, and G. Cheron. "A P300-based quantitative comparison between the Emotiv Epoc headset and a medical EEG device." Biomedical Engineering 765, no. 1 (2012): 2012-2764.

Gao, Zhen, and Shangfei Wang. "Emotion recognition from EEG signals using hierarchical Bayesian network with privileged information." In Proceedings of the 5th ACM on Int. Conf Multimedia Retrieval, pp. 579-582. ACM, 2015.

Henson, James C., Anderson Micu, and Samah Abdel Baki. "Shielded multi-channel eeg headset systems and methods." U.S. Pat. No. 10,188,307.

Huang, Zhipeng. "Development of Cognitive Training Program with EEG Headset." (2018).

Katona, Jozsef, Tibor Ujbanyi, Gergely Sziladi, and Attila Kovari. "Speed control of Festo Robotino mobile robot using NeuroSky MindWave EEG headset based brain-computer interface." In 2016 7th IEEE Int. Conf Cognitive Infocommunications (CoglnfoCom), pp. 000251-000256. IEEE, 2016.

Kawde, Piyush, and Gyanendra K. Verma. "Deep belief network based affect recognition from physiological signals." In 2017 4th IEEE Uttar Pradesh Section Int. Conf Electrical, Computer and Electronics (UPCON), pp. 587-592. IEEE, 2017.

Khalili, Z., and M. H. Moradi. "Emotion detection using brain and peripheral signals." In 2008 Cairo Int. biomedical engineering Conf., pp. 1-4. IEEE, 2008.

Khirodkar, Vaishali, Ratna Saha, M. M. Sardeshmukh, and Rushikesh Borse. "Employing minimum distance classifier for emotion recognition analysis using EEG signals." In 2017 Int. Conf Computing, Communication, Control and Automation (ICCUBEA), pp. 1-9. IEEE, 2017.

Kim, Jeehoon, Jeongsu Lee, Chungmin Han, and Kwangsuk Park. "An Instant Donning Multi-Channel EEG Headset (with Comb-Shaped Dry Electrodes) and BCI Applications." Sensors 19, no. 7 (2019): 1537.

Kumar, Nitin, Kaushikee Khaund, and Shyamanta M. Hazarika. "Bispectral analysis of EEG for emotion recognition." Procedia Computer Science 84 (2016): 31-35.

Lacko, Daniel, Jochen Vleugels, Erik Fransen, Toon Huysmans, Guido De Bruyne, Marc M. Van Hulle, Jan Sijbers, and Stijn Verwulgen. "Ergonomic design of an EEG headset using 3D anthropometry." Applied ergonomics 58 (2017): 128-136.

Latha, G. Charlyn Pushpa, and C. R. Hema. "A Review on Classifiers for Emotion Studies." Emerging Trends in Engineering Research 239-247 (2012)

Li, Gang, and Wan-Young Chung. "A context-aware EEG headset system for early detection of driver drowsiness." Sensors 15, no. 8 (2015): 20873-20893.

Li, PeiYang, Huan Liu, Yajing Si, Cunbo Li, Fali Li, Xuyang Zhu, Xiaoye Huang et al. "EEG based emotion recognition by combining functional connectivity network and local activations." IEEE Transactions on Biomedical Engineering (2019).

Lin, Wenqian, Chao Li, and Shouqian Sun. "Deep convolutional neural network for emotion recognition using EEG and peripheral physiological signal." In Int. Conf Image and Graphics, pp. 385-394. Springer, Cham, 2017.

Lin, Yuan-Pin, and Tzyy-Ping Jung. "Exploring day-to-day variability in EEG-based emotion classification." In 2014 IEEE Int. Conf. Systems, Man, and Cybernetics (SMC), pp. 2226-2229. IEEE, 2014.

Lin, Yuan-Pin, Chi-Hong Wang, Tien-Lin Wu, Shyh-Kang Jeng, and Jyh-Horng Chen. "EEG-based emotion recognition in music listening: A comparison of schemes for multiclass support vector machine." In 2009 IEEE Int. Conf acoustics, speech and signal processing, pp. 489-492. IEEE, 2009.

Lin, Yuan-Pin, Yijun Wang, and Tzyy-Ping Jung. "Assessing the feasibility of online SSVEP decoding in human walking using a consumer EEG headset." J. neuroengineering and rehabilitation 11(1) (2014): 119.

Matlovič, Tomáš. "Emotion Detection using EPOC EEG device." In IIT. SRC 2016, pp. 1-6. 2016.

Md Nor, Norzaliza, and Abdul Wahab Bar. "Precursor Emotion of Driver by Using Electroencephalogram (EEG) Signals." Advanced Science Letters 21, no. 10 (2015): 3024-3028.

Mirza, Imran Ali, Amiya Tripathy, Sejal Chopra, Michelle D'Sa, Kartik Rajagopalan, Alson D'Souza, and Nikhil Sharma. "Mind-controlled wheelchair using an EEG headset and arduino microcontroller." In 2015 Int. Conf Technologies for Sustainable Development (ICTSD), pp. 1-5. IEEE, 2015.

Mousavinasr, Seyed Mohammad Reza, and Ali Pourmohammad. "An Improvement to Emotion Detection in EEG Signals Using Deep Artificial Neural Networks." Majallah-i pizishki-i Danishgah-i Ulum-i Pizishki va Khadamat-i Bihdashti-i Darmani-i Tabriz 40, no. 5 (2018): 91-101.

Özel, Pinar, Aydin Akan, and Bülent Yilmaz. "Emotional State Sensing by Using Hybrid Multivariate Empirical Mode Decomposition and Synchrosqueezing Transform." In 2018 Medical Technologies National Congress (TIPTEKNO), pp. 1-4. IEEE, 2018.

Ozel, Pinar, Aydin Akan, and Bulent Yilmaz. "Multivariate pseudo wignerville distribution based emotion detection from electrical activity of brain." In 2017 10th Int. Conf Electrical and Electronics Engineering (ELECO), pp. 516-519. IEEE.

Purnamasari, Prima Dewi, Anak Agung Putri Ratna, and Benyamin Kusumoputro. "EEG based patient emotion monitoring using relative wavelet energy feature and Back Propagation Neural Network." In 2015 37th Int. Conf. of the IEEE Eng. in Medicine and Biology Society (EMBC), pp. 2820-2823. IEEE, 2015.

Rabek, M., and K. Zakova. "Ball Levitation Using EEG Headset via Bluetooth." In 16th Int. Conf Emerging eLearning Technologies and Applications (ICETA), pp. 457-462. IEEE, 2018.

Rodriguez, Jesus D. "Simplification of EEG Signal Extraction, Processing, and Classification Using a Consumer-Grade Headset to Facilitate Student Engagement in BCI Research." PhD diss., The University of Texas Rio Grande Valley, 2018.

Royo, Marta, Vicente Chulvi, Elena Mulet, and *Julia* Galan. "Users' reactions captured by means of an EEG headset on viewing the presentation of sustainable designs using verbal narrative." European J. Marketing 52, no. 1/2 (2018): 159-181.

Saeed, Sanay Muhammad Umar, Syed Muhammad Anwar, Muhammad Majid, and Adnan Mehmood Bhatti. "Psychological stress measurement using low cost single channel EEG headset." In IEEE Int. Symp Signal Processing and Information Technology (ISSPIT), pp. 581-585. IEEE, 2015.

Saeed, Umar, Sanay Muhammad, Syed Muhammad Anwar, Muhammad Majid, Muhammad Awais, and Majdi Alnowami. "Selection of neural oscillatory features for human stress classification with single channel eeg headset." BioMed research Int. 2018 (2018).

Saif, A F M Saifuddin, M D Ryhan Hossain, Redwan Ahmed, and Tamanna Chowdhury. "A Review based on Brain Computer Interaction using EEG Headset for Physically Handicapped People." Int. J. Education and Management Engineering 9, no. 2 (2019): 34.

Sandel, Ankita, & Moon Inder Guide Singh. "Valence Detection Using EEG Signals." PhD diss., 2014.

Schaekermann, Mike. "Biosignal Datasets for Emotion Recognition." hcigames.com/hci/biosignal-datasets-emotion-recognition/Shin, Shin, Saim, Unsang Park, Ji-Hwan Kim, Jong-Seol Lee, and Sei-Jin Jang. "EEG based Music Preference Detection System." (2016)

Shu, Yangyang, and Shangfei Wang. "Emotion recognition through integrating EEG and peripheral signals." In 2017 IEEE Int. Conf Acoustics, Speech and Signal Processing (ICASSP), pp. 2871-2875.

Singh, Mandeep, Mooninder Singh, and Surabhi Gangwar. "Emotion recognition using electroencephalography (EEG): a review." Int. J. Information Technology & Knowledge Management 7, no. 1 (2013): 1-5.

Stopczynski, Arkadiusz, Jakob Eg Larsen, Carsten Stahlhut, Michael Kai Petersen, and Lars Kai Hansen. "A smartphone interface for a wireless EEG headset with real-time 3D reconstruction." In Int. Conf Affective Computing and Intelligent Interaction, pp. 317-318. Springer, Berlin, Heidelberg, 2011.

Terasawa, Naoto, Hiroki Tanaka, Sakriani Sakti, and Satoshi Nakamura. "Tracking liking state in brain activity while watching multiple movies." In Proceedings of the 19th ACM Int. Conf Multimodal Interaction, pp. 321-325. ACM, 2017.

Thammasan, Nattapong, Koichi Moriyama, Ken-ichi Fukui, and Masayuki Numao. "Continuous music-emotion recognition based on electroencephalogram." IEICE Trans Information and Systems 99, no. 4 (2016): 1234-1241.

Torres, Cristian A., Álvaro A. Orozco, and Mauricio A. Álvarez. "Feature selection for multimodal emotion recognition in the arousal-valence space." In 2013 35th Int. Conf. of the IEEE Engineering in Medicine and Biology Society (EMBC), pp. 4330-4333. IEEE, 2013.

Vinhas, Vasco, Luis Paulo Reis, and Eugenio Oliveira. "Emotion-based multimedia retrieval and delivery through online user biosignals: multichannel online biosignals towards adaptative GUI and content delivery." In ICAART 2009: Proceedings Of The Int. Conf Agents And Artificial Intelligence. 2009.

Yates, David C., and Esther Rodriguez-Villegas. "A key power trade-off in wireless EEG headset design." In 3rd Int. IEEE/EMBS Conf Neural Engineering, pp. 453-456. IEEE, 2007.

Yin, Zhong, Yongxiong Wang, Wei Zhang, Li Liu, Jianhua Zhang, Fei Han, and Wenjie Jin. "Physiological feature based emotion recognition via an ensemble deep autoencoder with parsimonious structure." IFAC-PapersOnLine 50, no. 1 (2017): 6940-6945.

Yoon, Hyunjin, Sang-Wook Park, Yong-Kwi Lee, and Jong-Hyun Jang. "Emotion recognition of serious game players using a simple brain computer interface." In 2013 Int. Conf ICT Convergence (ICTC), pp. 783-786. IEEE, 2013.

Yu, Xi, and Wen Qi. "A User Study of Wearable EEG Headset Products for Emotion Analysis." In Proc. 2018 Int. Conf Algorithms, Computing and Artificial Intelligence, p. 39. ACM, 2018.

Zhong, Yin, and Zhang Jianhua. "Subject-generic EEG feature selection for emotion classification via transfer recursive feature elimination." In 36th Chinese Control Conf. (CCC), pp. 11005-11010. IEEE, 2017.

See also, U.S. Pat. Nos. 3,659,614; 3,942,517; 3,998,213; 4,085,739; 4,257,424; 4,323,076; 4,353,372; 4,537,198; 4,678,865; 4,683,892; 4,709,702; 4,766,299; 4,883,067; 4,890,630; 4,967,038; 5,052,401; 5,119,816; 5,191,197; 5,222,503; 5,250,790; 5,273,037; 5,275,172; 5,293,867; 5,357,957; 5,360,971; 5,377,100; 5,415,282; 5,445,162; 5,474,082; 5,479,934; 5,484,992; 5,649,061; 5,660,177; 5,667,470; 5,726,916; 5,730,146; 5,740,812; 5,772,591; 5,800,351; 5,813,993; 5,817,029; 5,899,867; 6,032,064; 6,032,065; 6,067,464; 6,097,980; 6,154,669; 6,161,030; 6,167,298; 6,175,753; 6,198,958; 6,201,982; 6,234,393; 6,266,556; 6,289,238; 6,301,493; 6,349,231; 6,381,481; 6,383,143; 6,394,953; 6,450,820; 6,510,340; 6,571,123; 6,574,513; 6,577,893; 6,640,122; 6,654,626; 6,654,966; 6,708,051; 6,806,863; 6,832,725; 6,904,408; 7,054,681; 7,081,579; 7,128,266; 7,150,715; 7,159,783; 7,206,022; 7,269,456; 7,413,127; 7,450,003; 7,546,158; 7,551,952; 7,689,274; 7,726,575; 7,797,272; 7,835,787; 7,885,706; 8,005,691; 8,010,663; 8,019,402; 8,055,722; 8,065,796; 8,126,220; 8,208,943; 8,271,075; 8,294,969; 8,296,172; 8,311,622; 8,317,105; 8,322,622; 8,327,395; 8,364,255; 8,364,395; 8,366,005; 8,371,505; 8,371,507; 8,376,233; 8,381,979; 8,389,862; 8,390,909; 8,392,251; 8,408,464; 8,408,468; 8,408,469; 8,424,768; 8,428,681; 8,448,863; 8,457,013; 8,459,557; 8,469,272; 8,473,045; 8,474,712; 8,479,992; 8,483,816; 8,490,877; 8,517,271; 8,519,249; 8,523,076; 8,528,818; 8,533,187; 8,539,359; 8,544,737; 8,548,420; 8,550,335; 8,550,354; 8,550,357; 8,556,174; 8,556,176; 8,556,177; 8,559,767; 8,561,895; 8,561,903; 8,561,905; 8,565,107; 8,571,307; 8,579,200; 8,583,924; 8,584,945; 8,587,595; 8,587,697; 8,588,869; 8,590,789; 8,596,539; 8,596,542; 8,596,543; 8,599,271; 8,599,957; 8,600,158; 8,600,167; 8,602,309; 8,608,053; 8,608,071; 8,611,309; 8,615,487; 8,621,123; 8,622,303; 8,628,013; 8,628,015; 8,628,016; 8,629,926; 8,630,491; 8,635,309; 8,636,200; 8,636,212; 8,636,215; 8,636,224; 8,636,640; 8,638,806; 8,640,958; 8,640,960; 8,643,717; 8,646,692; 8,646,694; 8,655,428; 8,657,200; 8,659,397; 8,668,149; 8,676,230; 8,678,285; 8,678,286; 8,682,077; 8,687,282; 8,692,927; 8,695,880; 8,698,949; 8,700,009; 8,702,000; 8,717,494; 8,719,198; 8,720,783; 8,723,804; 8,723,904; 8,727,223; 8,740,082; 8,740,085; 8,746,563; 8,750,445; 8,752,766; 8,756,059; 8,757,495; 8,760,563; 8,762,102; 8,763,909; 8,764,652; 8,766,819; 8,774,895; 8,775,186; 8,777,108; 8,777,109; 8,779,898; 8,781,520; 8,781,991; 8,782,681; 8,783,573; 8,788,030; 8,789,757; 8,789,758; 8,789,759; 8,794,520; 8,794,522; 8,794,525; 8,794,526; 8,798,367; 8,807,431; 8,807,432; 8,812,690; 8,820,630; 8,822,848; 8,824,692; 8,824,696; 8,842,849; 8,844,822; 8,844,823; 8,849,019; 8,851,383; 8,854,633; 8,866,963; 8,868,421; 8,868,519; 8,868,802; 8,868,803; 8,870,074; 8,879,639; 8,880,426; 8,881,983; 8,881,987; 8,903,172; 8,908,995; 8,910,870; 8,910,875; 8,914,290; 8,914,788; 8,915,439; 8,915,444; 8,916,789; 8,918,250; 8,918,564; 8,925,818; 8,939,374; 8,942,480; 8,944,313; 8,944,327; 8,944,332; 8,950,678; 8,965,498; 8,967,468; 8,971,346; 8,976,030; 8,976,368; 8,978,981; 8,978,983; 8,978,984; 8,985,456; 8,985,457; 8,985,459; 8,985,461; 8,988,578; 8,988,590; 8,989,835; 8,991,704; 8,996,194; 8,996,384; 8,998,091; 9,002,641; 9,007,368; 9,010,641; 9,015,513; 9,016,576; 9,022,288; 9,026,476; 9,030,964; 9,031,631; 9,033,240; 9,033,242; 9,036,054; 9,037,344; 9,038,911; 9,038,915; 9,047,098; 9,047,359; 9,047,420; 9,047,525; 9,047,531; 9,049,640; 9,053,055; 9,053,378; 9,053,380; 9,057,641; 9,058,526; 9,060,671; 9,064,165; 9,064,167;

9,064,168; 9,064,243; 9,064,254; 9,066,032; 9,070,032; 9,082,023; 9,084,933; 9,092,055; 9,104,467; 9,105,174; 9,106,958; 9,148,768; 9,159,246; 9,165,216; 9,196,173; 9,215,978; 9,224,022; 9,224,027; 9,224,309; 9,229,526; 9,230,140; 9,239,615; 9,250,712; 9,258,033; 9,262,633; 9,310,609; 9,336,535; 9,342,724; 9,357,941; 9,375,945; 9,384,494; 9,390,596; 9,396,492; 9,408,575; 9,412,242; 9,418,368; 9,443,123; 9,443,222; 9,445,739; 9,474,461; 9,478,113; 9,489,574; 9,489,732; 9,507,974; 9,532,748; 9,539,118; 9,557,957; 9,563,273; 9,585,616; 9,589,107; 9,630,093; 9,685,174; 9,712,736; 9,770,184; 9,776,043; 9,805,381; 9,814,403; 9,814,426; 9,881,512; 9,907,482; 9,946,334; 9,946,795; 9,983,670; 9,988,008; 3,565,059; 3,735,753; 3,957,036; 4,375,219; 4,638,807; 4,967,038; 4,972,492; 5,273,037; 5,313,952; 5,479,934; 6,076,003; 6,154,699; 6,574,513; 6,640,122; 7,103,398; 7,773,767; 7,885,419; 8,055,722; 8,128,422; 8,155,736; 8,160,287; 8,170,637; 8,209,224; 8,270,814; 8,271,075; 8,284,233; 8,290,563; 8,301,218; 8,335,715; 8,335,716; 8,386,261; 8,386,312; 8,386,313; 8,391,966; 8,392,250; 8,392,251; 8,392,253; 8,392,254; 8,392,255; 8,396,529; 8,396,744; 8,417,185; 8,438,659; 8,442,626; 8,464,288; 8,473,345; 8,494,610; 8,494,905; 8,533,042; 8,548,555; 8,548,558; 8,634,892; 8,635,105; 8,655,428; 8,655,437; 8,659,397; 8,676,230; 8,679,013; 8,696,113; 8,706,518; 8,733,927; 8,733,928; 8,738,395; 8,755,879; 8,780,512; 8,781,570; 8,798,736; 8,812,075; 8,816,861; 8,821,397; 8,868,039; 8,868,216; 8,897,859; 8,898,344; 8,983,591; 8,988,350; 8,989,835; 9,014,661; 9,031,631; 9,032,110; 9,042,201; 9,058,200; 9,086,884; 9,104,467; 9,104,969; 9,129,478; 9,146,618; 9,171,131; 9,179,855; 9,186,105; 9,210,517; 9,213,403; 9,224,309; 9,239,615; 9,258,301; 9,259,180; 9,268,905; 9,292,858; 9,320,450; 9,330,497; 9,354,445; 9,357,240; 9,357,941; 9,367,131; 9,377,869; 9,392,956; 9,405,366; 9,408,575; 9,408,997; 9,412,233; 9,414,780; 9,426,582; 9,432,777; 9,436,279; 9,439,593; 9,439,595; 9,439,596; 9,439,736; 9,445,763; 9,445,768; 9,451,303; 9,451,406; 9,454,646; 9,454,777; 9,462,433; 9,477,290; 9,477,317; 9,477,701; 9,482,606; 9,497,530; 9,504,420; 9,507,974; 9,516,430; 9,521,976; 9,531,708; 9,532,748; 9,557,957; 9,560,984; 9,563,927; 9,569,986; 9,577,992; 9,579,060; 9,585,581; 9,590,986; 9,594,500; 9,599,492; 9,615,746; 9,619,613; 9,622,703; 9,636,063; 9,658,473; 9,692,756; 9,693,734; 9,700,261; 9,704,205; 9,706,237; 9,722,472; 9,723,422; 9,729,252; 9,736,603; 9,737,231; 9,740,285; 9,763,613; 9,775,545; 9,779,575; 9,781,521; 9,782,122; 9,794,672; 9,795,324; 9,800,717; 9,805,339; 9,805,381; 9,808,156; 9,811,154; 9,814,426; 9,818,150; 9,820,120; 9,830,576; 9,830,577; 9,832,353; 9,833,142; 9,833,185; 9,836,896; 9,836,931; 9,842,299; 9,844,344; 9,853,976; 9,857,590; 9,858,745; 9,865,093; 9,883,396; 9,886,981; 9,888,090; 9,898,793; 9,900,669; 9,904,891; 9,904,892; 9,905,239; 9,910,298; 9,916,010; 9,936,250; 9,949,640; 9,953,650; 9,955,902; 9,962,082; 9,962,083; 9,978,095; 9,983,670; 9,990,727; 9,993,190; 9,993,386; 9,994,228; 10,009,644; 10,019,060; 10,026,138; 10,029,067; 10,031,580; 10,042,038; 10,042,993; 10,052,023; 10,052,452; 10,058,285; 10,068,373; 10,075,896; 10,079,788; 10,089,074; 10,095,191; 10,108,783; 10,110,805; 10,113,913; 10,123,133; 10,123,134; 10,126,816; 10,130,278; 10,130,279; 10,130,766; 10,136,856; 10,136,862; 10,137,363; 10,143,415; 10,149,161; 10,152,957; 10,154,333; 10,154,815; 10,162,707; 10,166,091; 10,168,704; 10,169,712; 10,173,059; 10,176,894; 10,180,339; 10,185,147; 10,186,014; 10,188,307; 10,191,545; 10,198,505; 10,206,625; 10,209,779; 10,212,593; 10,213,156; 10,219,736; 10,223,710; 10,226,209; 10,227,063; 10,231,673; 10,234,942; 10,244,033; 10,254,785; 10,257,177; 10,257,555; 10,258,243; 10,258,291; 10,261,947; 10,262,356; 10,264,990; 10,271,087; 10,279,192; 10,285,634; 10,290,225; 10,291,977; 10,293,177; 10,300,240; 10,303,258; 10,303,988; 10,307,085; 10,307,104; 10,307,611; D277,787; D565,735; D702,237; D716,285; D723,560; D730,357; D730,901; D730,902; D733,112; D734,339; D734,751; D747,321; D757,009; D760,719; D762,604; D762,647; D766,244; D835,287; D613,267; D626,949; D643,013S1; D643,400S1; D671,523; D717,956; D743,039; D747,495; D809,474; 10,009,644; 10,016,655; 10,019,060; 10,059,347; 10,076,279; 10,092,206; 10,098,582; 10,109,216; 10,150,003; 10,188,307; 10,198,505; 10,210,768; 10,231,673; 10,254,785; 10,278,608; 10,285,634; 10,285,636; 10,303,258; 10,321,842; 10,342,472; 10,365,716; 20010044573; 20020019588; 20020028988; 20020072685; 20020120208; 20020183605; 20020188216; 20020198473; 20030038047; 20030060728; 20030144600; 20040030258; 20040133119; 20040153355; 20040210661; 20040245341; 20040249510; 20050054941; 20050088617; 20050113666; 20050137472; 20050177058; 20050197556; 20050228515; 20050247319; 20050277819; 20060061544; 20060102171; 20060143647; 20060161058; 20060161072; 20060231628; 20060258408; 20070010756; 20070038382; 20070055169; 20070063048; 20070124027; 20070173699; 20070225585; 20070235716; 20070238945; 20080027345; 20080065468; 20080071771; 20080082019; 20080146958; 20080177197; 20080212849; 20080226255; 20080228365; 20080295126; 20080306397; 20080312551; 20090040054; 20090069707; 20090105576; 20090105577; 20090131764; 20090134221; 20090143636; 20090143695; 20090193344; 20090227965; 20090259137; 20090281446; 20090289895; 20090326404; 20090327171; 20100004977; 20100016753; 20100036275; 20100041962; 20100056854; 20100076334; 20100094156; 20100094502; 20100177076; 20100177080; 20100177707; 20100177749; 20100191140; 20100239114; 20100240458; 20100250554; 20100258618; 20100274152; 20100281497; 20110004089; 20110015503; 20110015536; 20110046502; 20110091847; 20110105909; 20110106750; 20110129111; 20110131274; 20110144522; 20110169999; 20110187640; 20110202554; 20110213511; 20110270117; 20110270620; 20110282231; 20110282232; 20110298706; 20120036005; 20120046531; 20120089605; 20120108995; 20120111946; 20120123290; 20120124122; 20120143020; 20120150545; 20120168512; 20120176302; 20120190959; 20120193423; 20120203647; 20120203725; 20120209101; 20120223141; 20120224040; 20120226127; 20120236030; 20120239506; 20120242678; 20120245713; 20120257035; 20120290266; 20120295589; 20120296390; 20120296476; 20120316456; 20120319869; 20120330125; 20130019187; 20130024203; 20130039509; 20130043312; 20130066183; 20130075168; 20130079659; 20130080260; 20130085363; 20130091515; 20130103624; 20130130799; 20130131535; 20130166373; 20130172721; 20130173413; 20130175341; 20130175343;

| | | | | | |
|---|---|---|---|---|---|
| 20130177878; | 20130177883; | 20130178731; | 20150102109; | 20150102562; | 20150109577; |
| 20130194200; | 20130204153; | 20130226408; | 20150112153; | 20150112409; | 20150112983; |
| 20130231545; | 20130257744; | 20130257759; | 20150115035; | 20150123890; | 20150127791; |
| 20130260361; | 20130263167; | 20130270346; | 20150128116; | 20150129659; | 20150133047; |
| 20130274583; | 20130287258; | 20130292475; | 20150134470; | 20150136851; | 20150136854; |
| 20130292477; | 20130293539; | 20130293540; | 20150141529; | 20150141789; | 20150142492; |
| 20130296731; | 20130306728; | 20130306731; | 20150142553; | 20150144692; | 20150144698; |
| 20130307964; | 20130308625; | 20130313324; | 20150144701; | 20150145682; | 20150145805; |
| 20130313325; | 20130342717; | 20140001267; | 20150149946; | 20150157235; | 20150161429; |
| 20140002806; | 20140002828; | 20140008439; | 20150169925; | 20150169929; | 20150186703; |
| 20140025584; | 20140034734; | 20140036848; | 20150193644; | 20150193645; | 20150199010; |
| 20140039693; | 20140042814; | 20140049120; | 20150199957; | 20150204671; | 20150210199; |
| 20140049635; | 20140050354; | 20140051044; | 20150212585; | 20150213012; | 20150213019; |
| 20140051945; | 20140051960; | 20140051961; | 20150213020; | 20150215412; | 20150216436; |
| 20140059066; | 20140061306; | 20140063289; | 20150216437; | 20150220753; | 20150238106; |
| 20140066136; | 20140067692; | 20140070005; | 20150253410; | 20150254485; | 20150257673; |
| 20140071840; | 20140074746; | 20140076974; | 20150258429; | 20150262016; | 20150272465; |
| 20140078341; | 20140078342; | 20140078345; | 20150282730; | 20150282760; | 20150286285; |
| 20140098792; | 20140100774; | 20140100813; | 20150289800; | 20150297109; | 20150313496; |
| 20140103115; | 20140104413; | 20140104414; | 20150313497; | 20150313530; | 20150313539; |
| 20140104416; | 20140104451; | 20140106594; | 20150323337; | 20150323986; | 20150324551; |
| 20140106725; | 20140108010; | 20140108402; | 20150327012; | 20150351655; | 20150363082; |
| 20140108682; | 20140108842; | 20140110485; | 20150374255; | 20160012530; | 20160014251; |
| 20140114530; | 20140124577; | 20140124579; | 20160022206; | 20160029946; | 20160040982; |
| 20140125842; | 20140125853; | 20140125999; | 20160042241; | 20160055236; | 20160057230; |
| 20140128764; | 20140129378; | 20140131438; | 20160063883; | 20160070439; | 20160082263; |
| 20140131441; | 20140131443; | 20140131444; | 20160103487; | 20160109219; | 20160109220; |
| 20140131445; | 20140131448; | 20140133379; | 20160109224; | 20160112631; | 20160112643; |
| 20140135642; | 20140136208; | 20140136432; | 20160124516; | 20160125217; | 20160125342; |
| 20140140585; | 20140151453; | 20140152882; | 20160125873; | 20160132707; | 20160133253; |
| 20140158770; | 20140159869; | 20140163410; | 20160166169; | 20160170996; | 20160170998; |
| 20140164095; | 20140164376; | 20140166755; | 20160171514; | 20160171720; | 20160171772; |
| 20140166757; | 20140166759; | 20140168787; | 20160178479; | 20160180678; | 20160188944; |
| 20140175165; | 20140175172; | 20140180159; | 20160189087; | 20160198968; | 20160210552; |
| 20140191644; | 20140191913; | 20140197238; | 20160217621; | 20160220198; | 20160224803; |
| 20140197239; | 20140197304; | 20140200432; | 20160227912; | 20160232891; | 20160275483; |
| 20140200463; | 20140203087; | 20140204268; | 20160287157; | 20160292477; | 20160294779; |
| 20140206323; | 20140213874; | 20140214631; | 20160300252; | 20160306769; | 20160314276; |
| 20140216174; | 20140217166; | 20140217180; | 20160314294; | 20160321742; | 20160364586; |
| 20140221866; | 20140223462; | 20140231500; | 20170004260; | 20170007165; | 20170032098; |
| 20140232930; | 20140246502; | 20140247315; | 20170039045; | 20170056642; | 20170065199; |
| 20140250200; | 20140263493; | 20140263645; | 20170071495; | 20170071523; | 20170071537; |
| 20140267005; | 20140267142; | 20140270196; | 20170071546; | 20170071551; | 20170080234; |
| 20140270229; | 20140277582; | 20140278387; | 20170113641; | 20170113702; | 20170119271; |
| 20140280529; | 20140282210; | 20140284384; | 20170123495; | 20170135597; | 20170135626; |
| 20140285404; | 20140288933; | 20140297058; | 20170135640; | 20170139484; | 20170143228; |
| 20140299665; | 20140307878; | 20140309484; | 20170171441; | 20170177023; | 20170181915; |
| 20140312121; | 20140316230; | 20140319220; | 20170182283; | 20170188976; | 20170197086; |
| 20140319221; | 20140326787; | 20140332590; | 20170202475; | 20170228512; | 20170229037; |
| 20140334083; | 20140336796; | 20140344943; | 20170249855; | 20170251985; | 20170258390; |
| 20140346233; | 20140347265; | 20140350349; | 20170311832; | 20170339484; | 20170354341; |
| 20140351317; | 20140353373; | 20140361073; | 20170367650; | 20180025368; | 20180049896; |
| 20140361082; | 20140362184; | 20140363015; | 20180096738; | 20180110669; | 20180151085; |
| 20140366049; | 20140369511; | 20140374483; | 20180153470; | 20180154851; | 20180154852; |
| 20140374485; | 20150001301; | 20150001304; | 20180154853; | 20180154854; | 20180154860; |
| 20150003673; | 20150009338; | 20150009610; | 20180160930; | 20180184962; | 20180184964; |
| 20150011857; | 20150014416; | 20150021397; | 20180189678; | 20180204266; | 20180239501; |
| 20150028102; | 20150028103; | 20150028104; | 20180246570; | 20180278984; | 20180286272; |
| 20150029002; | 20150032709; | 20150038231; | 20180310851; | 20180310855; | 20180317848; |
| 20150038869; | 20150039309; | 20150040378; | 20180326999; | 20180333575; | 20180348863; |
| 20150045007; | 20150045688; | 20150048168; | 20190000338; | 20190008436; | 20190053766; |
| 20150049347; | 20150051992; | 20150053766; | 20190056438; | 20190059770; | 20190090771; |
| 20150053768; | 20150053769; | 20150053816; | 20190090772; | 20190099896; | 20190113973; |
| 20150062366; | 20150063215; | 20150063676; | 20190171348; | 20190174039; | 20190180642; |
| 20150069130; | 20150071819; | 20150079578; | 20190192077; | 20190200925; | 20190227626; |
| 20150083800; | 20150086114; | 20150088522; | 20040073129; | 20050215916; | 20060094974; |
| 20150096872; | 20150099557; | 20150100196; | 20080177197; | 20090112077; | 20090156925; |

20090214060; 20090281408; 20100068146; 20160196635; 20160196758; 20160213354;
20100090835; 20100094097; 20100163027; 20160219000; 20160224803; 20160232625;
20100163028; 20100163035; 20100168525; 20160235324; 20160235983; 20160259905;
20100168529; 20100168602; 20100201780; 20160262704; 20160265952; 20160267809;
20100234752; 20110004089; 20110040202; 20160269999; 20160296157; 20160299568;
20110162879; 20110224503; 20110313308; 20160300252; 20160302711; 20160306844;
20120029379; 20120046569; 20120108999; 20160310698; 20160310838; 20160316288;
20120136274; 20120150545; 20120176302; 20160317056; 20160320930; 20160324478;
20120190959; 20120197092; 20120220889; 20160331925; 20160339300; 20160342644;
20120245450; 20120250197; 20120295589; 20160344569; 20160349841; 20160358091;
20120296476; 20120330178; 20130012830; 20160358092; 20160360990; 20160361602;
20130035578; 20130039509; 20130041243; 20160364586; 20160367138; 20160374594;
20130044055; 20130046206; 20130066183; 20160378608; 20160381621; 20170000404;
20130066184; 20130096440; 20130096575; 20170007165; 20170007173; 20170010647;
20130127708; 20130130799; 20130177883; 20170010677; 20170011210; 20170020434;
20130179087; 20130197401; 20130208234; 20170039045; 20170042439; 20170048626;
20130211226; 20130211276; 20130237867; 20170049524; 20170064434; 20170065218;
20130242262; 20130260361; 20130278492; 20170065379; 20170068920; 20170068921;
20130338738; 20130343584; 20130343585; 20170071495; 20170071523; 20170071532;
20130345524; 20140012152; 20140020089; 20170071537; 20170071546; 20170071551;
20140058219; 20140073969; 20140096210; 20170078883; 20170080332; 20170086695;
20140098981; 20140099623; 20140106710; 20170087453; 20170091532; 20170093848;
20140107520; 20140108842; 20140114165; 20170095157; 20170095199; 20170103668;
20140114207; 20140121017; 20140146987; 20170112671; 20170119994; 20170127975;
20140148715; 20140160250; 20140164056; 20170133009; 20170139484; 20170142656;
20140179986; 20140195221; 20140210709; 20170143249; 20170157435; 20170160703;
20140211593; 20140221779; 20140221855; 20170162072; 20170164293; 20170164878;
20140223462; 20140228653; 20140257833; 20170169176; 20170169295; 20170171441;
20140277292; 20140278786; 20140282772; 20170172445; 20170175280; 20170177023;
20140304122; 20140307878; 20140313303; 20170180882; 20170185762; 20170189640;
20140316230; 20140316235; 20140321682; 20170193314; 20170213311; 20170215011;
20140330334; 20140336473; 20140342818; 20170215757; 20170221121; 20170221463;
20140368601; 20140369537; 20140378810; 20170243023; 20170244702; 20170245145;
20150000025; 20150003698; 20150003699; 20170249009; 20170251945; 20170258390;
20150005640; 20150005644; 20150006186; 20170259167; 20170262943; 20170265807;
20150012426; 20150016664; 20150033056; 20170272699; 20170272842; 20170281001;
20150038869; 20150040139; 20150045007; 20170293846; 20170300654; 20170309152;
20150073294; 20150073907; 20150091791; 20170311023; 20170311097; 20170311832;
20150094914; 20150105111; 20150112153; 20170323073; 20170331563; 20170332964;
20150121474; 20150123984; 20150126281; 20170337834; 20170347181; 20170352233;
20150131159; 20150135309; 20150142082; 20170367606; 20170367610; 20170367651;
20150150753; 20150157255; 20150162802; 20180000255; 20180005442; 20180011676;
20150185482; 20150157255; 20150190085; 20180011689; 20180014130; 20180025368;
20150199010; 20150213722; 20150227193; 20180027347; 20180042523; 20180047216;
20150227844; 20150235134; 20150242120; 20180070823; 20180075364; 20180081439;
20150248651; 20150250401; 20150250415; 20180098710; 20180103859; 20180110960;
20150256956; 20150257104; 20150257674; 20180113509; 20180115808; 20180116543;
20150264028; 20150268483; 20150272508; 20180125386; 20180133431; 20180133504;
20150277560; 20150278980; 20150289065; 20180133507; 20180139518; 20180150762;
20150293592; 20150297106; 20150297109; 20180154104; 20180157336; 20180158133;
20150302543; 20150305686; 20150323986; 20180160982; 20180165593; 20180173220;
20150338917; 20150343242; 20150347734; 20180182161; 20180184964; 20180189678;
20150350794; 20150350820; 20150351655; 20180193589; 20180196511; 20180214028;
20150366518; 20160005229; 20160005320; 20180217666; 20180220957; 20180221620;
20160015289; 20160022167; 20160022206; 20180234847; 20180236202; 20180246570;
20160029947; 20160029965; 20160042123; 20180250494; 20180263562; 20180275747;
20160044460; 20160045150; 20160054568; 20180276833; 20180278984; 20180279960;
20160054569; 20160055236; 20160062596; 20180289310; 20180296112; 20180301061;
20160063611; 20160065557; 20160070334; 20180317795; 20180321700; 20180321898;
20160071390; 20160078657; 20160081623; 20180324516; 20180333585; 20180338068;
20160103322; 20160109954; 20160117829; 20180344969; 20180348764; 20180364810;
20160119726; 20160128629; 20160132189; 20180368717; 20180368722; 20180369847;
20160133052; 20160142407; 20160144173; 20180373272; 20190001039; 20190008992;
20160150582; 20160156575; 20160156682; 20190012758; 20190013960; 20190020610;
20160157777; 20160164949; 20160166208; 20190029587; 20190029595; 20190033968;
20160167672; 20160170996; 20160170998; 20190034164; 20190043154; 20190053731;
20160171514; 20160191269; 20160192166; 20190053756; 20190053766; 20190070386;

20190083212; 20190086919; 20190097430; 20190108191; 20190110726; 20190113973; 20190117933; 20190133445; 20190142349; 20190167370; 20190174237; 20190174238; AU667199; AU729772; CN102458242A; CN104605844A; EP0483698; EP1090583; EP1776922; JP4582509; JP4699694; JP4801839; JP4829231; KR100895297; RU2563433; and WO2015143031.

The spatially separated sensors also allow the analysis of local peripheral nerve and muscle activity. While such activity is normally voluntary and can be intentionally asymmetric, there are characteristics of such nerve and muscle electrical patterns that may be determined independently of voluntary action. For example, muscle twitch patterns may provide data on The sensor may be an optical sensor, e.g., a light source and an optical detector. The optical sensor may detect blood pressure, a pulse, or blood oxygen saturation. The optical sensor may comprise a matrix comprising a fluorophore, and wherein fluorescence intensity or fluorescence lifetime of the fluorophore depends on the amount of the analyte. The optical sensor may be configured to perform near-infrared spectroscopy. The sensor may detect glucose. The sensor may be a potentiometric chemical sensor, an amperometric chemical sensor, an oxygen sensor, a pH sensor, a temperature sensor, or a glucose sensor. See www.medicaldesignbriefs.com/component/content/article/mdb/features/applications/17695. A temperature sensor may be a bipolar junction, thermistor, a thermocouple, or a proportional to absolute temperature (PTAT) circuit. The implantable device may comprise a bulk piezoelectric ultrasonic transducer and a thermistor. The sensor may be a pressure sensor or a microelectromechanical system (MEMS) sensor, e.g., a MEMS pressure sensor. The implantable device may be configured to measure blood pressure or a pulse. The sensor may be a strain sensor. The technology disclosed in U.S. patent application Ser. No. 16/826,027 is expressly incorporated herein by reference in its entirety.

Thus, the plurality of sensors, e.g., EEG pickup electrodes from the ears, are used to localize an event or condition, for example, such as by amplitude and phase delay differences for signals presumed to emanate from the same source. However, EEG brainwaves and other signals are generated throughout the brain, so that a "same source" presumption is unwarranted. In that case, the different signals may be analyzed to interpret asymmetries or differences in their proximity or environment. Thus, for example, bilateral differences in EEG activity may be due to different brain hemisphere activity, or a single focal source in one hemisphere, with sufficiently low masking signals to detect it.

In case of a stroke or other organic brain defects, neural pathways may be impaired. As a result, efferent pathways may produce different patterns than unimpaired (e.g., normal) pathways. As a result, neural patterns will change, which can be detected by sensors. In addition, the innervated muscles or tissue may respond to the abnormal innervation pathway. For example, muscles may have different twitch patterns, or otherwise reveal electrophysiological differences from a normal muscle. Other tissues besides muscle also respond to neural or neuroendocrine signals, and thus such differences may also be detectable.

According to the present invention, one exemplary sensor has an eyeglass frame form factor, with electrodes, such as the bridge of the nose, temples, and behind the ear. See U.S. Pat. No. 9,955,895, expressly incorporated herein by reference in its entirety.

English, Erik, et al. "EyePhone: A mobile EOG-based Human-Computer Interface for assistive healthcare." Neural Engineering (NER), 2013 6th Int. IEEE/EMBS Conf. IEEE, 2013.

Barea, R., L. Boquete, M. Mazo, and E. Lopez. System for assisted mobility using eye movements based on EOG. IEEE Trans. Neural Syst. Rehabil. Eng., 10(4):209{218, December 2002.

Bi, L., et al. EEG-based brain-controlled mobile robots: a survey. IEEE Trans. Human-Mach. Syst., 43(2):161{176, 2013.

Chen, Y., and W. S. Newman. A human-robot interface based on electrooculography. In Proc. ICRA, pp. 243{248, 2004.

Ding, Q., K. Tong, and G. Li. Development of an EOG based human-computer interface. In Proc. EMBC, pp. 6829{6831, 2005.

Jin, Z., Y. Sun, and A. Cheng. Predicting cardiovascular disease from real-time ECG monitoring. In EMBC, pp. 6889{6892, 2009.

Nguye, Q. X., and S. Jo. Electric wheelchair control using head pose free eye-gaze tracker. Electron. Lett., 48(13): 750{752, June 2012.

Oresko, J., Z. Jin, J. Cheng, S. Huang, Y. Sun, H. Duschl, and A. Cheng. A wearable smartphone-based platform for real-time cardiovascular disease detection via electrocardiogram processing. IEEE Trans. Info. Tech. Biomed., 14 (3):734-740, May 2010.

Tinati, M., and B. Mozaffary. A wavelet packets approach to ECG baseline drift cancellation. Int'l J. Biomed. Imag., 2006:1-9, 2006.

See also, U.S. patent applications and U.S. Pat. Nos. (each of which is expressly incorporated herein by reference in their entirety): 20140316230; 20140303428; 20140278475; 20140277739; 20140275849; 20140275829; 20140266787; 20140257540; 20140257055; 20140253303; 20140249853; 20140249760; 20140249600; 20140249429; 20140249379; 20140247155; 20140247154; 20140247151; 20140247150; 20140247149; 20140247147; 20140247146; 20140247144; 20140247137; 20140247136; 20140246917; 20140246502; 20140246501; 20140246500; 20140246499; 20140246498; 20140246497; 20140245791; 20140245790; 20140245789; 20140245788; 20140245787; 20140245786; 20140245785; 20140245784; 20140245783; 20140241216; 20140235965; 20140229302; 20140223462; 20140222101; 20140221850; 20140221849; 20140221791; 20140221790; 20140221789; 20140221785; 20140221784; 20140221780; 20140221779; 20140213937; 20140204029; 20140204025; 20140198936; 20140194769; 20140194768; 20140194702; 20140184496; 20140180502; 20140172310; 20140171749; 20140163425; 20140163409; 20140148723; 20140143064; 20140140567; 20140129259; 20140121476; 20140114205; 20140114165; 20140104059; 20140094707; 20140078049; 20140077946; 20140076318; 20140073880; 20140063055; 20140063054; 20140062682; 20140058528; 20140058218; 20140057232; 20140055284; 20140051944; 20140051943; 20140051942; 20140049627; 20140031711; 20130344465; 20130336528; 20130317576; 20130317415; 20130317384; 20130317382; 20130314303; 20130314243;

20130310907; 20130310676; 20130304165; 20130303837; 20130297218; 20130297217; 20130296987; 20130282339; 20130278631; 20130276785; 20130268019; 20130237867; 20130231574; 20130211291; 20130204114; 20130197322; 20130194177; 20130190556; 20130184787; 20130178718; 20130172759; 20130172691; 20130158368; 20130158367; 20130138010; 20130131755; 20130131464; 20130128118; 20130127980; 20130120246; 20130102928; 20130096442; 20130095459; 20130091515; 20130090931; 20130072807; 20130069780; 20130060097; 20130046181; 20130042010; 20130009783; 20120330109; 20120323087; 20120321759; 20120320336; 20120302842; 20120300061; 20120296569; 20120277820; 20120277618; 20120277548; 20120274593; 20120272179; 20120256833; 20120251989; 20120249797; 20120245474; 20120245464; 20120245439; 20120242698; 20120242697; 20120242678; 20120242501; 20120236031; 20120236030; 20120235900; 20120235887; 20120235886; 20120235885; 20120235884; 20120235883; 20120229248; 20120218301; 20120218172; 20120212499; 20120212484; 20120212414; 20120212406; 20120212400; 20120212399; 20120212398; 20120206485; 20120206335; 20120206334; 20120206323; 20120206322; 20120203725; 20120200601; 20120200499; 20120200488; 20120194553; 20120194552; 20120194551; 20120194550; 20120194549; 20120194420; 20120194419; 20120194418; 20120179061; 20120172682; 20120127426; 20120123232; 20120109399; 20120105324; 20120095357; 20120095352; 20120092157; 20120092156; 20120088987; 20120083668; 20120078448; 20120075168; 20120075124; 20120075123; 20120062445; 20120053508; 20120053472; 20120053395; 20120022365; 20120022340; 20120016431; 20110314530; 20110313760; 20110301488; 20110301487; 20110301441; 20110298706; 20110298702; 20110295142; 20110251985; 20110238685; 20110231757; 20110227820; 20110227813; 20110227812; 20110225536; 20110222745; 20110221897; 20110221896; 20110221793; 20110221672; 20110221671; 20110221670; 20110221669; 20110221668; 20110221659; 20110221658; 20110221657; 20110221656; 20110214082; 20110213664; 20110213211; 20110181422; 20110161163; 20110125046; 20110118619; 20110116046; 20110115624; 20110105859; 20110063073; 20110061647; 20110029044; 20110029038; 20110028799; 20110028798; 20110015503; 20110015469; 20100331630; 20100286532; 20100280372; 20100280338; 20100274321; 20100240982; 20100228145; 20100220904; 20100217100; 20100204614; 20100201621; 20100197996; 20100195770; 20100177968; 20100160808; 20100113898; 20100106044; 20100099954; 20100087701; 20100076333; 20100069780; 20100049008; 20100042011; 20100030101; 20100030092; 20100030089; 20100007512; 20090318779; 20090312998; 20090309747; 20090299209; 20090295738; 20090289895; 20090273562; 20090271122; 20090264789; 20090227877; 20090227876; 20090221928; 20090216091; 20090214118; 20090188502; 20090177702; 20090150821; 20090149778; 20090141007; 20090136098; 20090105785; 20090099474; 20090082831; 20090082829; 20090082639; 20080294019; 20080266257; 20080243017; 20080243014; 20080218472; 20080208072; 20080201278; 20080183090; 20080183082; 20080181452; 20080177193; 20080171943; 20080161707; 20080154111; 20080104415; 20080097235; 20080084539; 20080071326; 20080071150; 20080059138; 20080056611; 20080055248; 20080021340; 20080004904; 20080001735; 20070293915; 20070282566; 20070276439; 20070276270; 20070273504; 20070270706; 20070265533; 20070250345; 20070250134; 20070250121; 20070249952; 20070208269; 20070167858; 20070146368; 20070135727; 20070123758; 20070055115; 20070030246; 20070015976; 20070010748; 20060293608; 20060290663; 20060281980; 20060266356; 20060200035; 20060200034; 20060122529; 20060094466; 20060089541; 20060077064; 20060061544; 20050283039; 20050243054; 20050234518; 20050222643; 20050215847; 20050195165; 20050144042; 20050115561; 20050113703; 20050113650; 20050085744; 20050085738; 20050080348; 20050047629; 20050033122; 20040267152; 20040193068; 20040143170; 20040046777; 20030139783; 20030139683; 20030083596; 20030069516; 20030016207; 20020151771; 20020135618; 20020077534; 20020039111; U.S. Pat. Nos. 8,878,796; 8,878,782; 8,874,211; 8,870,766; 8,870,764; 8,862,307; 8,862,219; 8,852,098; 8,851,669; 8,842,071; 8,831,702; 8,830,164; 8,823,527; 8,821,495; 8,818,513; 8,818,498; 8,814,691; 8,812,098; 8,805,527; 8,805,513; 8,805,501; 8,805,489; 8,798,698; 8,793,620; 8,784,893; 8,784,322; 8,784,293; 8,777,958; 8,775,340; 8,768,482; 8,768,449; 8,764,651; 8,762,733; 8,762,202; 8,761,890; 8,758,018; 8,757,163; 8,750,971; 8,747,336; 8,747,313; 8,744,587; 8,733,290; 8,727,978; 8,725,244; 8,721,341; 8,717,292; 8,715,033; 8,711,462; 8,708,904; 8,708,903; 8,708,884; 8,706,205; 8,706,182; 8,692,677; 8,684,926; 8,684,922; 8,684,900; 8,680,991; 8,663,106; 8,655,437; 8,655,428; 8,652,038; 8,647,268; 8,641,612; 8,639,322; 8,639,313; 8,635,105; 8,628,462; 8,626,301; 8,626,282; 8,626,259; 8,617,068; 8,616,208; 8,615,283; 8,614,676; 8,602,555; 8,591,430; 8,573,980; 8,570,176; 8,569,277; 8,562,527; 8,560,072; 8,556,951; 8,548,852; 8,540,369; 8,538,514; 8,533,042; 8,532,786; 8,531,291; 8,525,788; 8,525,687; 8,525,673; 8,523,758; 8,522,779; 8,515,529; 8,512,221; 8,509,884; 8,509,882; 8,500,636; 8,494,905; 8,494,610; 8,493,390; 8,488,246; 8,484,081; 8,482,859; 8,478,486; 8,477,425; 8,475,368; 8,473,345; 8,473,045; 8,472,120; 8,467,133; 8,466,875; 8,464,288; 8,461,988; 8,460,322; 8,457,746; 8,449,471; 8,449,116; 8,442,640; 8,442,638; 8,437,843; 8,434,868; 8,428,741; 8,425,415; 8,419,654; 8,405,610; 8,401,651; 8,400,313; 8,398,546; 8,396,744; 8,392,255; 8,392,254; 8,392,253; 8,392,251; 8,392,250; 8,386,313; 8,386,312; 8,386,244; 8,382,484; 8,380,314; 8,376,965; 8,374,701; 8,371,307; 8,369,940; 8,369,936; 8,368,641; 8,357,101; 8,355,769; 8,352,012; 8,346,354; 8,345,191; 8,344,911; 8,340,981; 8,335,716; 8,335,715; 8,332,038; 8,328,718; 8,323,204; 8,323,189; 8,323,188; 8,321,023; 8,311,622; 8,308,661; 8,306,

265; 8,301,232; 8,290,596; 8,285,389; 8,281,787; 8,280,503; 8,271,074; 8,270,814; 8,254,634; 8,244,340; 8,242,880; 8,226,569; 8,220,466; 8,218,825; 8,209,224; 8,203,530; 8,195,289; 8,162,846; 8,157,732; 8,157,731; 8,147,407; 8,131,373; 8,121,693; 8,121,673; 8,108,036; 8,104,470; 8,103,333; 8,096,946; 8,096,303; 8,080,014; 8,079,953; 8,073,534; 8,069,852; 8,068,904; 8,059,136; 8,055,348; 8,044,766; 8,036,750; 8,032,842; 8,021,299; 8,019,428; 8,013,837; 8,010,347; 8,002,553; 8,000,793; 7,997,266; 7,993,279; 7,992,567; 7,991,195; 7,975,700; 7,969,416; 7,967,439; 7,959,567; 7,945,865; 7,934,506; 7,925,354; 7,917,222; 7,896,807; 7,894,890; 7,885,700; 7,869,881; 7,865,235; 7,860,455; 7,848,795; 7,835,581; 7,830,249; 7,805,196; 7,803,119; 7,803,118; 7,797,050; 7,797,040; 7,794,406; 7,787,946; 7,785,257; 7,783,353; 7,774,052; 7,766,827; 7,764,283; 7,755,602; 7,751,878; 7,749,154; 7,747,323; 7,739,126; 7,733,224; 7,727,139; 7,715,894; 7,706,992; 7,706,884; 7,702,502; 7,684,856; 7,674,230; 7,672,728; 7,654,948; 7,647,114; 7,643,875; 7,640,055; 7,639,146; 7,606,392; 7,596,413; 7,591,265; 7,583,819; 7,575,005; 7,572,225; 7,559,903; 7,558,622; 7,554,549; 7,539,533; 7,539,532; 7,522,344; 7,515,054; 7,509,166; 7,502,643; 7,502,498; 7,488,294; 7,486,991; 7,486,986; 7,469,697; 7,468,040; 7,460,906; 7,454,313; 7,420,472; 7,396,331; 7,376,459; 7,363,076; 7,351,524; 7,346,391; 7,297,119; 7,285,090; 7,269,455; 7,266,413; 7,260,436; 7,231,245; 7,204,250; 7,194,313; 7,177,678; 7,167,743; 7,117,108; 7,108,982; 7,070,571; 7,035,685; 7,024,234; 7,020,508; 7,013,258; 6,964,023; 6,928,354; 6,920,358; 6,875,174; 6,842,670; 6,811,538; 6,777,195; 6,740,032; 6,720,984; 6,697,930; 6,665,560; 6,636,763; 6,625,485; 6,595,929; 6,587,725; 6,575,902; 6,560,486; 6,553,252; 6,530,884; 6,511,424; 6,496,724; 6,491,647; 6,428,490; 6,425,861; 6,424,333; 6,419,629; 6,416,480; 6,398,721; 6,397,845; 6,377,833; 6,375,614; 6,370,414; 6,325,475; 6,306,088; 6,275,213; 6,259,889; 6,246,382; 6,231,187; 6,204,828; 6,175,762; 6,171,258; 6,152,563; 6,148,280; 6,097,927; 6,094,182; 6,092,058; 6,091,334; 6,088,017; 6,070,098; 6,050,962; 6,050,940; 6,033,073; 6,032,072; 5,999,846; 5,933,210; 5,930,741; 5,851,193; 5,826,579; 5,823,190; 5,813,993; 5,762,611; 5,751,260; 5,728,680; 5,726,916; 5,724,987; 5,701,894; 5,694,939; 5,689,619; 5,687,291; 5,649,061; 5,645,068; 5,644,324; 5,622,168; 5,592,401; 5,570,698; 5,517,021; 5,513,649; 5,491,492; 5,467,777; 5,447,166; 5,422,689; 5,363,858; 5,360,971; 5,331,959; 5,299,118; 5,293,187; 5,259,390; 5,204,703; 5,137,027; 5,047,930; 4,973,149; 4,950,069; 4,889,422; 4,838,681; 4,836,670; 4,817,633; 4,653,001; 4,570,637; 4,561,448; 4,474,186; 4,417,592; 4,320,768; 4,109,648; 4,105,302; and 3,969,020.

Wang, X., et al. Leveraging mobile cloud for telemedicine: a performance study in medical monitoring. In Proc. NEBEC, 2013.

The communications may support a so-called wireless body area network (WBAN) communication protocol, e.g., IEEE 802.15.6. This may provide intercompatibility with devices from various sources.

WBAN supports a variety of real-time health monitoring and consumer electronics applications. WBAN provides low power, short-range, and extremely reliable wireless communication within the surrounding area of the human body, supporting a vast range of data rates for different applications. Short-range, wireless communications in the vicinity of, or inside, a body. It uses existing industrial scientific medical (ISM) bands as well as frequency bands approved by national medical and/or regulatory authorities. Support for quality of service (QoS), extremely low power, and data rates up to 10 Mbps is required while simultaneously complying with strict non-interference guidelines where needed. This standard considers effects on portable antennas due to the presence of a person, and radiation pattern shaping to minimize the specific absorption rate (SAR) into the body, and changes in characteristics as a result of the user motions.

The IEEE 802.15.6 standard aims to provide confidentiality, authentication, integrity, privacy protection, and replay defense. Of course, the present invention may optionally avoid high security where appropriate.

All nodes and hubs must choose three security levels: unsecured communication (level 0), authentication but no encryption (level 1), and authentication and encryption (level 2). During the security association process, a node and a hub need to jointly select a suitable security level. In unicast communication, a pre-shared or a new MK is activated. A Pairwise Temporal Key (PTK) is then generated that is used only once per session. In multicast communication, a Group Temporal Key (GTK) is generated that is shared with the corresponding group. All nodes and hubs in a WBAN have to go through certain stages at the MAC layer before data exchange. A security association is a procedure to identify a node and a hub to each other, to establish a new Master Key (MK) shared between them, or to activate an existing MK pre-shared between them. The security association in the IEEE 802.15.6 standard is based on four key agreement protocols.

"Body Area Networks' should free hospital bandwidth, untether patients" Computerworld". 2012 Jun. 4.

"FCC Dedicates Spectrum Enabling Medical Body Area Networks,", FCC.gov".

Abdulkader, O.; Bamhdi, A. M.; Thayananthan, V.; Elbouraey, F. IBMSDC: Intelligent Blockchain based Management System for protecting Digital Currencies Transactions. In Proc. 2019 3rd World Conf Smart Trends in Systems Security and Sustainablity (WorldS4), London, UK, 30-31 Jul. 2019; pp. 363-367.

Abidi, Bahae, Abdelillah Jilbab, and Mohamed E L Haziti. "Wireless sensor networks in biomedical: Wireless body area networks." In Europe and MENA cooperation advances in information and communication technologies, pp. 321-329. Springer, Cham, 2017.

Abouei, J.; Dehkordy, S. F.; Plataniotis, K. N.; Pasupathy, S. Raptor Codes in Wireless Body Area Networks. In Proceedings of the 2011 IEEE 22nd Int. Symp Personal, Indoor and Mobile Radio Comm., Toronto, ON, Canada, 11-14 Sep. 2011; pp. 2143-2147.

Ahmadi, A., M. Shojafar, S. F. Hajeforosh, M. Dehghan, M. Singhal, An efficient routing algorithm to preserve k-coverage in wireless sensor networks, J Supercomput, 68 (2) (2014), pp. 599-623

Aileni, Raluca Maria, George Suciu, Cristina Mihaela Balaceanu, Cristian Beceanu, Petrache Ana Lavinia, Carmen-Violeta Nadrag, Sever Pasca, Carlos Alberto Valderrama Sakuyama, and Alexandru Vulpe. "Body area network (BAN) for healthcare by wireless mesh network (WMN)." In Body Area Network Challenges and Solutions, pp. 1-17. Springer, Cham, 2019.

Akhtar, Fayaz, and Mubashir Husain Rehmani. "Energy harvesting for self-sustainable wireless body area networks." IT Professional 19, no. 2 (2017): 32-40.

Al Ameen, M., J. Liu, K. Kwak, Security and privacy issues in wireless sensor networks for healthcare applications, J Med Syst, 36 (1) (2012), pp. 93-101

Al Barazanchi, I., Haider Rasheed Abdulshaheed, and A. Shibghatullah. "The Communication Technologies in WBAN." Int. J. Adv. Sci. Technol 28, no. 8 (2019): 543-549.

Alam, M. M.; Hamida, E. B. Surveying Wearable Human Assistive Technology for Life and Safety Critical Applications: Standards, Challenges and Opportunities. Sensors 2014, 14, 9153-9209.

Ali, S. H., Novel approach for generating the key of stream cipher system using random forest data mining algorithm, In the sixth of IEEE Int. Conf dev. in eSystems Engineering (DeSE) (2013), pp. 259-269

Al-Janabi, S., I. Al-Shourbaji, A study of cyber security awareness in educational environment in the middle east, J Inform Knowledge Manage, 15 (01) (2016), p. 1650007

Al-Janabi, Samaher, Ibrahim Al-Shourbaji, Mohammad Shojafar, and Shahaboddin Shamshirband. "Survey of main challenges (security and privacy) in wireless body area networks for healthcare applications." Egyptian Informatics J. 18, no. 2 (2017): 113-122.

Al-Khaleefa, A. S., M. R. Ahmad, R. C. Muniyandi, R. F. Malik, and A. A. M. Isa. "Optimized authentication for wireless body area network." J. Telecommunication, Electronic and Computer Engineering (JTEC) 10, no. 2 (2018): 137-142.

Alzubi, Ahmed, and Arif Sari. "Deployment of hash function to enhance message integrity in wireless body area network (WBAN)." Int. J. Comm., Network and System Sciences 9, no. 12 (2016): 613.

Arbit, A., Y. Livne, Y. Oren, A. Wool, Implementing public-key cryptography on passive RFID tags is practical, Int J Inf Secur, 14 (1) (2015), pp. 85-99

Arefin, Md Taslim, Mohammad Hanif Ali, and AKM Fazlul Hague. "Wireless body area network: An overview and various applications." J. Computer and Comm. 5, no. 7 (2017): 53-64.

Arrobo, G. E.; Haas, Z. J.; Gitlin, R. D. Temporal Diversity Coding for Improving the Performance of Wireless Body Area Networks. In Proceedings of the BodyNets '12 7th Int. Conf Body Area Networks, Oslo, Norway, 24-26 Feb. 2012; ICST (Institute for Computer Sciences, Social-Informatics and Telecommunications Engineering): Brussels, Belgium, 2012; pp. 187-190.

Asam, Muhammad, and A. Ajaz. "Challenges in Wireless Body Area Network." Proc. of Int. J. Advanced Computer Science and Applications 10, no. 11 (2019).

Awan, Jawad Hussain, Shahzad Ahmed Memon, Nisar Ahmed Memon, Raza Shah, Zulifqar Bhutto, and R. A. Bhatti. "Conceptual model for WWBAN (wearable wireless body area network)." Int. J. Adv. Comput. Sci. Appl 8, no. 1 (2017): 377-381.

Azaria, A.; Ekblaw, A.; Vieira, T.; Lippman, A. Medrec: Using blockchain for medical data access and permission management. In Proceedings of the 2016 2nd Int. Conf Open and Big Data (OBD), Vienna, Austria, 22-24 Aug. 2016; pp. 25-30.

Azzi, R.; Chamoun, R. K.; Sokhn, M. The power of a blockchain-based supply chain. Comput. Ind. Eng. 2019, 135, 582-592.

Badreddine, Wafa, Nesrine Khernane, Maria Potop-Butucaru, and Claude Chaudet. "Convergecast in wireless body area networks." Ad Hoc Networks 66 (2017): 40-51.

Barua, M., X. Liang, R. Lu, X. Shen, PEACE: an efficient and secure patient-centric access control scheme for eHealth care system, IEEE Conf computer Comm. workshops (INFOCOM WKSHPS) (2011), pp. 970-975

Bethencourt, J, Sahai, A, Waters, B. Ciphertext-policy attribute-based encryption. In: Proceedings of the 2007 IEEE Symp. security and privacy (SP'07), Berkeley, CA, 20-23 May 2007, pp. 321-334.

Bhawiyuga, Adhitya, Arya Wardhana, Kasyful Amron, and Annisa Puspa Kirana. "Platform for Integrating Internet of Things Based Smart Healthcare System and Blockchain Network." In 2019 6th NAFOSTED Conf Information and Computer Science (NICS), pp. 55-60. IEEE, 2019.

Bogdan, P. Taming the Unknown Unknowns in Complex Systems: Challenges and Opportunities for Modeling, Analysis and Control of Complex (Biological) Collectives. Front. Physiol. 2019, 10, 1452.

Bogdanov, A., L. R. Knudsen, G. Leander, C. Paar, A. Poschmann, M. J. Robshaw, Y. Seurin, C. Vikkelsoe, PRESENT: an ultra-lightweight block cipher, Int. workshop on cryptographic hardware and embedded systems, Springer, Berlin Heidelberg (2007), pp. 50-466

Bonomi, F, Milito, R, Zhu, J, et al. Fog computing and its role in the Internet of Things. In: Proceedings of the first edition of the MCC workshop on mobile cloud computing (MCC'12), Helsinki, 17 Aug. 2012, pp 13-16. New York: ACM.

Bruce, N., W. T. Jang, H. J. Lee, An embedded encryption protocol for healthcare networks security, Network, 2 (2014), p. 5

Bu, Gewu, and Maria Potop-Butucaru. "Ban-gzkp: Optimal zero knowledge proof based scheme for wireless body area networks." Ad Hoc Networks 77 (2018): 28-41.

Byers, C. L.; Fey, K. E.; Weisner, R. M.; Schnittgrund, G. D. Miniature Implantable Array and Stimulation System Suitable for Eyelid Stimulation. U.S. Pat. No. 6,792,314, 14 Sep. 2004.

Cai, Guofa, Yi Fang, Jinming Wen, Guojun Han, and Xiaodong Yang. "QoS-aware buffer-aided relaying implant WBAN for healthcare IoT: Opportunities and challenges." IEEE Network 33, no. 4 (2019): 96-103.

Chaudhary, Krista, Umang Kant, and Pramod Kumar. "A View on the Blockchain as a Solution to the Healthcare Industry: Challenges and Opportunities." In Int. Conf Computational Intelligence, Security and Internet of Things, pp. 160-169. Springer, Singapore, 2019.

Chen, M.; Gonzalez, S.; Vasilakos, A.; Cao, H.; Leung, V. C. Body Area Networks: A Survey. Mob. Netw. Appl. 2011, 16, 171-193.

Chen, Min; Gonzalez, Sergio; Vasilakos, Athanasios; Cao, Huasong; Leung, Victor (2010). "Body Area Networks: A Survey" (PDF). Mobile Networks and Applications (MONET). 16 (2): 1-23. CiteSeerX 10.1.1.329.7097. doi:10.1007/s11036-010-0260-8. ISSN 1383-469X.

Chen, W.; Mu, Y.; Liang, X.; Gao, Y. Medical Data Sharing Model Based on Blockchain. J. Phys. Conf. Ser. 2019, 1267, 012014.

Chinaei, Mohammad Hossein, Hassan Habibi Gharakheili, and Vijay Sivaraman. "Optimal Witnessing of Healthcare IoT Data Using Blockchain Logging Contract." arXiv preprint arXiv:2007.03330 (2020).

Cicioğlu, Murtaza, and Ali Çalhan. "SDN-based wireless body area network routing algorithm for healthcare architecture." Etri J. 41, no. 4 (2019): 452-464.

Cisco Visual Networking Index: Global Mobile Data Traffic Forecast Update, 2016-2021. 2017. www.cisco.com/c/en/us/solutions/collateral/service-provider/visual-networking-index-vni/mobile-white-paper-c11-520862.html.

ConnectingCare. Available online: www.careconnect.com/.

Cotton, S. L.; D'Errico, R.; Oestges, C. A Review of Radio Channel Models for Body Centric Comm. Radio Sci. 2014, 49, 371-388.

Crosby, G. V., T. Ghosh, R. Murimi, C. A. Chin, Wireless body area networks for healthcare: a survey, Int J Ad Hoc, Sensor Ubiquitous Comput, 3 (3) (2012), pp. 1-26

Crosby, G. V., T. Ghosh, R. Murimi, C. A. Chin, Wireless body area networks for healthcare: a survey, In J Ad Hoc, Sensor Ubiquitous Comput, 3 (3) (2012), p. 1

Dakhel, Mohammed, and Soukaena Hassan. "A Secure Wireless Body Area Network for E-Health Application Using Blockchain." In Int. Conf Applied Computing to Support Industry: Innovation and Technology, pp. 395-408. Springer, Cham, 2019.

Daniel, J.; Sargolzaei, A.; Abdelghani, M.; Sargolzaei, S.; Amaba, B. Blockchain technology, cognitive computing, and healthcare innovations. J. Adv. Inf. Technol. 2017, 8.

Deepak, K.; Babu, A. Improving Energy Efficiency of Incremental Relay Based Cooperative Comm. in Wireless Body Area Networks. Int. J. Commun. Syst. 2015, 28, 91-111.

Deepak, K. S.; Babu, A. V. Energy Consumption Analysis of Modulation Schemes in IEEE 802.15.6-Based Wireless Body Area Networks. EURASIP J. Wirel. Commun. Netw. 2016, 2016, 187.

Ding, J.; Dutkiewicz, E.; Huang, X. Energy Efficient Cooperative Communication for UWB Based In-body Area Networks. In Proceedings of the BodyNets '13 8th Int. Conf Body Area Networks, Boston, Massachusetts, 30 Sep.-2 Oct. 2013; ICST (Institute for Computer Sciences, Social-Informatics and Telecommunications Engineering): Brussels, Belgium, 2013; pp. 29-34.

Domingo, M. C. Packet Size Optimization for Improving the Energy Efficiency in Body Sensor Networks. ETRI J. 2011, 33, 299-309.

Dorri, A.; Kanhere, S. S.; Jurdak, R. Towards an optimized blockchain for IoT. In Proceedings of the 2017 IEEE/ACM Second Int. Conf Internet-of-Things Design and Implementation (IoTDI), Pittsburgh, PA, USA, 18-21 Apr. 2017; pp. 173-178.

Douglas, Robert Keith, and David Jonathan Julian. "Method and apparatus of implementing a body area network using a mesh configuration." U.S. Pat. No. 9,386,479, issued Jul. 5, 2016.

Edemekong, P. F.; Haydel, M. J. Health Insurance Portability and Accountability Act (HIPAA). In StatPearls [Internet]; StatPearls Publishing: Petersburg, FL, USA, 2019.

Elhayatmy, G., Nilanjan Dey, and Amira S. Ashour. "Internet of Things based wireless body area network in healthcare." In Internet of things and big data analytics toward next-generation intelligence, pp. 3-20. Springer, Cham, 2018.

Ericsson ConsumerLab: Wearable Technology and the Internet of Things. 2016. www.ericsson.com/thinkingahead/consumerlab/consumer-insights/wearable-technology-and-the-internet-of-things.

Fan, K, Xu, H Y, Gao, L X, et al. Efficient and privacy preserving access control scheme for fog-enabled IoT. Future Gener Comput Syst 2019; 99: 134-142.

Farahani, B.; Firouzi, F.; Chakrabarty, K. Healthcare IoT. In Intelligent Internet of Things; Springer: Berlin/Heidelberg, Germany, 2020; pp. 515-545.

Farooq, Sameer, Deepak Prashar, and Kiran Jyoti. "Hybrid encryption algorithm in wireless body area networks (WBAN)." In Intelligent Comm., Control and Devices, pp. 401-410. Springer, Singapore, 2018.

Fatema, N., R. Brad, Security requirements, counterattacks and projects in healthcare applications using WSNs—a review, Int J Comput Network Commun (IJCNAC), 2 (2) (2014)

Ferdous, M. S., F. Chowdhury, M. Moniruzzaman, A taxonomy of attack methods on peer-to-peer network, In the proceedings of the 1st Indian Conf computational intelligence and information security, ICCIIS (2007), pp. 132-138

Ferrag, M A, Derdour, M, Mukherjee, M, et al. Blockchain technologies for the Internet of Things: research issues and challenges. IEEE Internet Things 2019; 6(2): 2188-2204.

Forecast for Wearable Devices Worldwide 2016-2018. www.gartner.com/technology/home.jsp.

Fort, A.; Ryckaert, J.; Desset, C.; De Doncker, P.; Wambacq, P.; Van Biesen, L. Ultra-wideband Channel Model for Communication Around the Human Body. IEEE J. Sel. A. Commun. 2006, 24, 927-933.

Fragopoulos, A. G., J. Gialelis, D. Serpanos, Imposing holistic privacy and data security on person centric eHealth monitoring infrastructures, 12th IEEE Int. Conf E-health networking applications and services (Healthcom) (2010), pp. 127-134

Garcia P., "A Methodology for the Deployment of Sensor Networks", IEEE Transactions On Knowledge And Data Engineering, vol. 11, no. 4, December 2011.

Garrido-Estepa, M.; Matos, S. L.; del Mar Polo de Santos, M. Miniature Leadless Pacemaker. 2015. www.euroscan.org/technologies/miniature-leadless-pacemaker.

Gaur, N.; Desrosiers, L.; Ramakrishna, V.; Novotny, P.; Baset, S. A.; O'Dowd, A. Hands-On Blockchain with Hyperledger Building Decentralized Applications with Hyperledger Fabric and Composer; Packt Publishing Ltd.: Birmingham, U K, 2018.

Geller, T., David, Y. B., Khmelnitsky, E., Ben-Gal, I., Ward, A., Miller, D., & Bambos, N. (2019, May). "Learning Health State Transition Probabilities via Wireless Body Area Networks" (PDF). In ICC 2019-2019 IEEE Int. Conf Comm. (ICC), pp. 1-6. IEEE. 2019.

Ghorbani, M.; Bogdan, P. A cyber-physical system approach to artificial pancreas design. In Proceedings of the 2013 Int. Conf Hardware/Software Codesign and System Synthesis (CODES+ISSS), Montreal, QC, Canada, 29 Sep.-4 Oct. 2013; pp. 1-10.

Girardi, Francesco, Gaetano De Gennaro, Lucio Colizzi, and Nicola Convertini. "Improving the Healthcare Effectiveness: The Possible Role of EHR, IoMT and Blockchain." Electronics 9(6) (2020): 884.

Goyal, V, Pandey, O, Sahai, A, et al. Attribute-based encryption for fine-grained access control of encrypted data. In: Proceedings of the 13th ACM Conf computer and Comm. security (CCS'06), Alexandria, VA, 30 Oct.-3 Nov. 2006, pp. 89-98. New York: ACM.

Green, M, Hohenberger, S, Waters, B. Outsourcing the decryption of ABE ciphertexts. In: Proc. of the 20th USENIX Conf security (SEC'11), San Francisco, CA, 8-12 Aug. 2011, pp. 34-34. New York: ACM.

Griggs, K. N.; Ossipova, O.; Kohlios, C. P.; Baccarini, A. N.; Howson, E. A.; Hayajneh, T. Healthcare blockchain system using smart contracts for secure automated remote patient monitoring. J. Med. Syst. 2018,42,130.

Gu, Haijun, Zhijun Li, Liheng Wang, and Zhuang Ling. "Resource allocation for wireless information and power transfer based on WBAN." Physical Communication 37 (2019): 100865.

Guo, R, Shi, H X, Zhao, Q L, et al. Secure attribute-based signature scheme with multiple authorities for blockchain in electronic health records systems. IEEE Access 2018; 6: 11676-11686.

Guo, R, Shi, H X, Zheng, D, et al. Flexible and efficient blockchain-based ABE scheme with multi-authority for medical on demand in telemedicine system. IEEE Access 2019; 7: 88012-88025.

Guo, Rui, Chaoyuan Zhuang, Huixian Shi, Yinghui Zhang, and Dong Zheng. "A lightweight verifiable outsourced decryption of attribute-based encryption scheme for blockchain-enabled wireless body area network in fog computing." Int. J. Distributed Sensor Networks 16, no. 2 (2020): 1550147720906796.

Guo, Z.; Huang, J.; Wang, B.; Cui, J. H.; Zhou, S.; Willett, P. A Practical Joint Network-Channel Coding Scheme for Reliable Comm. in Wireless Networks. IEEE Trans. Wireless. Comm. 2012, 11, 2084-2094.

Guo, Z.; Huang, J.; Wang, B.; Cui, J. H.; Zhou, S.; Willett, P. A Practical Joint Network-Channel Coding Scheme for Reliable Communication in Wireless Networks. In Proc. of the MobiHoc '09 Tenth ACM Int. Symp Mobile Ad Hoc Networking and Computing, New Orleans, LA, USA, 18-21 May 2009; pp. 279-288.

Gupta, G.; Pequito, S.; Bogdan, P. Dealing with unknown unknowns: Identification and selection of minimal sensing for fractional dynamics with unknown inputs. In Proceedings of the 2018 American Control Conf. (ACC), Milwaukee, WI, USA, 27-29 Jun. 2018; pp. 2814-2820.

Gupta, G.; Pequito, S.; Bogdan, P. Re-thinking EEG-based non-invasive brain interfaces: Modeling and analysis. In Proceedings of the 2018 ACM/IEEE 9th Int. Conf Cyber-Physical Systems (ICCPS), Porto, Portugal, 11-13 Apr. 2018; pp. 275-286.

Han, N. D., L. Han, D. M. Tuan, H. P. In, M. Jo, A scheme for data confidentiality in cloud-assisted wireless body area networks, lnf Sci, 284 (2014), pp. 157-166

Hang, L.; Choi, E.; Kim, D. H. A novel EMR integrity management based on a medical blockchain platform in hospital. Electronics 2019, 8, 467.

Hasan, Khalid, Kamanashis Biswas, Khandakar Ahmed, and Md Saiful Islam. "Challenges of Integrating Blockchain in Wireless Body Area Network." In The 3rd Symp Distributed Ledger Technology. Griffith University Australia, 2018.

Hasan, Khalid, Kamanashis Biswas, Khandakar Ahmed, Nazmus S. Nafi, and Md Saiful Islam. "A comprehensive review of wireless body area network." J. Network and Computer Applications 143 (2019): 178-198.

Hasan, Khalid, Xin-Wen Wu, Kamanashis Biswas, and Khandakar Ahmed. "A novel framework for software defined wireless body area network." In 2018 8th Int. Conf Intelligent Systems, Modelling and Simulation (ISMS), pp. 114-119. IEEE, 2018.

Hausl, C.; Dupraz, P. Joint Network-Channel Coding for the Multiple-Access Relay Channel. In Proceedings of the 2006 3rd IEEE Comm. Society on Sensor and Ad Hoc Comm. and Networks, Reston, VA, USA, 28 Sep. 2006; Volume 3, pp. 817-822.

Hausl, C.; Hagenauer, J. Iterative Network and Channel Decoding for the Two-Way Relay Channel. In Proc. of the 2006 IEEE Int. Conf Comm., Istanbul, Turkey, 11-15 Jun. 2006; Volume 4, pp. 1568-1573.

Health Information Technology for Economic and Clinical Health Act HITECH. Ways And Means and Science Technology waysandmeans.house.gov/media/pdf/110/hit2.pdf HealthCoin. Available online: www.f6s.com/healthcoin.

Hu, C Q, Li, H J, Huo, Y, et al. Secure and efficient data communication protocol for wireless body area networks. IEEE Trans Multi-Scale Comput Syst 2016; 2(2): 94-107.

Hu, P F, Dhelim, S, Ning, H S, et al. Survey on fog computing: architecture, key technologies, applications and open issues. J Netw Comput Appl 2017; 98: 27-42.

Huang, X.; Shan, H.; Shen, X. On Energy Efficiency of Cooperative Comm. in Wireless Body Area Network. In Proceedings of the 2011 IEEE Wireless Comm. and Networking Conf., Cancun, Mexico, 28-31 Mar. 2011; pp. 1097-1101.

Hussien, H.; Yasin, S.; Udzir, S.; Zaidan, A.; Zaidan, B. A Systematic Review for Enabling of Develop a Blockchain Technology in Healthcare Application: Taxonomy, Substantially Analysis, Motivations, Challenges, Recommendations and Future Direction. J. Med. Syst. 2019, 43, 320.

Ianculescu, M.; Stanciu, A.; Bica, O.; Neagu, G. Innovative, Adapted Online Services that Can Support the Active, Healthy and Independent Living of Ageing People. A Case Study. Int. J. Econ. Manag. Syst. 2017, 2, 321-329.

IEEE P802.15.6-2012 Standard for Wireless Body Area Networks

IEEE Standard for Local and Metropolitan Area Networks—Part 15.6: Wireless Body Area Networks; IEEE Std 802.15.6-2012; IEEE: Piscataway, NJ, USA, 2012; pp. 1-271.

Int. Telecommunication Union (ITU). Internet of Things global standards initiative, www.itu.int/en/ITU-T/gsi/iot/pages/default.aspx Iqbal, Jawaid, Arif Iqbal Umar, Noorul Amin, and Abdul Waheed. "Efficient and secure attribute-based heterogeneous online/offline signcryption for body sensor networks based on blockchain." Int. J. Distributed Sensor Networks 15, no. 9 (2019): 1550147719875654.

Ivan, D. Moving toward a blockchain-based method for the secure storage of patient records. In ONC/NIST Use of Blockchain for Healthcare and Research Workshop; ONC/NIST: Gaithersburg, MD, USA, 2016; pp. 1-11.

Jameel, Furqan, Uzair Javaid, Wali Ullah Khan, Muhammad Naveed Aman, Haris Pervaiz, and Riku Jantti. "Reinforcement Learning in Blockchain-Enabled IIoT Networks: A Survey of Recent Advances and Open Challenges." Sustainability 12, no. 12 (2020): 5161.

Jamil, F.; Hang, L.; Kim, K.; Kim, D. A Novel Medical Blockchain Model for Drug Supply Chain Integrity Management in a Smart Hospital. Electronics 2019, 8, 505.

Jamil, F.; Iqbal, M. A.; Amin, R.; Kim, D. Adaptive thermal-aware routing protocol for wireless body area network. Electronics 2019, 8, 47.

Jamil, Faisal, Muhammad Azhar Iqbal, Rashid Amin, and DoHyeun Kim. "Adaptive thermal-aware routing protocol for wireless body area network." Electronics 8, no. 1 (2019): 47.

Jamil, Faisal, Shabir Ahmad, Naeem Iqbal, and Do-Hyeun Kim. "Towards a Remote Monitoring of Patient Vital Signs Based on IoT-Based Blockchain Integrity Management Platforms in Smart Hospitals." Sensors 20, no. 8 (2020): 2195.

Jang, C. S., D. G. Lee, J. W. Han, J. H. Park, Hybrid security protocol for wireless body area networks, Wireless Commun Mobile Comput, 11 (2) (2011), pp. 277-288

Javadi, S. S., M. A. Razzaque, Security and privacy in wireless body area networks for health care applications, Wireless networks and security, Springer, Berlin Heidelberg (2013), pp. 165-187

Javaid, N.; Rehman, O.; Alrajeh, N.; Khan, Z.; Manzoor, B.; Ahmed, S. AID: An Energy Efficient Decoding Scheme for LDPC Codes in Wireless Body Area Sensor Networks. Procedia Comput. Sci. 2013, 21, 449-454.

Jin, H.; Luo, Y.; Li, P.; Mathew, J. A review of secure and privacy-preserving medical data sharing. IEEE Access 2019, 7, 61656-61669.

Kargar, M. J., S. Ghasemi, O. Rahimi, Wireless body area network: from electronic health security perspective, Int J Reliable Quality E-Healthcare (IJRQEH), 2 (4) (2013), pp. 38-47

Kashyap, R. Applications of Wireless Sensor Networks in Healthcare. In IoT and WSN Applications for Modern Agricultural Advancements: Emerging Research and Opportunities; IGI Global: Hershey, PA, USA, 2020; pp. 8-40.

Kaur, Karmjeet. "Blockchain Technology: A Review." IJMTES Int. J. Modern Trends in Engineering and Science, vol. 5, Issue 07 (2018) ISSN 2348-3121

Kaur, Navneet, and Sukhwinder Singh. "Optimized cost effective and energy efficient routing protocol for wireless body area networks." Ad Hoc Networks 61 (2017): 65-84.

Kavitha, T., D. Sridharan, Security vulnerabilities in wireless sensor networks: a survey, J Inf Assurance Sec, 5 (1) (2010), pp. 31-44

Khan, Haibat; Dowling, Benjamin; Martin, Keith M. (August 2018). "Highly Efficient Privacy-Preserving Key Agreement for Wireless Body Area Networks". 2018 17th IEEE Int. Conf Trust, Security and Privacy in Computing and Comm./12th IEEE Int. Conf Big Data Science and Engineering (Trust Com/BigDataSE). IEEE. pp. 1064-1069. doi:10.1109/trustcom/bigdatase.2018.00149. ISBN 9781538643884.

Khan, P. W.; Byun, Y. A Blockchain-Based Secure Image Encryption Scheme for the Industrial Internet of Things. Entropy 2020, 22, 175.

Khan, P. W.; Byun, Y. C.; Park, N. A Data Verification System for CCTV Surveillance Cameras Using Blockchain Technology in Smart Cities. Electronics 2020, 9, 484.

Kifayat, K., M. Merabti, Q. Shi, D. Llewellyn-Jones, Security in wireless sensor networks, Handbook of information and communication security, Springer, Berlin Heidelberg (2010), pp. 513-552

Kim, K. J., S. P. Hong, Privacy care architecture in wireless sensor networks, Int J Distrib Sens Netw (2013), pp. 1-8

Kirichek, Ruslan, D. Transmission, and S. Node. "The Model Of Data Delivery From The Wireless Body Area Network To The Cloud Server With The Use Of Unmanned Aerial Vehicles." ECMS, pp. 603-606. 2016.

Kompara, Marko, and Marko Holbl. "Survey on security in intra-body area network communication." Ad Hoc Networks 70 (2018): 23-43.

Kovačević, T., T. Perković, M. Čagalj, LIRA: a new key deployment scheme for wireless body area networks, IEEE Int. Conf software telecommunications and computer networks (SoftCOM) (2013), pp. 1-6

Kumar, R., R. Mukesh, State of the art: security in wireless body area networks, Int J Comput Sci Eng Technol (IJCSET), 4 (5) (2013), pp. 622-630

Kumar, Sudesh, Abhishek Bansal, and Ram Shringar Raw. "Health Monitoring Planning for On-Board Ships Through Flying Ad Hoc Network." In Advanced Computing and Intelligent Engineering, pp. 391-402. Springer, Singapore, 2020.

Kumari, Rani, Parma Nand, and Rani Astya. "Integration of Blockchain in WBAN." In 2019 Int. Conf Computing, Communication, and Intelligent Systems (ICCCIS), pp. 144-149. IEEE, 2019.

Kumpuniemi, T.; Hamalainen, M.; Tuovinen, T.; Yazdandoost, K. Y.; linatti, J. Radio Channel Modelling for Pseudo-Dynamic WBAN On-body UWB Links. In Proceedings of the 2014 8th Int. Symp Medical Information and Communication Technology (ISMICT), Firenze, Italy, 2-4 Apr. 2014; pp. 1-5.

Kuzlu, M.; Pipattanasomporn, M.; Gurses, L.; Rahman, S. Performance Analysis of a Hyperledger Fabric Blockchain Framework: Throughput, Latency and Scalability. In Proceedings of the 2019 IEEE Int. Conf Blockchain (Blockchain), Atlanta, GA, USA, 14-17 Jul. 2019; pp. 536-540.

Kwak, K. S.; Ullah, S.; Ullah, N. An Overview of IEEE 802.15.6 Standard. In Proceedings of the 2010 3rd Int. Symp Applied Sciences in Biomedical and Communication Technologies (ISABEL 2010), Roma, Italy, 7-10 Nov. 2010; pp. 1-6.

Lai, D., Begg, R. K. and Palaniswami, M. eds, Healthcare Sensor Networks: Challenges towards practical implementation Archived 2011-10-26 at the Wayback Machine, ISBN 978-1-4398-2181-7, 2011

Lai, J Z, Deng, R H, Guan, C W, et al. Attribute-based encryption with verifiable outsourced decryption. IEEE Trans Inf Foren Sec 2013; 8(8): 1343-1354.

Lam, J. S.; Simpson, B. K.; Lau, F. H. Health Insurance Portability and Accountability Act Noncompliance in Patient Photograph Management in Plastic Surgery. Ann. Plast. Surg. 2019, 82, 486-492.

Latif, R., H. Abbas, S. Assar, Distributed denial of service (DDoS) attack in cloud-assisted wireless body area networks: a systematic literature review, J Med Syst, 38 (11) (2014), p. 1

Latré, B, Brarm, B, Moerman, I, et al. A survey on wireless body area networks. Wireless Networking 2011; 17(1): 1-18.

Latré, B., B. Braem, I. Moerman, C. Blondia, P. Demeester, A survey on wireless body area networks, Wireless Netw, 17 (1) (2011), pp. 1-8

Lee Y S, Alasaarela E, Lee H., Efficient Encryption Scheme based on Elliptic Curve Cryptography (ECC) and Symmetric algorithm in Wireless Body Area Networks (WBANs); 2013. p. 36-9.

Lee Y S, Alasaarela E, Lee H., Secure key management scheme based on ECC algorithm for patient's medical information in healthcare system. In: The IEEE Int. Conf information networking 2014 (ICOIN2014); 2014. p. 453-7.

Lee, Yongsu, and Hoi-jun Yoo. "A 274 µW clock synchronized wireless body area network IC with super-regenerative RSSI for biomedical ad-hoc network system." In 2017 39th Int. Conf. of the IEEE Engineering in Medicine and Biology Society (EMBC), pp. 710-713. IEEE, 2017.

Lewko, A, Okamoto, T, Sahai, A, et al. Fully secure functional encryption: attribute-based encryption and (hierarchical) inner product encryption. In: Proc. 29th Int. Conf theory and applications of cryptographic techniques (EUROCRYPT'10), French Riviera, 30 May-3 Jun. 2010, pp. 62-91. Berlin: Springer.

Lewko, A, Waters, B. Unbounded HIBE and attribute-based encryption. In: Proceedings of the 30th Int. Conf theory and applications of cryptographic techniques (EUROCRYPT'11), Tallinn, 15-19 May 2011, pp. 547-567. Berlin: Springer.

Li, J., K. Ren, B. Zhu, Z. Wan, Privacy-aware attribute-based encryption with user accountability, Int. Conf information security, Springer, Berlin Heidelberg (2009), pp. 347-362

Li, J G, Sha, F J, Zhang, Y C, et al. Verifiable outsourced decryption of attribute-based encryption with constant ciphertext length. Secur Commun Netw 2017; 2017(2): 1-11.

Li, J G, Wang, Y, Zhang, Y C, et al. Full verifiability for outsourced decryption in attribute based encryption. IEEE Trans Sery Comput. Epub ahead of print 31 May 2017. DOI: 10.1109/TSC.2017.2710190

Li, M., S. Yu, J. D. Guttman, W. Lou, K. Ren, Secure ad hoc trust initialization and key management in wireless body area networks, ACM Trans Sensor Networks (TOSN), 9 (2) (2013), p. 18

Li, M., W. Lou, K. Ren, Data security and privacy in wireless body area networks, IEEE Wirel Commun, 17 (1) (2010), pp. 51-58

Li, X, Ibrahim, M H, Kumari, S, et al. Anonymous mutual authentication and key agreement scheme for wearable sensors in wireless body area networks. Comput Netw 2017; 129(2): 429-443.

Li, X, Peng, J Y, Niu, J W, et al. A robust and energy efficient authentication protocol for industrial internet of things. IEEE Internet Things J 2018; 5(3): 1606-1615.

Li, Z D, Li, W M, Jin, Z P, et al. An efficient ABE scheme with verifiable outsourced encryption and decryption. IEEE Access 2019; 7: 29023-29037.

Li, Zhouzhou, Honggang Wang, Mahmoud Daneshmand, and Hua Fang. "Secure and efficient key generation and agreement methods for wireless body area networks." In 2017 IEEE Int. Conf Comm. (ICC), pp. 1-6. IEEE, 2017.

Liang, X., M. Barua, R. Lu, X. Lin, X. S. Shen, HealthShare: achieving secure and privacy-preserving health information sharing through health social networks, Comput Commun, 35(15) (2012), pp. 1910-1920

Liao, Yangzhe, Mark S. Leeson, and Matthew D. Higgins. "Flexible quality of service model for wireless body area sensor networks." Healthcare technology letters 3, no. 1 (2016): 12-15.

Libelium. Cooking Hacks by Libelium. 2013. Available online: www.cooking-hacks.com/documentation/tutorials/ehealth-biometric-sensor-platform-arduino-raspberry-pi-medical.

Libelium. Cooking Hacks by Libelium. 2013. www.cooking-hacks.com/pulse-and-oxygen-in-blood-sensor-spo2-ehealth-medical. www.cooking-hacks.com/electrocardiogram-sensor-ecg-ehealth-medical. www.cooking-hacks.com/airflow-sensor-breathing-ehealth-medical. www.cooking-hacks.com/body-temperature-sensor-ehealth-medical. www.cooking-hacks.com/shop/sensors/e-health/blood-pressure-sensor-sphygmomanometer-v2-0. www.cooking-hacks.com/glucometer-sensor-ehealth-medical. www.cooking-hacks.com/shop/sensors/e-health/electromyography-sensor-emg.

Lin, S Q, Zhang, R, Ma, H, et al. Revisiting attribute-based encryption with verifiable outsourced decryption. IEEE Trans Inf Foren Sec 2015; 10(10): 2119-2130.

Liu, He, Fengye Hu, Shengguan Qu, Zan Li, and Dong Li. "Multipoint wireless information and power transfer to maximize sum-throughput in wban with energy harvesting." IEEE Internet of Things J. 6, no. 4 (2019): 7069-7078.

Liu, J., Z. Zhang, R. Sun, K. S. Kwak, An efficient certificateless remote anonymous authentication scheme for wireless body area networks, IEEE Int. Conf Comm. (ICC) (2012), pp. 3404-3408

Liu, J W, Li, X L, Ye, L, et al. BPDS: a blockchain based privacy-preserving data sharing for electronic medical records. In: Proceedings of the 2018 IEEE global Comm. Conf. (Globecom'18), Abu Dhabi, United Arab Emirates, 9-13 Dec. 2018. New York: IEEE.

Liu, L.; D'Errico, R.; Ouvry, L.; De Doncker, P.; Oestges, C. Dynamic Channel Modeling at 2.4 GHz for On-Body Area Networks. Adv. Electron. Telecommun. 2011, 2, 18-27.

Liu, Yi, Danpu Liu, and Guangxin Yue. "BGMM: A body gauss-Markov based mobility model for body area networks." Tsinghua Science and Technology 23, no. 3 (2018): 277-287.

Lynn, B. PBC (pairing-based cryptography) library, 2012, crypto.stanford.edu/pbc/Yuce, Yuce, M. R., & J. Y. Khan (2011). "Wireless Body Area Networks: Technology, Implementation, and Applications". Pan Stanford Publishing.

Yuce, M. R. (2010). "Implementation of wireless body area networks for healthcare systems". Sensors and Actuators A: Physical. 162 (1): 116-129. CiteSeerX 10.1.1.476.3929. doi:10.1016/j.sna.2010.06.004.

Mahmood, Abdul Salam, Essa Jafer, Sattar Hussain, and Xavier Fernando. "Wireless body area network development for remote patient health observing." In 2017 IEEE Canada Int. Humanitarian Technology Conf. (IHTC), pp. 26-31. IEEE, 2017.

Majumder, Annwesha Banerjee, and Somsubhra Gupta. "An energy-efficient congestion avoidance priority-based routing algorithm for body area network." In Industry Interactive Innovations in Science, Engineering and Technology, pp. 545-552. Springer, Singapore, 2018.

Mana, M., M. Feham, B. A. Bensaber, Trust key management scheme for wireless body area networks, IJ Network Security, 12 (2) (2011), pp. 75-83

Mao, X P, Lai, J Z, Mei, Q X, et al. Generic and efficient constructions of attribute-based encryption with verifiable outsourced decryption. IEEE Trans Depend Secure 2016; 13(5): 533-546.

Masdari, Mohammad, Safiyyeh Ahmadzadeh, and Moazam Bidaki. "Key management in wireless Body Area Network: Challenges and issues." J. Network and Computer Applications 91 (2017): 36-51.

Maskooki, A., C. B. Soh, E. Gunawan, K. S. Low, Opportunistic routing for body area network, IEEE Conf consumer Comm. and networking (CCNC) (2011), pp. 237-241

Mathers, C. D., D. Loncar, Updated projections of global mortality and burden of disease, 2002-2030: data sources, methods and results, PLos Med (World Health Org) (2006), pp. 1-8

Mathieson, K.; Loudin, J.; Goetz, G.; Huie, P.; Wang, L.; Kamins, T. I.; Galambos, L.; Smith, R.; Harris, J. S.; Sher, A.; et al. Photovoltaic Retinal Prosthesis with High Pixel Density. Nat. Photonics 2012(6):391-397.

McGhin, Thomas, Kim-Kwang Raymond Choo, Charles Zhechao Liu, and Debiao He. "Blockchain in healthcare applications: Research challenges and opportunities." J. Network and Computer Applications 135 (2019): 62-75.

MEDIBLOC. Available online: medibloc.org/en/.

MediLedger. Available online: www.mediledger.com/.

MedRec. Available online: medrec.media.mit.edu/.

Mell, P M, Grance, T. The NIST definition of cloud computing (SP 800-145), 2011, nvlpubs.nist.gov/nistpubs/Legacy/SP/nistspecialpublication800-145.pdf Miao, Y B, Ma, J F, Liu, X M, et al. Lightweight fine-grained search over encrypted data in fog computing. IEEE Trans Sery Comput 2019; 12: 772-785.

Miller, D., Zhou, Z., Bambos, N., & Ben-Gal, I. (2018, June). "Sensing-Constrained Power Control in Digital Health". 2018 American Control Conf. (ACC) (pp. 4213-4220). IEEE. 2018.

Misic J. Enforcing patient privacy in healthcare WSNs using ECC implemented on 802.15. 4 beacon enabled clusters. In: 2008 Sixth IEEE Int. Conf pervasive computing and Comm. (PerCom), Hong Kong; 2008. p. 686-91.

Miyandoab, Fardin Derogarian, João Canas Ferreira, Vitor M. Grade Tavares, José Machado da Silva, and Fernando J. Velez. "A Multifunctional Integrated Circuit Router for Body Area Network Wearable Systems." IEEE/ACM Transactions on Networking (2020).

Movassaghi, S., M. Abolhasan, J. Lipman, D. Smith, A. Jamalipour, Wireless body area networks: a survey, IEEE Commun Surveys Tutorials, 16 (3) (2014), pp. 1658-1686

Movassaghi, Samaneh; Abolhasan, Mehran; Lipman, Justin; Smith, David; Jamalipour, Abbas (2014). "Wireless Body Area Networks: A Survey". IEEE Comm. Surveys and Tutorials. 16 (3): 1658-1686. doi:10.1109/SURV.2013.121313.00064.

Munoz, M. O.; Foster, R.; Hao, Y. Exploring Physiological Parameters in Dynamic WBAN Channels. IEEE Trans. Antennas Propag. 2014, 62, 5268-5281.

Mwitende, Gervais, lkram Ali, Nabeil Eltayieb, Baocang Wang, and Fagen Li. "Authenticated key agreement for blockchain-based WBAN." Telecommunication Systems (2020): 1-19.

Nakamoto, S. Bitcoin: a peer-to-peer electronic cash system, 2008, bitcoin.org/bitcoin.pdf Naranjo, P. G., M. Shojafar, H. Mostafaei, Z. Pooranian, E. Baccarelli, P-SEP: a prolong stable election routing algorithm for energy-limited heterogeneous fog-supported wireless sensor networks, J Supercomput, 1-23 (2016)

Narwal, Bhawna, and Amar Kumar Mohapatra. "SAL-MAKA: Secured, Anonymity Preserving and Lightweight Mutual Authentication and Key Agreement Scheme for WBAN." Int. J. Sensors, Wireless Comm. And Control 10 (2020): 1.

Nessa, A.; Kadoch, M.; Rong, B. Joint Network Channel Fountain Scheme for Reliable Communication in Wireless Networks. In Proceedings of the 2014 Int. Conf Computing, Networking and Comm. (ICNC), Honolulu, HI, USA, 3-6 Feb. 2014; pp. 206-210.

Nguyen, Ngu, Arne BrUsch, Dominik SchUrmann, Stephan Sigg, and Lars Wolf. "Demo of BANDANA-Body Area Network Device-to-device Authentication using Natural gAit." In 2018 IEEE Int. Conf Pervasive Computing and Comm. Workshops (PerCom Workshops), pp. 421-423. IEEE, 2018.

Nugent, T.; Upton, D.; Cimpoesu, M. Improving data transparency in clinical trials using blockchain smart contracts. F1000Research 2016, 5, 2541.

Office for Civil Rights, United State Department of Health and Human Services. Medical Privacy. National Standards of Protect the Privacy of Personal-Health-Information www.hhs.gov/ocr/privacy/hipaa/administrative/privacyrule/index.html Okamoto, T, Takashima, K. Fully secure functional encryption with general relations from the decisional linear assumption. In: Proceedings of the 30th Conf advances in cryptology (CRYPTO'10), Santa Barbara, CA, 15-19 Aug. 2010, pp. 191-208. Berlin: Springer.

Oliveira, M T, Reis, L H A, Carrano, R C, et al. Towards a blockchain-based secure electronic medical record for healthcare applications. In: Proceedings of the ICC 2019-2019 IEEE Int. Conf Comm. (ICC'19), Shanghai, China, 20-24 May 2019. New York: IEEE.

Ostrovsky, R, Sahai, A, Waters, B. Attribute-based encryption with non-monotonic access structures. In: Proceedings of the 14th ACM Conf computer and Comm. security (CCS'07), Alexandria, VA, 28-31 Oct. 2007, pp. 195-203. New York: ACM.

Park, J. H.; Park, J. H. Blockchain security in cloud computing: Use cases, challenges, and solutions. Symmetry 2017, 9, 164.

Patel, M.; Wang, J. Applications, Challenges, and Prospective in Emerging Body Area Networking Technologies. IEEE Wirel. Commun. 2010, 17, 80-88.

Pathania, S., N. Bilandi, Security issues in wireless body area network, Int J Comput Sci Mobile Comput, 3 (4) (2014), pp. 1171-1178

Pejic, I. Blockchain Babel The Crypto Craze and the Challenge to Business; Kogan Page, London, U K, 2019.

Perrig, A., R. Szewczyk, J. D. Tygar, V. Wen, D. E. Culler, SPINS: security protocols for sensor networks, Wireless Netw, 8 (5) (2002), pp. 521-534

Poslad, Stefan (2009). Ubiquitous Computing Smart Devices, Smart Environments and Smart Interaction. Wiley. ISBN 978-0-470-03560-3.

Pramanik, Pijush Kanti Dutta, Anand Nayyar, and Gaurav Pareek. "WBAN: Driving e-healthcare Beyond Telemedicine to Remote Health Monitoring: Architecture and Protocols." In Telemedicine Technologies, pp. 89-119. Academic Press, 2019.

Puliafito, C, Mingozzi, E, Anastasi, G. Fog computing for the internet of mobile things: issues and challenges. In: Proceedings of the 2017 IEEE Int. Conf smart computing (SMARTCOMP'17), Hong Kong, 29-31 May 2017, pp. 1-6. New York: IEEE.

Qin, B D, Deng, R H, Liu, S L, et al. Attribute-based encryption with efficient verifiable outsourced decryption. IEEE Trans Inf Foren Sec 2015; 10(7): 1384-1393.

Qu, Yating, Guoqiang Zheng, Huahong Ma, Xintong Wang, Baofeng Ji, and Honghai Wu. "A survey of routing protocols in WBAN for healthcare applications." Sensors 19, no. 7 (2019): 1638.

Rahman, A. F., R. Ahmad, S. N. Ramli, Forensics readiness for wireless body area network (WBAN) system, The 16th IEEE Int. Conf advanced communication technology (2014), pp. 177-180

Rahman, M D A, Hossain, M S, Loukas, G, et al. Blockchain-based mobile edge computing framework for secure therapy applications. IEEE Access 2018; 6: 72469-72478.

Rajalakshmi, Selvaraj, Kuthadi Venu Madhav, Ranjan Abhishek, and Yedavalli Venkata Raghava. "Collaborative Remote Patient Monitoring System Using IEEE 802.15. 4 Wireless Body Area Networks."

Ramaswamy, Sangeetha, and Jasmine Norman. "Social and QoS based trust model for secure clustering for wireless body area network." The Int. J. Electrical Engineering & Education (2020): 0020720920953133.

Ramli, S. N., R. Ahmad, M. F. Abdollah, E. Dutkiewicz, A biometric-based security for data authentication in wireless body area network (wban), In the 15th Int. Conf advanced communication technology (ICACT) (2013), pp. 998-1001

Rashwand, S.; Mišić, J. Channel and Error Modeling for Wireless Body Area Networks. Mob. Netw. Appl. 2014, 19, 276-286.

Rehman, O. U., N. Javaid, A. Bibi, Z. A. Khan, Performance study of localization techniques in wireless body area sensor networks, 11th IEEE Int. Conf trust, security and privacy in computing and Comm. (2012), pp. 1968-1975

Ren, Yongjun, Yan Leng, Fujian Zhu, Jin Wang, and Hye-Jin Kim. "Data storage mechanism based on blockchain with privacy protection in wireless body area network." Sensors 19, no. 10 (2019): 2395.

Reusens, E.; Joseph, W.; LatrÉ, B.; Braem, B.; Vermeeren, G.; Tanghe, E.; Martens, L.; Moerman, I.; Blondia, C. Characterization of On-Body Communication Channel and Energy Efficient Topology Design for Wireless Body Area Networks. IEEE Trans. Inf. Technol. Biomed. 2009, 13, 933-945.

Rifi, Nabil, Elie Rachkidi, Nazim Agoulmine, and Nada Chendeb Taher. "Towards using blockchain technology for IoT data access protection." In 2017 IEEE 17th Int. Conf Ubiquitous Wireless Broadband (ICUWB), pp. 1-5. IEEE, 2017.

Roca, D, Milito, R, Nemirovsky, M, et al. Tackling IoT ultra large scale systems: fog computing in support of hierarchical emergent behaviors. In: Rahmani, A, Liljeberg, P, Preden, J S, et al. (eds) Fog computing in the Internet of Things. Cham: Springer, 2018, pp. 33-48.

Rocker, C., M. Ziefle, E-health, assistive technologies and applications for assisted living: challenges and solutions, Med Inform Sci Ref (2011), pp. 23-48

Rocker, C., M. Ziefle, E-health, assistive technologies and applications for assisted living: challenges and solutions, Med Inform Sci Ref, 392 (2011), ISBN13: 9781609604691

Sagar, Anil Kumar, Shivangi Singh, and Avadhesh Kumar. "Energy-aware WBAN for health monitoring using critical data routing (CDR)." Wireless Personal Comm. (2020): 1-30.

Sahai, A, Waters, B. Fuzzy identity-based encryption. In: Proceedings of the 24th Int. Conf theory and applications of cryptographic techniques (EUROCRYPT'05), Aarhus, 22-26 May 2005, pp. 457-473. Berlin: Springer.

Saleem, S., S. Ullah, K. S. Kwak, A study of IEEE 802.15.4 security framework for wireless body area networks, Sensors, 11 (2) (2011), pp. 1383-1395

Saleem, S., S. Ullah, K. S. Kwak, Towards security issues and solutions in wireless body area networks, The 6th IEEE Int. Conf networked computing (INC) (2010), pp. 1-4

Salem, O., A. Guerassimov, A. Mehaoua, A. Marcus, B. Furht, Anomaly detection in medical wireless sensor networks using SVM and linear regression models, Int J E-Health Med Commun (IJEHMC), 5 (1) (2014), pp. 20-45

Sana Ullah, Henry Higgins, Bart Braem, Benoit Latre, Chris Blondia, Ingrid Moerman, Shahnaz Saleem, Ziaur Rahman and Kyung Sup Kwak, A Comprehensive Survey of Wireless Body Area Networks: On PHY, MAC, and Network Layers Solutions, J. Medical Systems (Springer), 2010. doi:10.1007/s10916-010-9571-3.

Särestöniemi, Mariella, Carlos Pomalaza-Ráez, Zhuming Bi, Timo Kumpuniemi, Chaïmaá Kissi, Marko Sonkki, Matti Hämäläinen, and Jari Iinattit. "Comprehensive study on the impact of sternotomy wires on UWB WBAN channel characteristics on the human chest area." IEEE Access 7 (2019): 74670-74682.

Särestöniemi, Mariella, Chaïmaâ Kissi, Carlos Pomalaza Raez, Matti Hämäläinen, and Jari Iinatti. "Impact of the antenna-body distance on the WBAN channel characteristics." In 2019 13th Int. Symp Medical Information and Communication Technology (ISMICT), pp. 1-6. IEEE, 2019.

Sari, Arif. "Use of Blockchain in Strengthening Cybersecurity And Protecting Privacy." (2018).

Sari, L.; Aditya, A. Raptor Code for Energy-Efficient Wireless Body Area Network Data Transmission. Telkomnika 2015, 13, 277.

Schmidt R, Norgall T, Mörsdorf J, Bernhard J, von der Grün T (2002). "Body Area Network BAN—a key infrastructure element for patient-centered medical applications". Biomed Tech. 47 (1): 365-8. doi:10.1515/bmte.2002.47.s1a.365. PMID 12451866.

Schürmann, Dominik, Arne Brüsch, Stephan Sigg, and Lars Wolf. "BANDANA—Body area network device-to-device authentication using natural gAit." In 2017 IEEE Int. Conf Pervasive Computing and Comm. (PerCom), pp. 190-196. IEEE, 2017.

Schwiebert, L.; Gupta, S. K.; Weinmann, J. Research Challenges in Wireless Networks of Biomedical Sensors. In Proceedings of the MobiCom '01 7th Int. Conf Mobile Computing and Networking, Rome, Italy, 16-21 Jul. 2001; ACM: New York, NY, USA, 2001; pp. 151-165.

Semiconductor, Z. ZL70101 Medical Implantable RF Transceiver Data Sheet. 2007. www.zarlink.com/zarlink/.

Shahbazi, Zeinab, and Yung-Cheol Byun. "Towards a Secure Thermal-Energy Aware Routing Protocol in Wireless Body Area Network Based on Blockchain Technology." Sensors 20, no. 12 (2020): 3604.

Sharma, D. A., Wireless health care monitoring system with data security and privacy, Int J Res Comput Eng Electron, 2 (2) (2013)

Sharma, L.; Garg, P. K.; Khatri, S. K. Smart E-Healthcare with Internet of Things: Current Trends, Challenges, Solutions, and Technologies. In From Visual Surveillance to Internet of Things: Technology and Applications; CRC: Boca Raton, FL, USA, 2019; p. 215.

Shi, Shuyun, Debiao He, Li Li, Neeraj Kumar, Muhammad Khurram Khan, and Kim-Kwang Raymond Choo. "Applications of blockchain in ensuring the security and privacy of electronic health record systems: A survey." Computers & Security (2020): 101966.

Shrivastava G, Sharma K, Rai S., The detection & defense of DoS&DDos attack: a technical overview. In: Proceeding of ICC, vol. 27; 2010. p. 28.

Shubbar, S. Ultrasound Medical Imaging Systems Using Telemedicine and Blockchain for Remote Monitoring of Responses to Neoadjuvant Chemotherapy in Women's Breast Cancer: Concept and Implementation. Ph.D. Thesis, Kent State University, Kent, OH, USA, 2017.

Siddiqui, M. A., M. B. Kamal, H. Moinuddin, Towards the development of cross layer approach for energy efficiency and mobile wireless body area networks, Int J Comp. Inform Technol (2013), pp. 542-547

Somasundaram, M., R. Sivakumar, Security in wireless body area networks: a survey, Int. Conf advancements in information technology ICBMG, IPCSIT, Singapore (2011), p. 20

Steine, Marcel, Cuong Viet Ngo, Ramon Serna Oliver, Marc Geilen, Twan Basten, Gerhard Fohler, and Jean-Dominique Decotignie. "Proactive reconfiguration of wireless sensor networks." In Proceedings of the 14th ACM Int. Conf Modeling, analysis and simulation of wireless and mobile systems, pp. 31-40.2011.

Sun, J., X. Zhu, Y. Fang, Preserving privacy in emergency response based on wireless body sensor networks, IEEE Conf global telecommunications (GLOBECOM) (2010), pp. 1-6

Sun, SF, Lyu, C, Gu, D W, et al. Towards efficient, secure, and fine-grained access control system in MSNs with flexible revocations. Int J Distrib Sens Netw 2015; 11: 857405.

Sundararajan, T. V., A. Shanmugam, A novel intrusion detection system for wireless body area network in health care monitoring, J Comput Sci, 6 (11) (2010), p. 1355

Tachtatzis, C., F. Di Franco, D. C. Tracey, N. F. Timmons, J. Morrison, An energy analysis of IEEE 802.15. 6 scheduled access modes for medical applications, Int. Conf Ad Hoc networks, Springer, Berlin Heidelberg (2011), pp. 209-222

Taha, Mustafa Sabah, Mohd Shafry Mohd Rahim, Mohammed Mandi Hashim, and Fadil Abass Johi. "Wireless body area network revisited." Int. J. of Engineering & Technology 7, no. 4 (2018): 3494-3504.

Tama, Bayu Adhi, Bruno Joachim Kweka, Youngho Park, and Kyung-Hyune Rhee. "A critical review of blockchain and its current applications." In 2017 Int. Conf Electrical Engineering and Computer Science (ICECOS), pp. 109-113. IEEE, 2017.

Tang, S.; Cheng, J.; Sun, C.; Suzuki, R.; Obana, S. Turbo Network Coding for Efficient and Reliable Relay. In Proceedings of the 2008 11th IEEE Singapore Int. Conf Communication Systems, Guangzhou, China, 19-21 Nov. 2008; pp. 1603-1608. IEEE Standard for Local and Metropolitan Area Networks—Part 15.6: Wireless Body Area Networks; IEEE Std 802.15.6-2012; IEEE, 2012; pp. 1-271.

Tang, S.; Cheng, J.; Sun, C.; Suzuki, R.; Obana, S. Turbo Network Coding for Efficient and Reliable Relay. In Proceedings of the 2008 11th IEEE Singapore Int. Conf Communication Systems, Guangzhou, China, 19-21 Nov. 2008; pp. 1603-1608.

Taparugssanagorn, A.; Ono, F.; Kohno, R. Network Coding for Non-Invasive Wireless Body Area Networks. In Proceedings of the 2010 IEEE 21st Int. Symp Personal, Indoor and Mobile Radio Comm. Workshops (PIMRC Workshops), Istanbul, Turkey, 26-30 Sep. 2010; pp. 134-138.

Tellambura, C. Cooperative Two-Way Wireless Relay Communication: Design, Analysis and Implementation, 1st ed.; Wiley Publishing: Hoboken, NJ, USA, 2014.

Tewari, A., P. Verma, Security and privacy in E-healthcare monitoring with WBAN: a critical review, Int J Comput Appl, 136 (11) (2016)

Thakur, Monika, and Manjot Kaur. "Ad-hoc network routing protocols for wireless body area network." In Proceedings of the Third Int. Conf Advanced Informatics for Computing Research, pp. 1-7. 2019.

Tian, Y., Y. Peng, X. Peng, H. Li, An attribute-based encryption scheme with revocation for fine-grained access control in wireless body area networks, Int J Distrib Sens Netw, 11 (2014), p. 2014

Toorani, Mohsen (2015). "On Vulnerabilities of the Security Association in the IEEE 802.15.6 Standard". Financial Cryptography and Data Security. Lecture Notes in Computer Science. 8976. pp. 245-260. arXiv:1501.02601. doi:10.1007/978-3-662-48051-9_18. ISBN 978-3-662-48050-2.

Toorani, Mohsen (2015). "On Vulnerabilities of the Security Association in the IEEE 802.15.6 Standard". Financial Cryptography and Data Security. Lecture Notes in Computer Science. 8976. pp. 245-260. arXiv:1501.02601. doi:10.1007/978-3-662-48051-9_18. ISBN 978-3-662-48050-2.

Tripathi, Gautami, Mohd Abdul Ahad, and Sara Paiva. "S2HS-A blockchain based approach for smart healthcare system." In Healthcare, vol. 8, no. 1, p. 100391. Elsevier, 2020.

Ullah, S., H. Higgins, B. Braem, B. Latre, C. Blondia, I. Moerman, S. Saleem, Z. Rahman, K. S. Kwak, A comprehensive survey of wireless body area networks, J Med Syst, 36 (3) (2012), pp. 1065-1094, Ullah, S., M. Mohaisen, M. A. Alnuem, A review of IEEE 802.15.6 MAC, PHY, and security specifications, Int J Distrib Sens Netw (2013), p. 24

Ullah, Zahid, Imran Ahmed, Fakhri Alam Khan, Muhammad Asif, Muhammad Nawaz, Tamleek Ali, Muhammad Khalid, and Fahim Niaz. "Energy-efficient Harvested-Aware clustering and cooperative Routing Protocol for WBAN (E-HARP)." IEEE Access 7 (2019): 100036-100050.

Vierhout, P. a. M.; Konstantas, D.; Bults, Richard G. A.; Jones, Valerie M. (2001-09-18). "Body Area Networks for Healthcare" (PDF).

BSN website, ICL London, vip.doc.ic.ac.uk/bsn/m621.html

Waheed, Maham, Rizwan Ahmad, Waqas Ahmed, Micheal Drieberg, & Muhammad Mahtab Alam. "Towards efficient wireless body area network using two-way relay cooperation." Sensors 18(2) (2018): 565.

Wang, H., H. Fang, L. Xing, M. Chen, An integrated biometric-based security framework using wavelet-domain HMM in wireless body area networks (WBAN), IEEE Int. Conf Comm. (ICC) (2011), pp. 1-5

Wang, H., Z. Zhang, X. Lin, H. Fang, Socialized WBANs in mobile sensing environments, IEEE Network, 5 (2014), pp. 91-95

Wang, J., Z. Zhang, K. Xu, Y. Yin, P. Guo, A research on security and privacy issues for patient related data in medical organization system, Int J Security Appl, 7 (4) (2013), pp. 287-298

Wang, J., Z. Zhang, X. Yang, L. Zuo, J. U. KimData security and privacy of e-healthcare in electronic medical environment, ASTL SIA, 22 (2013), pp. 92-98

Wang, Junchao, Kaining Han, Anastasios Alexandridis, Zhiyu Chen, Zeljko Zilic, Yu Pang, Gwanggil Jeon, and Francesco Piccialli. "A blockchain-based eHealthcare system interoperating with WBANs." Future Generation Computer Systems 110 (2020): 675-685.

Wang, Q H, Wang, H Q, Wang, Y F, et al. A distributed access control with outsourced computation in fog computing. Secur Commun Netw 2019; 2019: 6782753.

Waters, B. Ciphertext-policy attribute-based encryption: an expressive, efficient, and provably secure realization. In: Proceedings of the 14th Int. Conf practice and theory in public key cryptography Conf public key cryptography (PKC'11), Taormina, 6-9 Mar. 2011, pp. 53-70. Berlin: Springer.

Westerlund, Magnus, Mats Neovius, and Goran Pulkkis. "Providing Tamper-Resistant Audit Trails with Distributed Ledger based Solutions for Forensics of IoT Systems using Cloud Resources." Int. J. on Advances in Security Volume 11, Number 3 & 4, 2018 (2018).

Wheeler, D. J., R. M. Needham, TEA, a tiny encryption algorithm, Int. workshop on fast software encryption, Springer, Berlin Heidelberg (1994), pp. 363-366 www.ucc.ie/en/media/research/misl/2009publications/pervasive09.pdf

Xia, Q.; Sifah, E. B.; Smahi, A.; Amofa, S.; Zhang, X. BBDS: Blockchain-based data sharing for electronic medical records in cloud environments. Information 2017, 8, 44.

Xiong, H., Cost-effective scalable and anonymous certificateless remote authentication protocol, IEEE Trans Inf Forensics Secur (2014), pp. 2327-2339

Xu, Zisang, Cheng Xu, Haixian Chen, and Fang Yang. "A lightweight anonymous mutual authentication and key agreement scheme for WBAN." Concurrency and Computation: Practice and Experience 31, no. 14 (2019): e5295.

Xue, Y.; Bogdan, P. Constructing compact causal mathematical models for complex dynamics. In Proc. 8th Int. Conf Cyber-Physical Systems, Pittsburgh, PA, USA, 18-21 Apr. 2017; pp. 97-107.

Xue, Y.; Rodriguez, S.; Bogdan, P. A spatio-temporal fractal model for a CPS approach to brain-machine-body interfaces. In Proceedings of the 2016 Design, Automation & Test in Europe Conf. & Exhibition (DATE), Dresden, Germany, 14-18 Mar. 2016; pp. 642-647.

Yang, Jinhong, Md Mehedi Hassan Onik, Nam-Yong Lee, Mohiuddin Ahmed, and Chul-Soo Kim. "Proof-of-familiarity: A privacy-preserved blockchain scheme for collaborative medical decision-making." Applied Sciences 9, no. 7 (2019): 1370.

Yazdandoost K Y, Sayrafian-Pour K., Channel model for body area network (BAN). IEEE P802, 15, 08-0780; 2009. math.nist.gov/mcsd/savg/papers/15-08-0780-09-0006-tg6-channel-model.pdf Yazdandoost, K.; Sayrafian, K. Channel Model for Body Area Network (BAN). In IEEE P802.15-08-0780-09-0006; 2007; IEEE 802.15. Working Group Document. math.nist.gov/mcsd/savg/papers/15-08-0780-09-0006-tg6-channel-model.pdf.

Yoo, Jerald. "Body coupled communication: Towards energy-efficient body area network applications." In 2017 IEEE Int. Symp Radio-Frequency Integration Technology (RFIT), pp. 244-246. IEEE, 2017.

Yousaf, S.; Javaid, N.; Khan, Z. A.; Qasim, U.; Imran, M.; Iftikhar, M. Incremental Relay Based Cooperative Communication in Wireless Body Area Networks. Procedia Comput. Sci. 2015, 52, 552-559.

Yousaf, S.; Javaid, N.; Qasim, U.; Alrajeh, N.; Khan, Z. A.; Ahmed, M. Towards Reliable and Energy-Efficient Incremental Cooperative Communication for Wireless Body Area Networks. Sensors 2016, 16, 284.

Yue, X.; Wang, H.; Jin, D.; Li, M.; Jiang, W. Healthcare data gateways: Found healthcare intelligence on blockchain with novel privacy risk control. J. Med. Syst. 2016, 40, 218.

Zhang, G. H., C. C. Poon, Y. Li, Y. T. Zhang, A biometric method to secure telemedicine systems, Int. Conf. of the IEEE engineering in medicine and biology society (2009), pp. 701-704

Zhang, P.; White, J.; Schmidt, D. C.; Lenz, G.; Rosenbloom, S. T. FHIRChain: Applying blockchain to securely and scalably share clinical data. Comput. Struct. Biotechnol. J. 2018, 16, 267-278.

Zhang, Y, Wen, J T. The IoT electric business model: using blockchain technology for the Internet of Things. Peer to Peer Netw Appl 2017; 10(4): 983-994.

Zhang, Y H, Deng, R, Liu, X M, et al. Outsourcing service fair payment based on blockchain and its applications in cloud computing. IEEE Trans Sery Comput. Epub ahead of print 7 Aug. 2018. DOI: 10.1109/TSC.2018.2864191

Zhang, Y H, Deng, R, Zheng, D, et al. Efficient and robust certificateless signature for data crowdsensing in cloud-assisted industrial IoT. IEEE Trans Ind Inform 2019; 15: 5099-5108.

Zhang, Y H, Deng, R H, Liu, X M, et al. Blockchain based efficient and robust fair payment for outsourcing services in cloud computing. Inform Sciences 2018; 462: 262-277.

Zhao, Z., An efficient anonymous authentication scheme for wireless body area networks using elliptic curve cryptosystem, J Med Syst, 38 (2) (2014), pp. 1-7

Zhao, Z., An efficient anonymous authentication scheme for wireless body area networks using elliptic curve cryptosystem, J Med Syst, 38 (2) (2014), pp. 1-7

Zheng, Ling, Chunjian Xiao, Fei Chen, and Yonghong Xiao. "Design and research of a smart monitoring system for 2019-nCoV infection-contact isolated people based on blockchain and Internet of things technology." (2020).

Zhou, J., Z. Cao, X. Dong, N. Xiong, A. V. Vasilakos, 4S: a secure and privacy-preserving key management scheme for cloud-assisted wireless body area network in m-healthcare social networks, Inf Sci, 314 (2015), pp. 255-276

Zhou, Mingfang, Xiaojun Wang, and Mingxing Luo. "Blockchain-Based Authentication in Wireless Sensor Networks." In Int. Conf Artificial Intelligence and Security, pp. 604-615. Springer, Singapore, 2020.

Zhu, L H, Wu, Y L, Gai, K K, et al. Controllable and trustworthy blockchain-based cloud data management. Future Gener Comput Syst 2019; 91: 527-535.

Zuo, C, Shao, J, Wei, G Y, et al. CCA-secure ABE with outsourced decryption for fog computing. Future Gener Comput Syst 2018; 78: 730-738.

According to their role in the network coordinator, there are three types of nodes in WBANs: This node acts as a gateway to the outside world, another WBAN, a trust center or an access coordinator. The PDA is the coordinator of a WBAN in which all other nodes can communicate. End Nodes: This type of nodes is restricted to perform their entrenched application, but they do not have the capability to transmit messages to other nodes. Relay: These nodes represent intermediate nodes and they are called relays. The relay node consists of parent and child nodes and relays messages. If a node is at a foot, then it is required for any data sent to be relayed by other nodes before reaching to the PDA. Also, these types of nodes can sense data from other nodes.

Actuators act on the information from the sensors based on prescribed instructions. The actuator mechanism is prepared with integral reservoir and administers proper doses of a hypoglycemic agent to support the glucose level measurements, For instance, patients with diabetes. FIG. 1 typically shows the placement of sensors that communicate by means of a WBAN. It can be further employed in several other fields and applications such as monitoring pollution levels, physiological and medical monitoring, human-computer interaction, education, and entertainment. A smartphone can remotely access the information sensed by the sensors.

Medical sensors sense the patient's body conditions and send messages to the doctor or the hospital server. While sending these messages, the sensors may be attacked. For instance, an adversary may capture the data from the wireless channels and modify the results. He/She may later pass the attacked data to the doctor or the server. This could imperil the life of the patients. Given the vulnerability of patient privacy, security should be paramount when considering using technology in the healthcare setting.

According to the IEEE 802.15.6 working group, WBANs are considered to work in a one or two-hop star topology with the node being placed in the center of the star technology. There are two types of data transmission, including (a) transmission from the device to the coordinator and (b) transmission from the coordinator to the device. There are two ways of communication in start technology: Beacon mode and non-beacon mode. In the beacon mode method, the network coordinator is responsible for controlling the communication and its location in the center of the star topology. In order to allow device synchronization and network control, the network coordinator sends periodic beacons to define the start and the end of a super-frame, and the length of the beacon period can be identified by both the user and WBAN's standard. Non-beacon mode represents a node in the network capable of sending data to the coordinator. It also uses Carrier Sense Multiple Access with Collision Avoidance (CSMA/CA). The nodes need to power up and ask the coordinator to receive data when invited to participate in a communication.

The major security and privacy requirements to ensure the safety of a WBAN system and its extensive acceptance by its users are outlined as follows:

Data Confidentiality: Data confidentiality denotes the protection of confidential data from exposure that is considered a vital issue in a WBAN. Since WBAN nodes applied in medical situations are expected and relied upon to transmit delicate and private information about the status of a patient's well-being, their data must be protected from unauthorized access that could be hazardous to the patient life. This data can be "overheard" during transmission and can either damage the patient, the provider, or the system itself. Encryption can provide better confidentiality for this sensitive data by providing a shared key on a secured communication-channel between secured WBAN nodes and their coordinators.

Data Integrity: Data integrity refers to the measures taken to protect the content of a message, its accuracy and consistency. It applies to both single messages as well as streams of messages. However, data confidentiality does not protect data from external modifications. Information can be illicitly changed when data is transmitted to an insecure WBAN as an adversary that can easily moderate the patient's information before reaching the network coordinator. More specifically, modifications can be simply made by integrating some fragments, manipulating data within a packet, and then forwarding the packet to the PS. This interception and modification can lead to serious health concerns and even death in extreme cases. Consequently, it is imperative that the information not be accessible and altered by a potential adversary by applying authentication protocols.

Data Freshness: Data freshness techniques can effectively make certain that the integrity and confidentiality of data are protected from recording and replaying older data by an adversary and confuse the WBAN coordinator. It ensures that old data is not recycled and that its frames are correct. Two types of data freshness are currently in use: Strong freshness promises delay in addition to frame ordering, and weak freshness which is limited to frame ordering, but does not provides any delay guarantees. Strong freshness is required for synchronization when a beacon is being conveyed to the WBAN coordinator, and weak freshness is used for WBAN nodes with a low-duty cycle.

Availability of the network: It insinuates a medical practitioner with efficient access to a patient's information. Since such a system carries important, highly sensitive, and potentially lifesaving information, it is paramount that the network is available at all times for patients' usage in case of an emergency. For this, it is essential to switch the operations to another WBAN if availability loss occurs.

Data Authentication: Medical and non-medical applications may require data authentication. Thus, nodes within a WBAN must be able to verify that the information is sent from a known trust center and not an imposter. Therefore, the network and coordinator-nodes for all data calculate Message Authentication Code (MAC) by sharing an undisclosed key. Accurate calculation of a MAC code assures the network coordinator that the message is being conducted by a trustworthy node.

Secure Management: To deliver key distribution to a WBAN, the decryption and encryption operation requires secure control by the coordinator. The coordinator's role is to add and remove WBAN nodes in a secure way during node association and disassociation.

Dependability: The system must be reliable and dependable. A failure in retrieving the correct data represents another critical concern in WBANs as it may become a life-threatening matter for the patient. In order to address this issue, error-correcting code techniques can be used.

Secure Localization: Most WBAN applications need a correct estimation of the patient's location. Lack of tracking methods could let an attacker to transmit improper details such as, by replying with a fake signal about the patient's location.

Accountability: In the medical field, it is necessary for healthcare providers to safeguard patient health information. If a provider does not secure this information, or worse, abuses his or her responsibility for it, then he or she should be made accountable for this to discourage additional abuses.

Flexibility: The patient needs to have the flexibility of designating AP control of medical data within a WBAN. For instance, in the case of an emergency, authorization to interpret the patient's data could be given on demand to a different physician who is not necessarily listed as having permission. In another example, if a patient changes the hospital or a physician, it should be possible to transfer the access controls.

Privacy rules and compliance requirement: The need to secure private health information is a global concern. One of the most important privacy measures is to set out rules/policies who have the right to access the patient's sensitive data to protect the patient's privacy. Several regulations and acts are enlisted in health care provisions. Currently, there are different sets of regulations/policies for privacy all over the world. The American Health Insurance Portability and Accountability Act (HIPAA) comprises of a set of directions to for doctors, healthcare providers, and hospitals and is designed to ensure that an individual's health and medical records are secure. HIPAA outlines detailed precautions that must be taken to safeguard patient data when used for administrative or communication needs.

WBANs are vulnerable to a vast number of attacks and threats. WBAN are frequently open to several external threats and intrusions, which could hack into the network as shown in Fig. Thus, security and privacy issues should be addressed very well. Attacker may target the availability of a WBAN by capturing or incapacitating a particular node, which sometimes results in loss of a patient's life. For example, the adversary can capture or incapacitate an EEG sensor and sends false information to the physician. This could result in a hazardous life-threatening situation or even a death. An adversary can also use jamming and tampering.

An adversary can use jamming (radio frequency interference) on a few nodes to block the entire network. This method cannot block large networks, but since WBANs are generally small networks, not only chances of network blocking are quite high, but it also lead to packet loss. An adversary sometimes physically tampers WBANs. It is possible that an attacker could electronically interfere, damage, or supplant the WBAN to acquire a patient's personal health information. It can also use a flooding technique to exhaust the memory by repeatedly sending extra unnecessary packets, which the system cannot handle. This prevents legitimate users of the network from accessing the services or the resources. It can be done through a Denial of Service (DoS) attack that is meant not only to disrupt, subvert and destroy the network, but also to diminish the network's capability of providing the necessary emergency services.

TinySec represents a solution to attain link layer encryption and authentication of the data in biomedical sensors networks. This technique is link-layer security architecture for WSNs and is officially part of TinyOS release. In this system, a group key is used between sensor nodes, with secure encrypted data packets and a MAC being calculated for the entire packet. It relies on a single key by default, which is manually programmed into the sensors nodes before they are deployed. This provides a minimum level of security and cannot protect against physical node capture since it is shared.

WBANs have stringent resource constraints. Additionally, the system is challenged by a hugged and for security and privacy, not to mention their practicability and usability. WBAN security schemes are initially set up by symmetric cryptosystems due to shortage of resources. This system has issues with providing weak security comparatively as it is not resilient to physical compromise and delays in revealing the symmetric keys. In addition, the sensor's node's primary weakness is their limited computation capacity energy, communication rate, and memory space.

Ad hoc networks and security in WBANs thus pose interesting and unique challenges. For example, The typical low-power or micropower requirements limit both transmission energy and computational complexity of security algorithms. Further, because the communications inherently involve multiple parties, security may require the distribution of symmetric keys, leading to a large attack surface area with respect to multiple devices and initial key distribution.

Personal medical systems have various requirements, such as data sharing, data security and consistency, data reliability, and convenience]. These requirements of personal medical data are the most important for interaction with and collection of EMR. Traditional healthcare systems cannot meet these crucial requirements for an efficient process because they have no consistent and reliable structure in terms of data security, sharing, and access control models. Therefore, it is necessary to have a new secured system to enhance the data-access process under the privacy and security of government regulations to ensure accountability and monitoring of medical usage data. Blockchain is a secure and transparent distributed ledger, and it paves the way for a revolution in existing healthcare systems by integrating its unique features.

Blockchain is essentially a distributed ledger (database) that can be programmed to record online financial transactions so that they are secure and cannot be manipulated. In the blockchain, each transaction is digitally signed by participants to ensure its authenticity and security. The distributed ledger operates by consensus (smart contracts). Both parties agree at the ledger to put each transaction into a block and validate that block to add it to a chain. Each block contains data and information. Finally, that chain is protected using cryptography algorithms, and consequently, it cannot be manipulated or changed. Blockchain is a decentralized technology that ensures data security, and no one can manipulate transaction data because of its many replicas in different servers. Data resources stored in centralized servers are vulnerable to cybercrime. On the other hand, blockchain ensures data security and privacy by storing it in decentralized locations. Over the past few years, the market value of blockchain technology increased substantially. Blockchain technology is more trusted and secure than all other record-keeping systems. It is a distributed ledger where all nodes of the network share the same documentation. It is also used to increase efficiency and speed by automating the traditional process with blockchain technology. It also reduces costs because it does not require the buying and selling of products through third parties.

Over the past few years, many systems have helped digitize, share, and offer easy access to medical records to both patients and hospitals. In this section, we discuss a few blockchain-based EHR systems.

MedRec is the healthcare platform that provides decentralized record management, data sharing, and authorization among different users of the system. Patients can store, manage, and also authorize other stakeholders to access their records. The designed MedRec framework can store medical records on the blockchain database using a key-value format instead of a pointer to a data storage location. Blockchain-based healthcare platform Gem is designed and developed by Gem Health Network using Ethereum blockchain. The implemented system addresses the operational cost of data management. The proposed system also provides interoperability among various stakeholders to access the same information to maintain better healthcare services. Presently, researchers use patient healthcare information for research studies based on healthcare organizations. Healthbank is a platform that enables every patient to store and manage their medical data and provides healthcare data to researchers and pharmaceutical companies. The designed Healthbank system also provides incentives to patients for their contribution to the system. Blockchain-Based Data Sharing (BBDS) is a permissioned blockchain platform that enables secure, scalable data transaction encrypted with a cryptographic algorithm. The HDG (Healthcare Data Gateway) is a smartphone application gateway built over a blockchain-enabled cloud. A permissioned blockchain may be built using the Ethereum platform to provide a secure and safe remote patient-monitoring system. The designed platform is a secure real-time monitoring system that allows the stakeholder to participate and track their health records and provides remote patient monitoring. The system maintains a secure, safe, and up-to-date patient history. Ivan presented a secure health data storage system developed using a decentralized database based on blockchain technology. The system has the capability to store encrypted healthcare data publicly and use the system like a blockchain-based personal health record (PHR). Moreover, the PHR system also enables the patient not only to access and monitor their data but also allows the patient to share the data with other healthcare personnel. A blockchain-based remote treatment and diagnosis of cancer patients were developed. The system uses a smart contract to ensure the validity and security of patient health information. A telemonitoring system handles securely shared specialized patient healthcare data at different healthcare centers. Mannaro et al. proposed a blockchain-based online dermatology system for assisting patients suffering from skin diseases. Similarly, a blockchain-based ProActive Aging system was proposed that provides support for aging people. The system is capable of monitoring patients chronic diseases, e.g., cancer, etc. Blockchain is an ideal technology for remote patient monitoring and support. MediBloc is a blockchain-based EMR platform based on the decentralized open-source protocol used to store healthcare data for healthcare providers, researchers, and patients. The application is developed based on the Ethereum Virtual Machine (EVM), which uses a points-based system to evaluate user participation. Afterward, the coin token uses medical transactions as an insurance payment. Healthcoin is a blockchain-based permission-less currency which is used to verify healthcare transactions.

Gupta et al. presented a model based on unknown inputs with minimal sensing for fractional dynamics. The proposed system processes systems like neurophysiological signals, including ECG and $SPO_2$. The main contribution of this system is an alternative approach that finds the optimal parameter for the model, retrieves the state of the presented scheme, and is based on optimal parameters and states. They compute a set of recoverable parameters. In another study, Gupta et al. describe an approach for comparing existing ECG-based brain interfacing with a current time-varying sophisticated approach that uses invasive and non-invasive techniques based on machine-learning algorithms. The system accuracy in terms of classification is more involved with having fewer training samples. Moreover, the designed system uses EEG datasets to evaluate the system methodology.

Xue et al. proposed a sophisticated mathematical approach for constructing complex dynamics. The proposed system uses a framework based on casual inference integrated with a probabilistic model to distinguish short- and long-range dynamics dependencies. Moreover, we also use the entropy function for the multi-point probability that differentiates between complex and memoryless time-dependency structures. Similarly, Xue presented a bream machine body interface for a cyber-physical system using the spatiotemporal fractal approach. The developed approach uses a mathematical model for capturing spatiotemporal cross dependencies in terms of coupled processes and brain-machine body interfaces.

Ghorbani et al. presented a mathematical model integrated with a hardware module for artificial pancreas design. The performance of the system is measured by comparing real-world measurements using a conventional nonfractal model. Moreover, we also prove the practicability of silicon realization of the developed optimal control algorithm using a field-programming gate array platform.

Jamil et al proposes a healthcare IoT blockchain platform, which is a modular architecture in which each layer is decoupled from other layers. The decoupled feature enables the developers to add and remove any module without affecting the rest of the system. The developed system is comprised of four layers, i.e., application layer, IoT blockchain service layer, connectivity layer, and healthcare IoT physical layer. The proposed healthcare IoT physical layer comprises various healthcare devices with the capabilities of computing, data storage, and communication. The connectivity layer aims to provide routing management because physical healthcare sensing devices have no global internal protocol. The connectivity layer is also responsible for providing services, including security management, message brokers, and network management. Similarly, the IoT blockchain service layer is capable of organizing blockchain-related services that include, e.g., consensus, identity management, distributed ledger technology (DLT), and peer-to-peer communication (P2P), etc. The DLT is a consensus of shared, synchronized, and replicated digital data distributed across the entire blockchain network, where every participant has their copy of the ledger. Moreover, the DLT also stores and secures the vital-sign sensing data provided by the healthcare sensor. Any change in the DLT is reflected in all copies across the entire blockchain. The big data module enables blockchain to store data online, which makes blockchain more efficient and reliable. In a blockchain, massive transactional data from different parties are stored in structured forms in ledgers, which is further used in the analysis process. Moreover, all parties in blockchain have granted access to a single network, making it easy for the client to access these details. The smart contract is a piece of computer code considered to be a computer protocol triggered by the external client application to manage, access, and modify the ledger. Additionally, a smart contract is also initiated and installed on each peer in the network. Event management in the proposed system is responsible for sending a notification every time a new block is added to the ledger against a predefined condition being satisfied. The application programming interface (API) exposes the developed services provided by the designed medical blockchain platform through which the client accesses the application and manages the blockchain network. Blockchain technology allows users to communicate and securely share their resources and assets. Communication in the blockchain is based on a P2P network, consensus algorithms, and asymmetric ciphers. Lastly, the application layer is the top layer, a user interface and responsible for vital-sign data visualization and used to manage and control healthcare devices.

The system is comprised of the technical infrastructure that exposes the smart contract and DL through a user service framework as a service to the blockchain. The medical blockchain model comprises a reliable authorized peer, where every individual peer holds the replica of the ledger for the blockchain network to preserve the uniformity of the distributed ledger. The distributed ledger consists of a chain of blocks to store the immutable transactions in the blocks and a data lake to store and maintain the medical data related to healthcare sensors and other related participation of the network. The blockchain network is used as transaction logs that record and maintain all the changes that occur in the data lake. The data lake acts as an off-chain ledger (database) used to store the following details of patients, such as the updated values of vital signs and healthcare device information, etc. The off-chain database is further used for data analytics and other healthcare services, e.g., critical care, intensive care, and preventive care response. Furthermore, the client application uses the REST API to manage the blockchain network by submitting a transaction request, e.g., task generation service, and user and device registration. Every participant is required to enroll in blockchain before submitting their transaction. The enrollment certificate contains a private key that is required to sign the transaction. The transaction in the blockchain network is defined as reading and writing data from the distributed ledger. The participant (i.e., patient, nurse, and doctor) can submit a transaction either to generate a new task or to get a response from the previously generated task through the healthcare IoT server. Afterward, the healthcare IoT server sends a request to the blockchain network to perform a task according to the request. Furthermore, the healthcare IoT server also transfers tasks generated from the client to fetch real-time vital-sign information, device information, and device status. The gathered information, which includes vital-sign data, device information, and device status, is stored in the ledger along with the specific patient data defined according to the smart contract. Finally, the notification is generated to the concerned participant upon the successful transaction.

Users can generate tasks to perform operations (e.g., read heart rate from the ECG sensor and read the airflow rate using a nasal airflow sensor) on healthcare sensors. Moreover, users can also specify certain tasks based on the requirement. The specific task request is sent to the healthcare IoT server, which further translates the request into the defined protocol of the sensor and transfers the request to the specified sensor to perform operations. The target sensor behaves according to the request and returns vital-sign data to the healthcare IoT server as well as to the blockchain network. This vital-sign information in the form of results is displayed to the user in the client application. Moreover, the computed result is also sent as a payload of the transaction to the blockchain network. Finally, the vital-sign information is appended to the distributed ledger of each peer. It also sends the notification in the case of exceeding the predefined threshold, e.g., in the case of a body temperature sensor, the normal range is between 97.7° F. and 99.5° F.

Jamil et al. implemented a case study in which the patient is equipped with healthcare sensors to monitor vital signs using blockchain-based technology on the Hyperledger Fabric framework. The model aims to establish communication between IoT resources, the healthcare IoT server, and the blockchain network. The IoT devices are healthcare devices, such as ECG sensors, sphygmomanometer sensors, EMG sensors, $SpO_2$ sensors, body temperature sensors, etc. A Raspberry Pi is equipped with Libelium e-Health toolkit that acts as an IoT gateway, which routes the vital-sign data to the healthcare IoT server. The healthcare IoT server is responsible for processing requests and providing the required sensors reading to the client through the blockchain network. The processing includes but is not limited to filtering the data, checking whether the vital-sign reading is normal or abnormal, and laying out the data in a format that can be effectively used by the client devices. The proposed system uses the Hyperledger Fabric framework to establish the blockchain network with four peers with an orderer node working as an image in a docker container. Every peer in the proposed blockchain network is comprised of data storage and smart contracts to write transactions to the blockchain ledger. The data storage is a DB couch act as a state database with rich query features, and also supports modeling of a smart contract as JavaScript Object Notation (JSON). Moreover, the Hyperledger composer-rest-server provides the functionality of the Representational State Transfer (REST) Application Programming Interface (API) to expose the services to the client application for further analysis. All the services written in the smart contract can be accessed through REST API using the client application. Additionally, the fabric client also uses the Google Remote Procedure Calls (gRPC) in order to communicate with the fabric network. The blockchain network also generated notifications for the client through WebSocket.

The smart contract is a computer program intended to enforce custom-designed functionalities in the system and compiled in the form of a business network archive (BNA). In the proposed system, we used Hyperledger composer to design and implement the smart contracts for the secure monitoring of patient vital signs. The Hyperledger Composer is an open-source framework specifically built for developing blockchain-based applications. The smart contract is comprised of four main parts—the model, transaction, query definition, and access control rules. The model file further contains participants and assets. The participants are the users of the system who are responsible for managing and interacting with the system. Similarly, assets are the valuable entities, services, or goods used between the participants and stored in blockchain registries.

Furthermore, transactions are logical operations defined in the smart contract that can interact with assets. The transactions are responsible for modifying the value of participants and assets in the blockchain network. The third part is Access Control Language (ACL), which aims to provide authentication and authorization to the participants within the network and define each participant's role in the business network domain model. Furthermore, in ACL, we defined the fourth and last part of the smart contract, which is the queries that are written in a separate file in the bespoke query language. The Hyperledger composer queries are used to retrieve customized data based on user requests from the world state database. The participants are doctors, patients, and nurses, whereas the assets are sensors, vital-sign readings, and patient health records. Finally, the transaction processor functions are getSensorReading, addSensor, UpdateSensor, Threshold Detection.

The BNA is further used to generate REST API, which interprets the restful services to the client application. The REST API is platform-independent and can be accessed from any platform with valid credentials. The purpose of creating the REST API is to establish communication between the BNA and the front-end client application. The designed REST API is comprised of three sub-parts—resource, verb, and action. The resource is the request URL, whereas the verb is the action, which is going to be performed on a particular resource, such as PUT, POST, GET, and DELETE. The REST APIs are based on HTTP protocol and comprise the following parameters in the header file: media type, verb, and base URI. The verbs are the action performed on the specific resources, such as POST, PUT, GET, and DELETE. Similarly, media type defines state transition elements, e.g., Application/JSON. Lastly, the URI determines the path of the request data entry, for instance, GET request to the resource URI like /api/VitalSignReading would return a list of vital-sign information from a specific healthcare sensor. In contrast, the POST request to the same URI will request the healthcare IoT server to accept the packet encrypted in the URI request.

A body area network (BAN), also referred to as a wireless body area network (WBAN) or a body sensor network (BSN), or a medical body area network (MBAN), is a wireless network of wearable computing devices. BAN devices may be embedded inside the body as implants, may be surface-mounted on the body in a fixed position, or may be accompanied devices which humans can carry in different positions, such as in clothes pockets, by hand, or in various bags. While there is a trend towards the miniaturization of devices, in particular, body area networks consist of several miniaturized body sensor units (BSUs) together with a single body central unit (BCU), larger decimeter (tab and pad) sized smart devices still play an important role in terms of acting as a data hub or data gateway and providing a user interface to view and manage BAN applications, in-situ. The development of WBAN technology started around 1995 around the idea of using wireless personal area network (WPAN) technologies to implement communications on, near, and around the human body. About six years later, the term "BAN" came to refer to systems where communication is entirely within, on, and in the immediate proximity of a human body. A WBAN system can use WPAN wireless technologies as gateways to reach longer ranges. Through gateway devices, it is possible to connect the wearable devices on the human body to the internet. This way, medical professionals can access patient data online using the internet independent of the patient location.

The rapid growth in physiological sensors, low-power integrated circuits, and wireless communication has enabled a new generation of wireless sensor networks, now used for purposes such as monitoring traffic, crops, infrastructure, and health. The body area network field is an interdisciplinary area that could allow inexpensive and continuous health monitoring with real-time updates of medical records through the Internet. A number of intelligent physiological sensors can be integrated into a wearable wireless body area network, which can be used for computer-assisted rehabilitation or early detection of medical conditions. This area relies on the feasibility of implanting very small biosensors inside the human body that are comfortable and that do not impair normal activities. The implanted sensors in the human body will collect various physiological changes in order to monitor the patient's health status no matter their location. The information will be transmitted wirelessly to an external processing unit. This device will instantly transmit all information in real-time to doctors throughout the world. If an emergency is detected, the physicians will immediately inform the patient through the computer system by sending appropriate messages or alarms. Currently, the level of information provided and energy resources capable of powering the sensors are limiting. While the technology is still in its primitive stage, it is being widely researched and, once adopted, is expected to be a breakthrough invention in healthcare, leading to concepts like telemedicine and mHealth becoming real.

A typical BAN or BSN may employ vital sign monitoring sensors, motion detectors (through accelerometers) to help identify the location of the monitored individual, and some form of communication to transmit vital signs and motion readings to medical practitioners or caregivers. A typical body area network kit will consist of sensors, a Processor, a transceiver, and a battery. Physiological sensors, such as ECG and SpO2 sensors, have been developed. Other sensors such as a blood pressure sensor, EEG sensor, and a PDA for BSN interface are under development.

The FCC has approved the allocation of 40 MHz of spectrum bandwidth for medical BAN low-power, wide-area radio links at the 2360-2400 MHz band. This allows off-loading MBAN communication from the already saturated standard Wi-Fi spectrum to a standard band. The 2360-2390 MHz frequency range is available on a secondary basis. The FCC will expand the existing Medical Device Radiocommunication (MedRadio) Service in Part 95 of its rules. MBAN devices using the band will operate under a 'license-by-rule' basis, eliminating the need to apply for individual transmitter licenses. Usage of the 2360-2390 MHz frequencies are restricted to indoor operation at healthcare facilities and are subject to registration and site approval by coordinators to protect aeronautical telemetry primary usage. Operation in the 2390-2400 MHz band is not subject to registration or coordination and may be used in all areas, including residential.

Issues to be confronted with WBAN technology include:

Data Quality: Data generated and collected through BANs can play a key role in the patient care process. It is essential that the quality of this data is of a high standard to ensure that the decisions made are based on the best information possible Data Management: As BANs generate large volumes of data, the need to manage and maintain these datasets is of utmost importance.

Sensor Validation: Pervasive sensing devices are subject to inherent communication and hardware constraints, including unreliable wired/wireless network links, interference and limited power reserves. This may result in erroneous datasets being transmitted back to the end-user. It is of the utmost importance, especially within a healthcare domain, that all sensor readings are validated. This helps to reduce false alarm generation and to identify possible weaknesses within the hardware and software design.

Data Consistency: Data residing on multiple mobile devices and wireless patient notes need to be collected and analyzed in a seamless fashion. Within body area networks, vital patient datasets may be fragmented over a number of nodes and across a number of networked PCs or Laptops. If a medical practitioner's mobile device does not contain all known information, then the quality of patient care may degrade.

Security: Considerable effort would be required to make WBAN transmission secure and accurate. It would have to be made sure that the patient "secure" data is only derived from each patient's dedicated WBAN system and is not mixed up with other patient's data. Further, the data generated from WBAN should have secure and limited access. Although security is a high priority in most networks, little study has been done in this area for WBANs. As WBANs are resource-constrained in terms of power, memory, communication rate, and computational capability, security solutions proposed for other networks may not be applicable to WBANs. Confidentiality, authentication, integrity, and freshness of data together with the availability and secure management are the security requirements in WBAN. The IEEE 802.15.6 standard, which is the latest standard for WBAN, tried to provide security in WBAN. However, it has several security problems.

Interoperability: WBAN systems would have to ensure seamless data transfer across standards such as Bluetooth, ZigBee etc., to promote information exchange, plug and play device interaction. Further, the systems would have to be scalable, ensure efficient migration across networks, and offer uninterrupted connectivity.

System devices: The sensors used in WBAN would have to be low on complexity, small in form factor, light in weight, power-efficient, easy to use, and reconfigurable. Further, the storage devices need to facilitate remote storage and viewing of patient data as well as access to external processing and analysis tools via the Internet.

Energy vs. accuracy: Sensors' activation policy should be determined to optimizing the trade-off between the BAN's power consumption versus the probability of the patient's health state misclassification. High power consumption often results in more accurate observations on the patient's health state and vice versa.

Invasion of privacy: People might consider WBAN technology a potential threat to freedom, if the applications go beyond "secure" medical usage. Social acceptance would be key to this technology finding a wider application.

Interference: The wireless link used for body sensors should reduce the interference and increase the coexistence of sensor node devices with other network devices available in the environment. This is especially important for large scale implementation of WBAN systems.

Cost: Today's consumers expect low-cost health monitoring solutions which provide high functionality. WBAN implementations will need to be cost-optimized to be appealing alternatives to health-conscious coOnsumers.

Constant monitoring: Users may require different levels of monitoring, for example, those at risk of cardiac ischemia may want their WBANs to function constantly, while others at risk of falls may only need WBANs to monitor them while they are walking or moving. The level of monitoring influences the amount of energy required and the life cycle of the BAN before the energy source is depleted]

Constrained deployment: The WBAN needs to be wearable, lightweight, and non-intrusive. It should not alter or encumber the user's daily activities. The technology should ultimately be transparent to the user, i.e., it should perform its monitoring tasks without the user realizing it.

Consistent performance: The performance of the WBAN should be consistent. Sensor measurements should be accurate and calibrated, even when the WBAN is switched off and switched on again. The wireless links should be robust and work under various user environments.

Rosalind Picard, Steve Mann, and Jennifer Healey, at the MIT Media Lab, designed "Smart Clothes" that monitored continuous physiological data from the wearer. These "smart clothes," "smart underwear," "smart shoes," and smart jewelry collected data that contained physiological information or controlled physiological sensors and environmental sensors like cameras and other devices. See Mann, S. (1996). Smart clothing: The shift to wearable computing. Comm. of the ACM, 39(8), 23-24; Mann, Steve (March 1997). "Smart Clothes". Personal Technologies. 1 (1): 21-27; Picard, Rosalind; Healey, Jennifer (December 1997). "Affective Wearables". Personal Technologies. 1 (4): 231-240; Mann, S. (1997). "Wearable computing: A first step toward personal imaging." IEEE Computer, 30(2), 25-32.

The Tyndall National Institute in Ireland developed a "remote non-intrusive patient monitoring" platform, which was used to evaluate the quality of the data generated by the patient sensors and how the end users may adopt the technology. See O'Donoghue, John, John Herbert, and Paul Stack. "Remote non-intrusive patient monitoring." Smart Homes and Beyond (2006): 180-87.

Activity trackers, such as smart wristbands made by Jawbone and Fitbit, are collecting information about heart rate, number of steps, and other physiological data. They are worn on a wrist as a bracelet or a watch. Such devices typically include accelerometers, pedometers, optical sensors for measuring heart rate, and other sensors.

Wearable devices are extremely prone to errors and are not very accurate. However, having at least two devices (e.g., two rings, two bracelets, or a ring and a bracelet) would (a) give much more precise information because one can compensate for errors in another, and (b) give additional data of diagnostic value. In existing wearable devices, each physiological parameter is measured only on a sing limb (usually an arm). Multiple data streams are not used for noise filtering and are not compared to calculate the difference. Further, no calculation of any ratios between parameters acquired by different sensors is performed. However, the present invention is designed to collect and compare different physiological parameters and allows for a more precise determination of the physiological state of a user. In addition, the present invention is designed to measure the same physiological parameter (e.g., pulse or blood pressure) on different extremities, allows calculating the difference, which has a separate diagnostic significance. Further, multiple wearable devices may all be interconnected in a local area network, which may have additional benefits.

In US patent application US20140300490, a wearable device for secure control of physiological sensors and medical devices is disclosed. The wearable electronic device includes a radio subsystem. In addition, the radio subsystem is configured to provide a body area network (BAN) function to communicate with nodes of the body area network (BAN) and to provide an uplink radio function for communications with a server. The wearable device has a battery-powered processor with memory. In addition, the memory has firmware for communicating through the BAN radio with at least one wearable node to receive data and firmware for communicating through the uplink radio to download apps and configuration information associated with the wearable node and to upload data to a server. The wearable node, or slave node, may be an insulin pump, chemotherapy pump, TENS unit, cardiac monitor, or another device for monitoring physiological or behavioral characteristics of the subject.

In another US patent application, 20140228904, systems and methods for networking of implantable devices are disclosed. The implantable devices are configured for electro-physiological information, biological sensors, devices configured affixing/coupling to a body, and wearable devices for carrying on a body. The invention presents the methods for sensors and devices to be configurable with at least one unique identification number whereby the devices and sensors may be accessed, communicated with, and addressed with specificity, security, and safety in one or more networks formed by the devices and sensors. The device and/or the sensor may be configured with a unique device/sensor profile. The user may be described and configured with a user profile comprising of user information, including health information such that the user information/profiles and the device/sensor information/profiles may be used individually or in tandem with each other.

The prior art systems and methods mentioned above have several disadvantages. The prior focus was on the networking of one or more implantable devices located within the body for communication, coordination, command, and control of functions performed by the implantable devices. In addition, the prior art presents the identification of an individual and an implantable device associated with the individual by a plurality of means for secure and seamless networking. The prior art focuses on the wearable master electronic device having firmware for BAN communications with wearable nodes to receive data, and in an embodiment, send configuration data. However, these prior art references do not take into account the physiological parameters and are not designed to compare different physiological parameters. They do not allow for a more precise determination of the physiological state of a user. In addition, prior art does not disclose measuring the same physiological parameter (e.g., temperature, pulse, oxygen saturation, or blood pressure) on different extremities. Furthermore, prior art does not allow to calculate the difference, which may have separate diagnostic significance. Further, the prior art is incapable of performing calculations of any ratios between parameters acquired by different sensors.

In light of the above discussion, there is a need for a device, method and system which overcomes the above-stated disadvantages.

The present invention relates to a system for acquiring and analyzing biometric data from a user.

The system may include a plurality of wearable devices, which may be interconnected, and a personal mobile electronic device. The wearable devices are worn close to or on the surface of the skin, where they detect, analyze, and transmit information about body signals such as vital signs and other physiological parameters. The wearable biometric devices may include, but are not limited to, a watch, a ring, a bracelet, an anklet, an earring, a helmet, a headset, earbuds, Air Pods, headphones, earphones, and hearing aids. Biometric devices may be worn on a body, embedded in an article of clothing, or jewelry. Alternatively, a wearable device may be attached directly to the skin or implanted subcutaneously.

A particularly preferred implementation includes a pair of interaural devices which provide sensors in both ears, to acoustically sense heartbeat, temperature, pulse oximetry, electroencephalography, EMG, voice resonance, etc. Advantageously, the pair of interaural devices also act as traditional earbuds with both playback and telephony capability, and Bluetooth (e.g., BLE) interface. See, e.g., US 20200275216, 20200342651; 20200336846; 20200329333; 20200314562; 20200275216; 20200260203; 20200254068; 20200245087; 20200230347; 20200221236; 20200213738; 20200193968; 20200177994; 20200177982; 20200163961; 20200137508; 20200128347; 20200107137; 20200082191; 20200077204; 20200074200; 20200045484; 20200019802; 20200019801; 20190387339; 20190362149; 20190342693; 20190306646; 20190306645; 20190306644; 20190270738; 20190261119; 20190261118; 20190261117; 20190261116; 20190261115; 20190261114; 20190261113; 20190261112; 20190222943; 20190215628; 20190200141; 20190174237; 20190156150; 20190156134; 20190144536; 20190133996; 20190132685; 20190116449; 20190110138; 20190075406; 20190069107; 20190059778; 20190052987; 20190030277; 20190029970; 20180332396; 20180262849; 20180262847; 20180227697; 20180227690; 20180220242; 20180204372; 20180176705; 20180176700; 20180151036; 20180146307; 20180140601; 20180139565; 20180139498; 20180117113; 20180098176; 20180098160; 20180091925; 20180084366; 20180082682; 20180077502; 20180054683; 20180035238; 20180035237; 20180028813; 20180014130; 20170347348; 20170347192; 20170347183; 20170347179; 20170347178; 20170347177; 20170346920; 20170339509; 20170339508; 20170303061; 20170280256; 20170280255; 20170272880; 20170245081; 20170223478; 20170172438; 20170171681; 20170165496; 20170164129; 20170156013; 20170142527; 20170086006; 20170078803; 20170020869; 20160381485; 20160337773; 20160287727; 20160262608; 20160227341; 20160220709; 20160205491; 20160150064; 20160088417; 20160080577; 20160057547; 20160027202; 20160007849; 20150373477; 20150264505; 20150230036; 20150124976; 20150100991; 20150078600; 20150003651; 20140347565; 20140343458; 20140342660; 20140226838; 20140221726; 20140213844; 20140213843; 20140148726; 20130223709; 20130177972; 20130163765; 20130065830; 20130042332; 20130041265; 20120150545; 20120127035; 20120116149; 20110152711; 20100305658; 20100291074; 20100241256; 20100208631; 20090257990; 20080130408; 20080112927; 20080039415; 20070270988; 20070202550; 20070043059; 20070003082; 20060241808; 20060215858; 20060215854; 20060210106; 20060204019; 20060195157; 20050281410; 20050008628; 20040132073; 20030133588; U.S. Pat. Nos. 10,820,121; 10,798,509; 10,785,587; 10,779,102; 10,769,463; 10,728,682; 10,728,662; 10,722,491; 10,721,581; 10,713,835; 10,702,154; 10,701,510; 10,659,896; 10,645,512; 10,645,511; 10,638,242; 10,638,241; 10,631,114; 10,617,842; 10,602,291; 10,595,143; 10,587,974; 10,587,973; 10,587,972; 10,582,314; 10,548,892; 10,528,837; 10,528,836; 10,524,063; 10,524,061; 10,511,917; 10,474,916; 10,440,489; 10,426,967; 10,425,762; 10,425,745; 10,412,527; 10,397,729; 10,390,163; 10,382,872; 10,375,490; 10,362,414; 10,356,536; 10,341,803; 10,341,798; 10,341,797; 10,341,796; 10,277,990; 10,272,572; 10,229,565; 10,219,083; 10,182,300; 10,182,298; 10,178,493; 10,142,758; 10,142,745; 10,140,987; 10,129,648; 10,129,647; 10,117,038; 10,045,130; 10,038,967; 10,038,966; 10,028,723; 9,998,847; 9,980,072; 9,924,281; 9,924,280; 9,922,439; 9,918,178; 9,918,174; 9,867,823; 9,860,650; 9,860,588; 9,838,771; 9,832,588; 9,826,318; 9,813,836; 9,808,193; 9,794,723; 9,788,714; 9,769,584; 9,712,927; 9,681,820; 9,681,245; 9,674,628; 9,615,190; 9,596,551; 9,591,427; 9,584,940; 9,538,296; 9,532,159; 9,489,623; 9,460,732; 9,445,214; 9,440,089; 9,433,797; 9,427,598; 9,415,233; 9,402,875; 9,374,647; 9,370,302; 9,357,941; 9,344,544; 9,282,196; 9,226,090; 9,167,368; 8,973,565; 8,529,463; 8,362,956; 8,007,779; 7,876,914; 7,864,632; 7,756,281; 7,711,127; 7,536,769; 7,526,361; 7,400,737; 7,362,873; 7,355,508; 7,146,016; 5,729,612; 10,426,967; 10,045,130; 9,838,771; 9,681,820; 9,440,089; 9,433,797; 9,427,598; 9,415,233; 9,357,941; 10,817,251; 10,813,559; 10,809,796; 10,799,122; 10,798,471; 10,791,938; 10,779,062; 10,765,409; 10,764,668; 10,750,954; 10,722,159; 10,716,481; 10,716,480; 10,701,470; 10,687,745; 10,687,744; 10,687,743; 10,684,675; 10,678,502; 10,667,033; 10,646,146; 10,644,216; 10,639,468; 10,638,961; 10,623,861; 10,623,849; 10,617,302; 10,610,158; 10,595,730; 10,542,893; 10,536,768; 10,534,900; 10,524,696; 10,524,667; 10,512,403; 10,506,310; 10,460,095; 10,452,144; 10,448,897; 10,448,840; 10,433,788; 10,413,240; 10,413,197; 10,412,493; 10,382,839; 10,362,945; 10,357,188; 10,342,482; 10,311,687; 10,292,657; 10,258,243; 10,234,133; 10,137,245; 10,104,486; 10,092,245; 10,085,091; 10,076,282; 10,076,253; 10,064,581; 10,057,673; 10,052,065; 10,028,675; 10,016,160; 10,015,582; 9,955,919; 9,907,998; 9,870,716; 9,861,320; 9,808,204; 9,801,552; 9,794,653; 9,792,801; 9,788,785; 9,782,084; 9,782,083; 9,750,462; 9,723,396; 9,579,060; 9,538,921; 9,521,962; 9,460,262; 9,263,662; 9,211,069; 8,821,350; 8,308,641; 20200275216; 20200177982; 20170347348; 20170347183; 20170347179; 20170347178; 20170347177; 20170346920; 20170165496; 20150174418; 20200315457; 20200314524; 20200314520; 20200306493; 20200294508; 20200280814; 20200275216; 20200268265; 20200268260; 20200267936; 20200267487; 20200265824; 20200264835; 20200261687; 20200261017; 20200245873; 20200196914; 20200174735; 20200174734; 20200142667; 20200138376; 20200118456; 20200113472; 20200085312; 20200085311; 20200077192; 20200019243; 20200000441; 20190392724; 20190380648; 20190370636; 20190320246; 20190313166; 20190313165; 20190306594; 20190231256; 20190224443; 20190223747; 20190216336; 20190197055; 20190192077; 20190174238; 20190142349; 20190101984; 20190101977; 20190090046; 20190083043; 20190064344; 20190046044; 20190038180; 20190029593; 20190028825; 20190012446; 20190011978; 20190001129; 20180365383; 20180360380; 20180353086; 20180351069; 20180350259; 20180348863; 20180348853; 20180333091; 20180289288; 20180279952; 20180276039; 20180242085; 20180240957; 20180235540; 20180192965; 20180177416; 20180146870; 20180146865; 20180139528; 20180131798; 20180113673; 20180092601; 20180078798; 20180078209; 20180020979; 20180014102; 20180008151; 20180008146; 20180001077; 20170359635; 20170340920; 20170308689; 20170273622; 20170264987; 20170258403; 20170257698; 20170230752; 20170215016; 20170185716; 20170148282; 20170127960; 20170106241; 20170079572; 20170069191; 20170065224; 20170059152; 20170053513; 20170020399; 20170014041; 20170011210; 20160381448; 20160338638; 20160332025; 20160302671; 20160296170; 20160287898; 20160256117; 20160242698; 20160197259; 20160196758;

20160166203; 20160166152; 20160094899; 20160051150; 20150305426; 20150280099; 20150141774; 20150126888; 20150077245; 20140371556; 20140213864; 20140135886; 20130276785; 20130218022; 20130172759; 20130108995; 20130071821; 20110137141; and 20110003664.

Implantable devices and wearable devices may be linked in one body area network (BAN), using the natural electrical conductivity of a human body to transmit signals. Each wearable device includes at least one sensor to acquire physiological data such as temperature, cardiac rhythm (e.g., heart rate, resting heart rate, palpitations, heart rate first and second-order change, etc.), breathing, pulse oximetry, electrostatic blood pressure, the pressure inside ear canal, electrostatic potential, ECG, blood glucose, sleep stage, seizures, physical activity (e.g., number of steps), time spent exercising, number of calories consumed and/or burned, direction of movement, it's velocity and acceleration, physical strain, the release of certain biochemicals, pressure inside ear canal, etc.

Additionally, wearable biometric devices can collect information about the ambient environment, such as temperature, humidity, barometric pressure, air purity, luminosity, location, etc. The censors in wearable devices may include accelerometers, gyroscopes, light sensors, and barometric pressure sensors mounted over the body, articles of clothing, or jewelry. Such devices can measure athletic performance, blood alcohol content, monitor how sick the user is. See, for example, Coldewey, Devin. "Smartwatches could soon tell you when you're getting sick." TechCrunch. Retrieved 8/2/2020, and Li X, Dunn J, Salins D, Zhou G, Zhou W, Schüssler-Fiorenza Rose S M, et al. (2017) Digital Health: Tracking Physiomes and Activity Using Wearable Biosensors Reveals Useful Health-Related Information. PLoS Biol 15(1): e2001402. doi.org/10.1371/journal.pbio.2001402. Wearable devices can monitor and forecast changes in mood, stress, and health. See, for example, Schwab, Katharine. "This MIT Startup is Developing a Fitness Tracker for your Brain." Fastcompany. (Retrieved 2020 Aug. 4). Attempts have been made to develop health risk assessment applications, including measures of frailty and risks of age-dependent diseases. See Tim Pyrkov, Konstantin Slipensky, Mikhail Barg, Alexey Kondrashin, Boris Zhurov, Alexander Zenin, Mikhail Pyatnitskiy, Leonid Menshikov, Sergei Markov, and Peter O. Fedichev (2018). "Extracting biological age from biomedical data via deep learning: too much of a good thing?". *Scientific Reports*. 8 (1): 5210.

Innovations in fabric production have led to "e-textile" production. Current wearable technology integrates sensing capability into clothing. It is possible to collect electrocardiographic and electromyographic data by weaving electrodes into the materials used in the garments. See, for example, Patel S, Park H, Bonato P, Chan L, Rodgers M., "A review of wearable sensors and systems with application in rehabilitation." J Neuroeng Rehabil. 2012 Apr. 20; 90:21.

Epidermal electronics is a field of wearable technology, named for its properties and behaviors comparable to those of the epidermis, or outermost layer of the skin. These wearables are attached directly onto the skin of the user to continuously monitor physiological and metabolic processes, both dermal and subdermal. See Kim, Dae-Hyeong; Rogers, John (2011). "Epidermal Electronics". *Science*. 333: 838-843. Webb, R. Chad; Ma, Yinji; Krishnan, Siddharth; Li, Yuhang; Yoon, Stephen; Guo, Xiaogang; Feng, Xue; Shi, Yan; Seidel, Miles; Cho, Nam Heon; Kurniawan, Jonas (October 2015). "Epidermal devices for noninvasive, precise, and continuous mapping of macrovascular and microvascular blood flow". *Science Advances*. 1 (9): e1500701. Zhang, Yujia; Tao, Tiger H. (2019 Oct. 17). "Skin-Friendly Electronics for Acquiring Human Physiological Signatures". *Advanced Materials*. 31 (49): 1905767;

In addition, the wearable devices may be operably connected to each other in a body area network (BAN). Further, interconnected wearable devices may include an implanted medical device. The personal mobile electronic device, such as a smartphone, a tablet, a smartwatch, is wirelessly connected to each of the wearable biometric devices and/or to the BAN. In addition, the personal mobile electronic device is configured to receive and analyze physiological data acquired by each of the plurality of interconnected biometric devices.

The invention embodies the personal mobile electronic device that is configured to compute a physiological parameter from a plurality of data streams related to the physiological parameter. Each data stream is acquired by a different wearable device located at different locations on the user's body. The personal mobile electronic device is further configured to compute the physiological parameter by averaging a physiological parameter by using data streams acquired by different wearable devices; by using noise filters on the plurality of data streams related to the same physiological parameter; or by using statistical techniques for analyzing the plurality of data streams related to the physiological parameter. The personal mobile electronic device is further configured to compute a physiological parameter depending on the value of at least one other physiological parameter acquired by different wearable devices of the plurality of interconnected wearable devices. The personal mobile electronic device is further configured for computing the difference between the same physiological parameter acquired on the opposite extremities. In one embodiment of the present invention, the heart rate is analyzed by comparing the heart rate on the opposite hands by comparing in real-time data streams related to the heart rate acquired by wearable devices disposed on the opposite hands (or legs). In another embodiment of the present invention, the blood pressure is analyzed by comparing the blood pressure on the opposite hands by comparing data streams related to the blood pressure acquired by wearable devices disposed on the opposite hands (or legs). This data may be analyzed to diagnose of forecast cardiac and vascular abnormalities. In another embodiment of the present invention, the temperature is analyzed by comparing the temperature on the opposite hands by comparing in real-time data streams related to the temperature acquired by wearable devices disposed on the opposite hands (or legs). In yet another embodiment of the present invention, the oxygen saturation is analyzed by comparing the oxygen saturation on the opposite hands by comparing in real-time data streams related to the oxygen saturation acquired by wearable devices disposed on the opposite hands (or legs). This data may be used to diagnose or predict microvascular or other abnormalities.

In another embodiment, the pressure differential between the pressure inside ear canals can be easily measured by microphones embedded in earphones, earbuds, hearing aids, etc. This pressure differential can have diagnostic significance.

In one embodiment of the present invention, the muscle tone is analyzed by comparing the muscle tone on the opposite hands by comparing data streams related to the muscle tone acquired by wearable devices disposed on the opposite hands (or legs). The difference in the muscle tone may be indicative of transient ischemia (TIA), stroke, paralysis, or other neurological disorder.

In another embodiment of the present invention, the user's gate is analyzed by comparing the movements of the opposite legs by comparing data streams related to the movement acquired by wearable devices disposed on the opposite legs. The changes in the gate may be indicative of a neurological disorder, such as multiple sclerosis (MS), Parkinson, Lou Gehrig disease, Alzheimer's or another neurodegenerative disorder.

In another embodiment of the present invention, the movements of the user's hands are analyzed by comparing the movements of the opposite hands by comparing data streams related to the movement acquired by wearable devices disposed on the opposite hands. The detection of tremors in the hands may be indicative of an onset of a neurological disorder, such as Parkinson or another neurodegenerative disorder.

In another embodiment of the present invention, one wearable device is controlled by another interconnected wearable device. The method comprises steps of operatively connecting the first wearable device with the second wearable devices into a local network (such as LAN or BAN); sending a signal from the second wearable devices to the first wearable device; receiving a signal by the first wearable device from the second wearable device; and changing a regime of operation of the first wearable devices depending on the signal received from the second wearable device.

Yet another embodiment of the invention states a method of denoising a physiological signal received from a plurality of interconnected wearable devices. The method comprises steps of, sending a plurality of signals related to the physiological signal from at least two wearable devices to a personal mobile electronic device; receiving the plurality of signals by the personal mobile electronic device; and denoising the physiological signal by comparing the plurality of signals related to the physiological signal received from at least two wearable devices, wherein the denoising is performed using the personal mobile electronic device.

Dynamic characteristics of the physiological signal are preferably modeled. The model is then used to form an "optimal filter," i.e., a filter, which has characteristics to separate signal to noise with high-quality separation. Typically, in the case of a frequency-domain filter with poles and zeros, the separation is statistically optimized to increase the signal to noise ratio or another useful metric. On the other hand, where the physiological signal is modeled in other than the frequency domain, other types of filters with statistical optimization may be employed. In some cases, a convolutional neural network architecture may be used.

The model may be a statistical model, and be predictive of future states, such as a hidden Markov model (HMM). See, en.wikipedia.org/wiki/Hidden_Markov_model. Hidden Markov Model (HMM) is a statistical Markov model in which the system being modeled is assumed to be a Markov process—call it X—with unobservable ("hidden") states. As part of the definition, HMM requires that there be an observable process Y whose outcomes are "influenced" by the outcomes of X in a known way. Since X cannot be observed directly, the goal is to learn about X by observing Y. HMM has an additional requirement that the outcome of Y at time $t=t_0$ may be "influenced" exclusively by the outcome of X at $t=t_0$ and that the outcomes of X and Y at $t<t_0$ must not affect the outcome of Y at $t=t_0$.

The hierarchical hidden Markov model (HHMM) is a statistical model derived from the hidden Markov model (HMM). en.wikipedia.org/wiki/Hierarchical_hidden_Markov_model. In an HHMM, each state is considered to be a self-contained probabilistic model. More precisely, each state of the HHMM is itself an HMM. This implies that the states of the HHMM emit sequences of observation symbols rather than single observation symbols as is the case for the standard HMM states. When a state in an HHMM is activated, it will activate its own probabilistic model, i.e., it will activate one of the states of the underlying HHMM, which in turn may activate its underlying HHMM and so on. The process is repeated until a special state, called a production state, is activated. Only the production states emit observation symbols in the usual HMM sense. When the production state has emitted a symbol, control returns to the state that activated the production state. The states that do not directly emit observations symbols are called internal states. The activation of a state in an HHMM under an internal state is called a vertical transition. After a vertical transition is completed, a horizontal transition occurs to a state within the same level. When a horizontal transition leads to a terminating state, control is returned to the state in the HHMM, higher up in the hierarchy, that produced the last vertical transition. Note that a vertical transition can result in more vertical transitions before reaching a sequence of production states and finally returning to the top level. Thus, the production states visited give rise to a sequence of observation symbols that is "produced" by the state at the top level. The HMM and HHMM belong to the same class of classifiers. That is, they can be used to solve the same set of problems. In fact, the HHMM can be transformed into a standard HMM. However, the HHMM leverages its structure to solve a subset of the problems more efficiently.

The nature of basic physiological parameters is generally well-studied, and therefore models and optimal filters (dependent on sensor and noise environment) are available. Likewise, neural networks, and training data for such networks are well known and available. However, with respect to dynamic intersensor differences, data analysis is required.

In the case of multiple partially redundant measurements, a number of different metrics are material. Each sensor measurement is evidence of a "ground truth," the nominal measurement as obtained from a "gold standard" process. Further, each sensor provides evidence of parameter proximate to the respective sensor. The sensors measure dynamic variation over time of the respective sensed parameter. Finally, there are dynamic differences between the sensor readings. Each of these has a distinct analysis and interpretation. The difference analysis is an important feature of an aspect of the invention.

In yet another embodiment of the present invention, a physiological signal received from a plurality of interconnected wearable devices is computed with higher accuracy by averaging values received from different devices. The method comprises steps of sending a plurality of signals related to the physiological signal from at least two wearable devices to a personal mobile electronic device; receiving the plurality of signals by the personal mobile electronic device; and computing the physiological signal by averaging the values obtained from the plurality of signals related to the physiological signal received from at least two wearable devices, wherein the averaging is performed using the personal mobile electronic device.

In order to train the system to analyze the differential sensor's signals, it is important to obtain data, which is generally obtainable from sensor networks before they are fully established. The other key information for the system is outcome data, when may be obtained from electronic medical records, self-reporting, and other real-time data from other sensors and smartphones (self-reported and automatically-acquired). Once sensor data and outcome data is available, these may be jointly processed to provide a model, filter, and/or analytic framework for the analysis of the type of data.

In yet another embodiment of the invention, the accuracy of measuring a physiological parameter is improved by performing statistical analysis on a plurality of data sets obtained from different wearable devices. The method comprises steps of, sending a plurality of signals related to the physiological signal from at least two wearable devices to a personal mobile electronic device; receiving the plurality of signals by the personal mobile electronic device; and computing the physiological signal by performing a statistical analysis on the plurality of signals related to the physiological signal received from at least two of the plurality of interconnected wearable devices, wherein the statistical analysis is performed using the personal mobile electronic device.

Statistical analysis of physiological signals is well known. See,

Vavilov, Vladimir P., Ekaterina V. Vavilova, and Dimity N. Popov. "Statistical analysis of human body temperature asymmetry as the basis for detecting pathologies by means of IR thermography." In Thermosense XXIII, vol. 4360, pp. 482-491. Int. Society for Optics and Photonics, 2001.

Mackowiak, Philip A., Steven S. Wasserman, and Myron M. Levine. "A critical appraisal of 98.6 F, the upper limit of the normal body temperature, and other legacies of Carl Reinhold August Wunderlich." Jama 268, no. 12 (1992): 1578-1580.

Brown, Emery N., and Charles A. Czeisler. "The statistical analysis of circadian phase and amplitude in constant-routine core-temperature data." J. Biological Rhythms 7, no. 3 (1992): 177-202.

Young, Paul J., Michael J. Bailey, Richard W. Beasley, Ross C. Freebairn, Naomi E. Hammond, Frank M P Van Haren, Meg L. Harvard et al. "Protocol and statistical analysis plan for the Randomised Evaluation of Active Control of Temperature versus Ordinary Temperature Management (REACTOR) trial." Critical Care and Resuscitation 19, no. 1 (2017): 81.

Potvin, Catherine, Martin J. Lechowicz, & Serge Tardif. "The statistical analysis of ecophysiological response curves obtained from experiments involving repeated measures." Ecology 71(4):389-1400, 1990.

Reith, Jakob, Henrik Stig Jorgensen, Palle Moller Pedersen, H. Nakamaya, L. L. Jeppesen, T. S. Olsen, and H. O. Raaschou. "Body temperature in acute stroke: relation to stroke severity, infarct size, mortality, and outcome." The Lancet 347, no. 8999 (1996): 422-425.

Takeuchi, Michio, Yuta Matsui, Toshihiko Sakai, Gabor Andocs, Ryo Nagaoka, and Hideyuki Hasegawa. "Investigation of initial value dependence in the statistical analysis of ultrasonic scattered echoes for the non-invasive estimation of temperature distribution in biological tissue." Japanese J. Applied Physics 58, no. SG (2019): SGGE09.

Hackl, W., W. Mauritz, M. Schemper, M. Winkler, P. Sporn, and K. Steinbereithner. "Prediction of malignant hyperthermia susceptibility: statistical evaluation of clinical signs." British J. anaesthesia 64, no. 4 (1990): 425-429.

Dowse, Harold B. "Statistical analysis of biological rhythm data." In Circadian rhythms, pp. 29-45. Humana Press, 2007.

Minors, David S., and James M. Waterhouse. "Mathematical and statistical analysis of circadian rhythms." Psychoneuroendocrinology 13, no. 6 (1988): 443-464.

Takeuchi, Michio, Toshihiko Sakai, Gabor Andocs, Keizo Takao, Ryo Nagaoka, and Hideyuki Hasegawa. "Temperature elevation in tissue detected in vivo based on statistical analysis of ultrasonic scattered echoes." Scientific Reports 10, no. 1 (2020): 1-11.

Guerrero, Rodrigo. "Sex ratio: a statistical association with the type and time of insemination in the menstrual cycle." Int. J. fertility 15, no. 4 (1970): 221.

Jordan, Jorge, Pau Miro-Martinez, Borja Vargas, Manuel Varela-Entrecanales, and David Cuesta-Frau. "Statistical models for fever forecasting based on advanced body temperature monitoring." J. critical care 37 (2017): 136-140.

Drosatos, George, and Pavlos S. Efraimidis. "Privacy-preserving statistical analysis on ubiquitous health data." In Int. Conf Trust, Privacy and Security in Digital Business, pp. 24-36. Springer, Berlin, Heidelberg, 2011.

Valeri, A., D. Mianné, F. Merouze, L. Bujan, A. Altobelli, and J. Masson. "Scrotal temperature in 258 healthy men, randomly selected from a population of men aged 18 to 23 years old. Statistical analysis, epidemiologic observations, and measurement of the testicular diameters." Progres en urologie: J. de l'Association francaise d'urologie et de la Societe francaise d'urologie 3, no. 3 (1993): 444-452.

Marler, Matthew R., Rolf G. Jacob, John P. Lehoczky, and Alvin P. Shapiro. "The statistical analysis of treatment effects in 24-hour ambulatory blood pressure recordings." Statistics in Med. 7(6):697-716 1988.

Alvarez, Walter C., and L. L. Stanley. "Blood pressure in six thousand prisoners and four hundred prison guards: a statistical analysis." Archives of Internal Medicine 46, no. 1 (1930): 17-39.

Streitberg, B., W. Meyer-Sabellek, and P. Baumgart. "Statistical analysis of circadian blood pressure recordings in controlled clinical trials." J. hypertension. Supplement: official J. Int. Society of Hypertension 7, no. 3 (1989): S11-7.

Tochikubo, Osamu, Satoshi Umemura, Kazumasa Noda, and Yoshihiro Kaneko. "Variability of Arterial Blood Pressure and Classification of Essential Hypertension by Multivariate Statistical Analysis: Pathophysiology of Hypertension and its Relation to the Choice of Antihypertensive Treatment." Japanese Circulation J. 45, no. 7 (1981): 781-799.

Van Buuren, Stef, Hendriek C. Boshuizen, and Dick L. Knook. "Multiple imputation of missing blood pressure covariates in survival analysis." Statistics in medicine 18, no. 6 (1999): 681-694. Wakefield, Thomas W., Walter M. Whitehouse, Shu-Chen Wu, Gerald B. Zelenock, Jack L. Cronenwett, Errol E. Erlandson, Richard O. Kraft, S. Martin Lindenauer, and James C. Stanley. "Abdominal aortic aneurysm rupture: statistical analysis of factors affecting outcome of surgical treatment." Surgery 91, no. 5 (1982): 586-596.

Robinson, Samuel C., and Marshall Brucer. "Range of normal blood pressure: a statistical and clinical study of 11,383 persons." Archives of Internal Medicine 64, no. 3 (1939): 409-444.

Whelton, Seamus P., Ashley Chin, Xue Xin, and Jiang He. "Effect of aerobic exercise on blood pressure: a meta-analysis of randomized, controlled trials." Ann. Int. Med. 136, no. 7 (2002): 493-503.

Kelley, George A., and Kristi Sharpe Kelley. "Progressive resistance exercise and resting blood pressure: a meta-analysis of randomized controlled trials." Hypertension 35, no. 3 (2000): 838-843.

Cornelissen, Véronique A., and Robert H. Fagard. "Effect of resistance training on resting blood pressure: a meta-analysis of randomized controlled trials." (2005): 251-259.

Bazzano, Lydia A., Zia Khan, Kristi Reynolds, and Jiang He. "Effect of nocturnal nasal continuous positive airway pressure on blood pressure in obstructive sleep apnea." Hypertension 50(2):417-423 2007.

Verdecchia, Paolo, Giuseppe Schillaci, Massimo Guerrieri, Camillo Gatteschi, Guglielmo Benemio, Francesca Boldrini, and Carlo Porcellati. "Circadian blood pressure changes and left ventricular hypertrophy in essential hypertension." Circulation 81, no. 2 (1990): 528-536.

Darne, Bernadette, Xavier Girerd, Michel Safar, Frauds Cambien, and Louis Guize. "Pulsatile versus steady component of blood pressure: a cross-sectional analysis and a prospective analysis on cardiovascular mortality." Hypertension 13, no. 4 (1989): 392-400.

Devereux, Richard B., Thomas G. Pickering, Gregory A. Harshfield, Hollis D. Kleinert, Lorraine Denby, Linda Clark, Daryl Pregibon et al. "Left ventricular hypertrophy in patients with hypertension: importance of blood pressure response to regularly recurring stress." Circulation 68, no. 3 (1983): 470-476.

Wühl, Elke, Klaus Witte, Marianne Soergel, Otto Mehls, Franz Schaefer, and German Working Group on Pediatric Hypertension. "Distribution of 24-h ambulatory blood pressure in children: normalized reference values and role of body dimensions." J. hypertension 20, no. 10 (2002): 1995-2007.

Gil, Eduardo, Martin Mendez, JosE Maria Vergara, Sergio Cerutti, Anna Maria Bianchi, and Pablo Laguna. "Discrimination of sleep-apnea-related decreases in the amplitude fluctuations of PPG signal in children by HRV analysis." IEEE transactions on biomedical engineering 56, no. 4 (2008): 1005-1014.

Angius, Gianmarco, Doris Barcellona, Elisa Cauli, Luigi Meloni, and Luigi Raffo. "Myocardial infarction and antiphospholipid syndrome: a first study on finger PPG waveforms effects." In 2012 Computing in Cardiology, pp. 517-520. IEEE, 2012.

Madhav, K. Venu, M. Raghu Ram, E. Hari Krishna, Nagarjuna Reddy Komalla, and K. Ashoka Reddy. "Robust extraction of respiratory activity from PPG signals using modified MSPCA." IEEE Transactions on Instrumentation and Measurement 62, no. 5 (2013): 1094-1106.

Ram, M. Raghu, K. Venu Madhav, Ette Hari Krishna, Nagarjuna Reddy Komalla, Kosaraju Sivani, and K. Ashoka Reddy. "ICA-based improved DTCWT technique for MA reduction in PPG signals with restored respiratory information." IEEE Trans. Instrumentation and Measurement 62, no. 10 (2013): 2639-2651.

Ram, M. Raghu, K. Venu Madhav, E. Hari Krishna, K. Nagarjuna Reddy, and K. Ashoka Reddy. "On the performance of Time Varying Step-size Least Mean Squares (TVS-LMS) adaptive filter for MA reduction from PPG signals." In 2011 Int. Conf Comm. and Signal Processing, pp. 431-435. IEEE, 2011.

Georgieva-Tsaneva, Galya, Evgeniya Gospodinova, Mitko Gospodinov, and Krasimir Cheshmedzhiev. "Portable sensor system for registration, processing and mathematical analysis of ppg signals." Applied Sciences 10, no. 3 (2020): 1051.

Shan, Shih-Ming, Sung-Chun Tang, Pei-Wen Huang, Yu-Min Lin, Wei-Han Huang, Dar-Ming Lai, and An-Yeu Andy Wu. "Reliable PPG-based algorithm in atrial fibrillation detection." In 2016 IEEE Biomedical Circuits and Systems Conf. (BioCAS), pp. 340-343. IEEE, 2016.

Bandyopadhyay, Soma, Arijit Ukil, Chetanya Puri, Rituraj Singh, Arpan Pal, K. M. Mandana, and C. A. Murthy. "An unsupervised learning for robust cardiac feature derivation from PPG signals." In 38th. Int. Conf. of the IEEE Engineering in Medicine and Biology Society (EMBC), pp. 740-743. IEEE, 2016.

Gil, Eduardo, Raquel Bailón, José Maria Vergara, and Pablo Laguna. "PTT variability for discrimination of sleep apnea related decreases in the amplitude fluctuations of PPG signal in children." IEEE Transactions on Biomedical Engineering 57, no. 5 (2010): 1079-1088.

Ram, M. Raghu, K. Venu Madhav, E. Hari Krishna, Nagarjuna Reddy Komalla, and K. Ashoka Reddy. "On the performance of AS-LMS based adaptive filter for reduction of motion artifacts from PPG signals." In 2011 IEEE Int. Instrumentation and Measurement Technology Conf., pp. 1-4. IEEE, 2011.

Ram, M. Raghu, K. Venu Madhav, E. Hari Krishna, K. Nagarjuna Reddy, and K. Ashoka Reddy. "Use of multi-scale principal component analysis for motion artifact reduction of PPG signals." In 2011 IEEE Recent Advances in Intelligent Computational Systems, pp. 425-430. IEEE, 2011.

Kao, Yung-Hua, Paul C-P. Chao, and Chin-Long Wey. "A PPG sensor for continuous cuffless blood pressure monitoring with self-adaptive signal processing." In 2017 Int. Conf Applied System Innovation (ICASI), pp. 357-360. IEEE, 2017.

Wu, Hsien-Tsai, Chih-Yuan Lee, Cyuan-Cin Liu, and An-Bang Liu. "Multiscale cross-approximate entropy analysis as a measurement of complexity between ECG RR interval and PPG pulse amplitude series among the normal and diabetic subjects." Comput. Math. methods in medicine 2013 (2013).

Selvaraj, Nandakumar, Yitzhak Mendelson, Kirk H. Shelley, David G. Silverman, and Ki H. Chon. "Statistical approach for the detection of motion/noise artifacts in Photoplethysmogram." In Int. Con. of the IEEE Engineering in Medicine and Biology Society, pp. 4972-4975. IEEE, 2011.

Přibil, Jiří, Anna Přibilová, and Ivan Frollo. "First-Step PPG Signal Analysis for Evaluation of Stress Induced during Scanning in the Open-Air MRI Device." Sensors 20, no. 12 (2020): 3532.

Yousef, Q., M. B. I. Reaz, and M. A. M. Ali. "The analysis of PPG morphology: investigating the effects of aging on arterial compliance." Measurement Science Review 12, no. 6 (2012): 266-271.

Goshvarpour, Atefeh, and Ateke Goshvarpour. "Poincaré's section analysis for PPG-based automatic emotion recognition." Chaos, Solitons & Fractals 114 (2018): 400-407.

Dey, Jishnu, Tanmoy Bhowmik, Saswata Sahoo, and Vijay Narayan Tiwari. "Wearable PPG sensor based alertness scoring system." In 2017 39th Int. Conf. of the IEEE Engineering in Medicine and Biology Society (EMBC), pp. 2422-2425. IEEE, 2017.

Madhav, K. Venu, E. Hari Krishna, and K. Ashoka Reddy. "Extraction of respiratory activity from pulse oximeter's PPG signals using MSICA." In 2016 Int. Conf Wireless Comm., Signal Processing and Networking (WiSPNET), pp. 823-827. IEEE, 2016.

Jong, Gwo-Jia, and Gwo-Jiun Horng. "The PPG Physiological Signal for Heart Rate Variability Analysis." Wireless Personal Comm. 97, no. 4 (2017): 5229-5276.

Raghuram, M., K. Venu Madhav, E. Hari Krishna, Nagarjuna Reddy Komalla, Kosaraju Sivani, and K. Ashoka Reddy. "Dual-tree complex wavelet transform for motion artifact reduction of PPG signals." In 2012 IEEE Int. Symp. medical measurements and applications proceedings, pp. 1-4. IEEE, 2012.

Riaz, Farhan, Muhammad Ajmal Azad, Junaid Arshad, Muhammad Imran, Ali Hassan, and Saad Rehman. "Pervasive blood pressure monitoring using Photoplethysmogram (PPG) sensor." Future Generation Computer Systems 98 (2019): 120-130.

Raghuram, M., Kosaraju Sivani, and K. Ashoka Reddy. "Use of complex EMD generated noise reference for adaptive reduction of motion artifacts from PPG signals." In 2016 Int. Conf electrical, electronics, and optimization techniques (ICEEOT), pp. 1816-1820. IEEE, 2016.

Shin, Hangsik, and Se Dong Min. "Feasibility study for the non-invasive blood pressure estimation based on ppg morphology: normotensive subject study." Biomedical Eng. online 16, no. 1 (2017): 10.

Yao, Jianchu, and Steve Warren. "A short study to assess the potential of independent component analysis for motion artifact separation in wearable pulse oximeter signals." In 2005 IEEE Engineering in Medicine and Biology 27th Conf., pp. 3585-3588. IEEE, 2006.

Al Ali, Ammar, Don Carothers, David Dalke, Mohamed K. Diab, Julian Goldman, Massi E. Kiani, Michael Lee, Jerome Novak, Robert Smith, and Val E. Vaden. "Systems and methods for acquiring calibration data usable in a pulse oximeter." U.S. Pat. No. 7,428,432, issued Sep. 23, 2008.

Abdollahi, Sara, Eric J. Markvicka, Carmel Majidi, and Adam W. Feinberg. "3D Printing Silicone Elastomer for Patient-Specific Wearable Pulse Oximeter." Advanced healthcare mat. 9(15):1901735 2020.

Ghamri, Yassine, Martin Proenga, Gregory Hofmann, Philippe Renevey, Guillaume Bonnier, Fabian Braun, Alexandre Axis, Mathieu Lemay, and Patrick Schoettker. "Automated pulse oximeter waveform analysis to track changes in blood pressure during anesthesia induction: a proof-of-concept study." Anesthesia & Analgesia 130, no. 5 (2020): 1222-1233.

Abdelnasser, A., B. Abdelhamid, A. Elsonbaty, A. Hasanin, and A. Rady. "Predicting successful supraclavicular brachial plexus block using pulse oximeter perfusion index." BJA: British J. Anaesthesia 119, no. 2 (2017): 276-280.

Harris, Bronwyn U., Sarah Stewart, Archana Verma, Helena Hoen, Mary Lyn Stein, Gail Wright, and Chandra Ramamoorthy. "Accuracy of a portable pulse oximeter in monitoring hypoxemic infants with cyanotic heart disease." Cardiology in the young 29, no. 8 (2019): 1025-1029.

Joshi, Anirudh Nandakumar, Amy L. Nystrom, and Jeffrey T. La Belle. "Non-contact type pulse oximeter." Critical Reviews™ in Biomedical Engineering 47, no. 2 (2019).

Guber, Alexander, Gali Epstein Shochet, Sarah Kohn, and David Shitrit. "Wrist-Sensor Pulse Oximeter Enables Prolonged Patient Monitoring in Chronic Lung Diseases." J. medical systems 43(7) (2019): 230.

Li, Yan, He Gao, and Yan Ma. "Evaluation of pulse oximeter derived photoplethysmographic signals for obstructive sleep apnea diagnosis." Medicine 96, no. 18 (2017).

Yokose, Masashi, Takahiro Mihara, Masahiro Takaya, Takumi Yamamoto, Yusuke Saigusa, Shunsuke Takaki, and Takahisa Goto. "The perfusion index measured by the pulse oximeter affects the agreement between ClearSight and the arterial catheter-based blood pressures: A prospective observational study." PloS one 14, no. 7 (2019): e0219511.

Paterson, Estrella, Penelope M. Sanderson, Birgit Brecknell, Neil A B Paterson, and Robert G. Loeb. "Comparison of standard and enhanced pulse oximeter auditory displays of oxygen saturation: a laboratory study with clinician and nonclinician participants." Anesthesia & Analgesia 129, no. 4 (2019): 997-1004.

Murphy, Madeleine C., Laura De Angelis, Lisa K. McCarthy, and Colm Patrick Finbarr O'Donnell. "Randomised study comparing heart rate measurement in newly born infants using a monitor incorporating electrocardiogram and pulse oximeter versus pulse oximeter alone." Archives of Disease in Childhood-Fetal and Neonatal Edition 104, no. 5 (2019): F547-F550.

Smith, Reuben Nathanael, and R. Hofmeyr. "Perioperative comparison of the agreement between a portable fingertip pulse oximeter v. a conventional bedside pulse oximeter in adult patients (COMFORT trial)." South African Medical J. 109, no. 3 (2019): 154-158.

Lauterbach, Claire J., Phebe A. Romano, Luke A. Greisler, Richard A. Brindle, Kevin R. Ford, and Matthew R. Kuennen. "Accuracy and Reliability of Commercial Wrist-Worn Pulse Oximeter During Normobaric Hypoxia Exposure Under Resting Conditions." Res. Q. for Exercise and Sport (2020): 1-10.

Krishnamachari Janani, P. Ajitha, Raghu Sandhya, Haripriya Subbaiyan, and Jerry Jose. "Efficiency of new custom-made pulse oximeter sensor holder in assessment of actual pulp status." J. Family Medicine and Primary Care 9, no. 7 (2020): 3333.

Arnold, Cosby G., J. Richard Walker, E. Jeffrey Metter, Shane Young, and Mark F. Brady. "Pulse oximeter plethysmograph waveform and automated oscillometric sphygmomanometer for ankle-brachial index measurement." The American J. Emergency Medicine (2020).

Wu, Wei-Te, Su-Shan Tsai, Yu-Jen Lin, Ming-Hsiu Lin, Trong-Neng Wu, Tung-Sheng Shih, and Saou-Hsing Liou. "Utility of overnight pulse oximeter as a screening tool for sleep apnea to assess the 8-year risk of cardiovascular disease: Data from a large-scale bus driver cohort study." Int. J. cardiology 225 (2016): 206-212.

Huizing, Maurice J., Eduardo Villamor-Martinez, Ingrid A. Chavagne, Ward Y. Vanagt, Marc A E Spaanderman, and Eduardo Villamor. "Reliability and validity of a smartphone-paired pulse oximeter for screening of critical congenital heart defects in newborns." Neonatology 112, no. 4 (2017): 324-329.

Krishnamohan, Anirudh, Viraj Siriwardana, and Justin J. Skowno. "Using a pulse oximeter to determine clinical depth of anesthesia—investigation of the utility of the perfusion index." Pediatric Anesthesia 26, no. 11 (2016): 1106-1111.

Montalto, A., A. Palermo, R. Gherli, A. Cammardella, C. Contento, V. Piazza, and F. Musumeci. "Pulse Oximeter usefulness for blood pressure monitoring in patients implanted with latest-generation continuous-flow device heartmate 3." In Transplantation Proceedings, vol. 51, no. 1, pp. 210-214. Elsevier, 2019.

Bergese, Sergio D., Michael L. Mestek, Scott D. Kelley, Robert McIntyre Jr, Alberto A. Uribe, Rakesh Sethi, James N. Watson, and Paul S. Addison. "Multicenter study validating accuracy of a continuous respiratory rate measurement derived from pulse oximetry: a comparison with capnography." Anesthesia and analgesia 124, no. 4 (2017): 1153.

Pap, Iuliu Alexandru, Stefan Oniga, Ioan Orha, and Alexandru Alexan. "IoT-based eHealth data acquisition system." In 2018 IEEE Int. Conf Automation, Quality and Testing, Robotics (AQTR), pp. 1-5.

Al Ali, Ammar, Don Carothers, David Dalke, Mohamed K. Diab, Julian M. Goldman, Massi E. Kiani, Michael Lee, Jerome Novak, and Robert Smith. "Systems and methods for acquiring calibration data usable in a pulse oximeter." U.S. Pat. No. 9,375,185, issued Jun. 28, 2016.

Hellman, Yaron, Adnan S. Malik, Kathleen A. Lane, Changyu Shen, I-Wen Wang, Thomas C. Wozniak, Zubair A. Hashmi et al. "Pulse oximeter derived blood pressure measurement in patients with a continuous flow left ventricular assist device." Artificial organs 41, no. 5 (2017): 424-430.

Alian, Aymen A., Gourg Atteya, Dorothy Gaal, Thomas Golembeski, Brian G. Smith, Feng Dai, David G. Silverman, and Kirk Shelley. "Ventilation-induced modulation of pulse oximeter waveforms: a method for the assessment of early changes in intravascular volume during spinal fusion surgery in pediatric patients." Anesthesia & Analgesia 123, no. 2 (2016): 346-356.

Kanz, P., S. Krieger, M. Drillich, and M. Iwersen. "Evaluation of a wireless pulse oximeter for measuring arterial oxygen saturation and pulse rate in newborn Holstein Friesian calves." J. dairy science 101, no. 7 (2018): 6437-6442.

Yamamoto, Akihiro, Naoto Burioka, Aritoshi Eto, Takashi Amisaki, and Eiji Shimizu. "Usefulness of pulse oximeter that can measure SpO2 to one digit after decimal point." Yonago Acta Medica 60, no. 2 (2017): 133-134.

Ram, M. Raghu, Kosaraju Sivani, and K. Ashoka Reddy. "Reduction of motion artifacts from pulse oximeter signals using tunable Q-factor wavelet transform technique." In 2017 Int. Conf Computer, Communication and Signal Processing (ICCCSP), pp. 1-4. IEEE, 2017.

Louie, Aaron, John R. Feiner, Philip E. Bickler, Laura Rhodes, Michael Bernstein, and Jennifer Lucero. "Four types of pulse oximeters accurately detect hypoxia during low perfusion and motion." Anesthesiology: The J. the American Society of Anesthesiologists 128, no. 3 (2018): 520-530.

Lee, H-C., Y-F. Tsai, H-I. Tsai, PC-H. Chung, H-P. Yu, W-C. Lee, and C-C. Lin. "Pulse Oximeter-Derived Pleth Variability Index is a Reliable Indicator of Cardiac Preload in Patients Undergoing Liver Transplantation." In Transplantation Proceedings, vol. 48, no. 4, pp. 1055-1058. Elsevier, 2016.

Blank, Thomas B., Gregory A. Olsen, Cristiano Dalvi, and Hung T. Vo. "Proximity sensor in pulse oximeter." U.S. patent application Ser. No. 16/261,394, filed Jul. 25, 2019.

Singh, Anupam Kumar, Malvinder Singh Sahi, Bablesh Mahawar, and Sajjan Rajpurohit. "Comparative evaluation of accuracy of pulse oximeters and factors affecting their performance in a tertiary intensive care unit." J. Clinical and Diagnostic Research: JCDR 11, no. 6 (2017): 0005.

Gadhoumi, Kais, Kevin Keenan, Rene Colorado, Karl Meisel, and Xiao Hu. "A Statistical Comparative Study of Photoplethysmographic Signals in Wrist-Worn and Fingertip Pulse-Oximetry Devices." In 2018 Computing in Cardiology Conf. (CinC), vol. 45, pp. 1-4. IEEE, 2018.

Jordan, Taylor B., Cody L. Meyers, Walter A. Schrading, and John P. Donnelly. "The utility of iPhone oximetry apps: a comparison with standard pulse oximetry measurement in the emergency department." The American J. emergency medicine 38, no. 5 (2020): 925-928.

Seifpour, Saman, Hamid Niknazar, Mohammad Mikaeili, and Ali Motie Nasrabadi. "A new automatic sleep staging system based on statistical behavior of local extrema using single channel EEG signal." Expert Systems with Applications 104 (2018): 277-293.

Sikdar, Debdeep, Rinku Roy, and Manjunatha Mahadevappa. "Epilepsy and seizure characterisation by multifractal analysis of EEG subbands." Biomedical Signal Processing and Control 41 (2018): 264-270.

Bachmann, Maie, Jaanus Lass, and Hiie Hinrikus. "Single channel EEG analysis for detection of depression." Biomedical Signal Processing and Control 31 (2017): 391-397.

Namazi, Hamidreza, Tirdad Seifi Ala, and Hovagim Bakardjian. "Decoding of steady-state visual evoked potentials by fractal analysis of the electroencephalographic (EEG) signal." Fractals 26, no. 06 (2018): 1850092.

Toth, Brigitta, Karolina Janacsek, Ádám Takács, Andrea Kóbor, Zsófia Zavecz, and Derso Nemeth. "Dynamics of EEG functional connectivity during statistical learning." Neurobiology of Learning and Memory 144 (2017): 216-229.

Ribeiro, Estela, and Carlos Eduardo Thomaz. "A multivariate statistical analysis of EEG signals for differentiation of musicians and non-musicians." In Anais do XV Encontro Nacional de Inteligencia Artificial e Computacional, pp. 497-505. SBC, 2018.

Harne, Bhavna P., and A. S. Hiwale. "EEG spectral analysis on OM mantra meditation: A pilot study." Applied psychophysiology and biofeedback 43, no. 2 (2018): 123-129.

da Silveira, Thiago L T, Alice J. Kozakevicius, and Cesar R. Rodrigues. "Single-channel EEG sleep stage classification based on a streamlined set of statistical features in wavelet domain." Medical & biological engineering & computing 55, no. 2 (2017): 343-352.

Bhattacharyya, Abhijit, Ram Bilas Pachori, and U. Rajendra Acharya. "Tunable-Q wavelet transform based multivariate sub-band fuzzy entropy with application to focal EEG signal analysis." Entropy 19, no. 3 (2017): 99.

Namazi, Hamidreza, Tirdad Seifi Ala, and Vladimir Kulish. "Decoding of upper limb movement by fractal analysis of electroencephalogram (EEG) signal." Fractals 26, no. 05 (2018): 1850081.

Zorick, Todd, Jordan Landers, Andrew Leuchter, and Mark A. Mandelkern. "EEG multifractal analysis correlates with cognitive testing scores and clinical staging in mild cognitive impairment." J. Clinical Neuroscience (2020).

Sharmila, A., and P. Geethanjali. "DWT based detection of epileptic seizure from EEG signals using naive Bayes and k-NN classifiers." Ieee Access 4 (2016): 7716-7727.

Hassan, Ahnaf Rashik, and Mohammed Imamul Hassan Bhuiyan. "Automated identification of sleep states from EEG signals by means of ensemble empirical mode decomposition and random under sampling boosting." Computer methods and programs in biomedicine 140 (2017): 201-210.

Diykh, Mohammed, and Yan Li. "Complex networks approach for EEG signal sleep stages classification." Expert Systems with Applications 63 (2016): 241-248.

Urigüen, Jose Antonio, Begoña Garcia-Zapirain, Julio Artieda, Jorge Iriarte, and Miguel Valencia. "Comparison of background EEG activity of different groups of patients with idiopathic epilepsy using Shannon spectral entropy and cluster-based permutation statistical testing." PLoS One 12, no. 9 (2017): e0184044.

Namazi, Hamidreza, Erfan Aghasian, and Tirdad Seifi Ala. "Fractal-based classification of electroencephalography (EEG) signals in healthy adolescents and adolescents with symptoms of schizophrenia." Technology and Health Care 27, no. 3 (2019): 233-241.

Niknazar, Hamid, Seyed Reza Mousavi, Mohammad Niknazar, Vahid Mardanlou, and Brett Nelson Coelho. "Performance Analysis of EEG Seizure Detection Features." Epilepsy Research (2020): 106483.

Piñeyro Salvidegoitia, Maria, Nadine Jacobsen, Anna-Katharina R. Bauer, Benjamin Griffiths, Simon Hanslmayr, and Stefan Debener. "Out and about: Subsequent memory effect captured in a natural outdoor environment with smartphone EEG." Psychophysiology 56, no. 5 (2019): e13331.

Williams, Jennifer A., Fodé Abass Cisse, Mike Schaekermann, Foksouna Sakadi, Nana Rahamatou Tassiou, Gladia C. Hotan, Aissatou Kenda Bah et al. "Smartphone EEG and remote online interpretation for children with epilepsy in the Republic of Guinea: Quality, characteristics, and practice implications." Seizure 71 (2019): 93-99.

Tatum, William O., Benedetto DiCiaccio, Joseph A. Kipta, Kirsten H. Yelvington, and Michael A. Stein. "The texting rhythm: a novel EEG waveform using smartphones." J. Clinical Neurophysiology 33, no. 4 (2016): 359-366.

Blum, Sarah, Nadine S J Jacobsen, Martin G. Bleichner, and Stefan Debener. "A Riemannian modification of artifact subspace reconstruction for EEG artifact handling." Frontiers in human neuroscience 13 (2019): 141.

Wolff, Nicole, and Christian Beste. "Short-term Smartphone App-based Focused Attention Meditation Diminishes Cognitive Flexibility." J. Cognitive Neuroscience (2020): 1-12.

Koushik, Abhay, Judith Amores, and Pattie Maes. "Real-time sleep staging using deep learning on a smartphone for a wearable EEG." arXiv preprint arXiv:1811.10111 (2018).

Kim, Seul-Kee, and Hang-Bong Kang. "An analysis of smartphone overuse recognition in terms of emotions using brainwaves and deep learning." Neurocomputing 275 (2018): 1393-1406.

McKenzie, Erica D., Andrew S P Lim, Edward C W Leung, Andrew J. Cole, Alice D. Lam, Ani Eloyan, Damber K. Nirola et al. "Validation of a smartphone-based EEG among people with epilepsy: A prospective study." Scientific Reports 7 (2017): 45567.

Gupta, Shweta. "Smartphone based Early Detection of Epileptic Seizures Using Machine Learning." In Proc. 12th Int. Conf Bioinformatics and Biomedical Technology, pp. 38-42. 2020.

Blum, Sarah, Stefan Debener, Reiner Emkes, Nils Volkening, Sebastian Fudickar, and Martin G. Bleichner. "EEG recording and online signal processing on android: A multiapp framework for brain-computer interfaces on smartphone." BioMed research Int. 2017 (2017).

Sterr, Annette, James K. Ebajemito, Kaare B. Mikkelsen, Maria A. Bonmati-Carrion, Nayantara Santhi, Ciro Della Monica, Lucinda Grainger et al. "Sleep EEG derived from behind-the-ear electrodes (cEEGrid) compared to standard polysomnography: A proof of concept study." Frontiers in human neuroscience 12 (2018): 452.

Kim, Jeong-Youn, Jae-Beom Son, Hyun-Sung Leem, and Seung-Hwan Lee. "Psychophysiological Alteration After Virtual Reality Experiences Using Smartphone-Assisted Head Mount Displays: An EEG-Based Source Localization Study." Applied Sciences 9, no. 12 (2019): 2501.

Ponciano, Vasco, Ivan Miguel Pires, Fernando Reinaldo Ribeiro, Maria Vanessa Villasana, Maria Canavarro Teixeira, and Eftim Zdravevski. "Experimental study for determining the parameters required for detecting ECG and EEG related diseases during the Timed-Up and Go test." Computers 9(3) (2020): 67.

Bai, Jinwei, Li Shen, Huimin Sun, and Bairong Shen. "Physiological informatics: collection and analyses of data from wearable sensors and smartphone for healthcare." In Healthcare and Big Data Management, pp. 17-37. Springer, Singapore, 2017.

Karacan, Mehmet, Nida Celik, Enes Elvin Gul, Celal Akdeniz, and Volkan Tuzcu. "Validation of a smartphone-based electrocardiography in the screening of QT intervals in children." Northern clinics of Istanbul 6, no. 1 (2019): 48.

Koushik, Abhay, Judith Amores, and Pattie Maes. "Real-time Smartphone-based Sleep Staging using 1-Channel EEG." In 2019 IEEE 16th Int. Conf Wearable and Implantable Body Sensor Networks (BSN), pp. 1-4. IEEE, 2019.

Sokolov, Elisaveta, Djibo Hamani Abdoul Bachir, Foksuna Sakadi, Jennifer Williams, Andre C. Vogel, Mike Schaekermann, Nana Tassiou et al. "Tablet-based EEG diagnostics for epilepsy patients in the West African Republic of Guinea." European J. Neurology (2020).

Schumann, Andy, Stefanie Köhler, Lisa Brotte, and Karl-Jurgen Bar. "Effect of an eight-week smartphone-guided HRV-biofeedback intervention on autonomic function and impulsivity in healthy controls." Physiological measurement 40, no. 6 (2019): 064001.

Asci, Francesco, Giovanni Costantini, Pietro Di Leo, Alessandro Zampogna, Giovanni Ruoppolo, Alfredo Berardelli, Giovanni Saggio, & Antonio Suppa. "Machine-Learning Analysis of Voice Samples Recorded through Smartphones: The Combined Effect of Ageing and Gender." Sensors 20(18) (2020): 5022.

United States Patent Application 20190060733 relates to an ear-wearable device. The mobile device may comprise various types of computing devices designed for mobility. For example, a mobile device may comprise a smartphone, a tablet computer, a portable media player device, a Global Navigation Satellite System (GNSS) device, or another type of device designed for mobile use. The mobile device 106 may communicate with a server device via a communication network, e.g., a cellular communication network, such as a 4G LTE network, a 5G network, or a cellular communication network using another type of wireless communication technology. The ear-wearable device is communicatively coupled to a mobile device. An Ear-wearable device and a mobile device may communicate using various wireless communication technologies. For example, an ear-wearable device and a mobile device may communicate using Bluetooth, WiFi, Zigbee, or another wireless communication technology. The ear-wearable device may comprise one or more sensors that collect biometric data regarding a wearer of the ear-wearable device. For example, the ear-wearable device may comprise a body temperature sensor that measures the body temperature of the wearer, one or more sensors for determining the heart rate of the wearer, a galvanic skin response (GSR) sensor, number of steps taken, and so on. An ear-wearable device may wirelessly transmit the biometric data to a computing system. Computing system 104 may use biometric data for various purposes. For example, a computing system may use the biometric data to determine whether it is safe for the wearer of an ear-wearable device to continue playing golf and to notify the wearer if it is not safe to continue play. Thus, in this example, a radio of a computing system may wirelessly receive biometric data from an ear-wearable device. In this example, the biometric data may comprise at least one of heartrate information, body temperature information, number of steps taken, or GSR information. Furthermore, in this example, the computing system may determine, based on the biometric data, whether a wearer of ear-wearable device should stop play of the golf course. Responsive to determining the wearer of the ear-wearable device should stop play of the golf course, the computing system may wirelessly send audio data to the ear-wearable device. The audio data may represent soundwaves of vocalization of advice to stop play of the golf course. In some examples, the computing system may determine that the wearer should stop play on the golf course if the wearer's heart rate and/or body temperature rises above particular thresholds and/or if the wearer has taken more than a particular number of steps in a given time-period. In some examples, the computing system stores records of the biometric data for future reference.

United States Patent Application 20200237317 relates to systems and methods of non-invasive health monitoring, and in particular, a system and method for detection of glucose levels in blood flow using an optical sensor. The biosensor may include a temperature sensor configured to detect a temperature of a user. For example, the temperature sensor may include an array of sensors (e.g., 16×16 pixels) to detect the skin temperature of a user. The temperature sensor may also be used to calibrate the PPG circuit, such as the wavelength output of LEDs or other light sources. The biosensor may include a display to display biosensor data or control interfaces for the biosensor.

The biosensor further includes a transceiver. The transceiver may include a wireless or wired transceiver configured to communicate with or with one or more devices over a LAN, MAN and/or WAN. In one aspect, the wireless transceiver may include a Bluetooth enabled (BLE) transceiver or IEEE 802.11ah, Zigbee, IEEE 802.15-11 or WLAN (such as an IEEE 802.11 standard protocol) compliant transceiver. In another aspect, the wireless transceiver may operate using RFID, short-range radio frequency, an infrared link, or other short-range wireless communication protocol. In another aspect, the wireless transceiver may also include or, alternatively, include an interface for communicating over a cellular network. The transceiver may also include a wired transceiver interface, e.g., a USB port or other type of wired connection, for communication with one or more other devices over a LAN, MAN and/or WAN. The transceiver may include a wireless or wired transceiver configured to communicate with a vehicle or its components over a controller area network (CAN), Local Interconnect Network (LIN), Flex Ray, Media Oriented Systems Transport (MOST), (On-Board Diagnostics II), Ethernet or using another type of network or protocol. The biosensor may transmit health data using the transceiver over a wide area network, such as a cellular network, to a third-party service provider, such as a health care provider or emergency service provider.

The biosensor may also include a motion sensor configured to detect the motion of the biosensor or patient. In an embodiment, the motion sensor includes an accelerometer. Due to motion, a signal quality of the PPG signal may decline. In an embodiment, an acceptable tolerance for a PPG signal quality indicator may be set. When a motion level exceeds a threshold, then the PPG data may be ignored to avoid measurement errors. The biosensor may be programmed to reset after a predetermined level of motion (e.g., a speed or an acceleration) is exceeded.

Photoplethysmography (PPG) is used to measure time-dependent volumetric properties of blood in blood vessels due to the cardiac cycle. For example, the heartbeat affects the volume of blood flow and the concentration or absorption levels of substances being measured in the arterial blood flow. Over a cardiac cycle, pulsating arterial blood changes the volume of blood flow in a blood vessel. Incident light $l_O$ is directed at a tissue site, and a certain amount of light is reflected or transmitted, and a certain amount of light is absorbed. At the peak of blood flow or volume in a cardiac cycle, the reflected/transmitted light $l_L$ is at a minimum due to absorption by the increased blood volume, e.g., due to the pulsating blood in the vessel. At a minimum of blood volume during the cardiac cycle, the transmitted/reflected light $l_H$ is at a maximum due to lack of absorption from the pulsating blood. The biosensor is configured to filter the reflected/transmitted light $l_L$ of the pulsating blood from the transmitted/reflected light $l_H$. This filtering isolates the light due to reflection/transmission of the pulsating blood from the light due to reflection/transmission from non-pulsating blood, vessel walls, surrounding tissue, etc. The biosensor may then measure the concentration levels of one or more substances from the reflected/transmitted light $l_L$ in the pulsating blood. For example, incident light $l_O$ is directed at a tissue site at one or more wavelengths. The reflected/transmitted light l is detected by a photodetector or sensor array in a camera. At the peak of blood flow or volume, the reflected light $l_L$ is at a minimum due to absorption by the pulsating blood, non-pulsating blood, other tissue, etc. At a minimum of blood flow or volume during the cardiac cycle, the Incident or reflected light $l_H$ is at a maximum due to lack of absorption from the pulsating blood volume. Since the light l is reflected or traverses through a different volume of blood at the two measurement times, the measurement provided by a PPG sensor is said to be a "volumetric measurement" descriptive of the differential volumes of blood present at a certain location within the user's vessels at different times during the cardiac cycle. These principles described herein may be applied to venous blood flow and arterial blood flow.

When the heart pumps blood to the body and the lungs during systole, the amount of blood that reaches the capillaries in the skin surface increases, resulting in more light absorption. The blood then travels back to the heart through the venous network, leading to decreased of blood volume in the capillaries and less light absorption. The measured PPG waveform, therefore, comprises a pulsatile (often called "AC") physiological waveform that reflects synchronous changes in the blood volume with a cardiac cycle, which is superimposed on a much larger slowly varying quasi-static ("DC") baseline. The use of PPG techniques as heretofore has been mainly used for measurement of the oxygen saturation of blood in vessels.

A biosensor may include an optical circuit configured to obtain a plurality of PPG signals at a plurality of wavelengths reflected from the tissue of a user, wherein the different wavelengths have varying penetration depths of tissue. The biosensor also includes a processing circuit configured to determine a plurality of L values at a plurality of different wavelengths using the plurality of PPG signals and determine a plurality of R values using the plurality of L values. The processing circuit is further configured to determine one or more other PPG parameters using the plurality of PPG signals; and determine a glucose level in blood flow using the plurality of L values, the plurality of R values and the one or more other PPG parameters. The optical circuit may also be configured to obtain a first PPG signal at a wavelength with a high absorption coefficient for nitric oxide (NO) in blood flow and a second PPG signal at a wavelength with a low absorption coefficient for NO in blood flow. The plurality of L values includes a first L value determined using a first PPG signal obtained at the first wavelength in a range of 380 nm-400 nm; and the second L value determined using a second PPG signal obtained at a second wavelength equal to or above 660 nm).

The biosensor may include a temperature sensor configured to detect a temperature of a user. For example, the temperature sensor may include an array of sensors (e.g., 16×16 pixels) to detect the skin temperature of a user. The temperature sensor may also be used to calibrate the PPG circuit, such as the wavelength output of LEDs or other light sources. The biosensor may include a display to display biosensor data or control interfaces for the biosensor.

The biosensor may include a transceiver, e.g., a wireless or wired transceiver configured to communicate with or with one or more devices over a LAN, MAN and/or WAN. In one aspect, the wireless transceiver may include a Bluetooth enabled (BLE) transceiver or IEEE 802.11ah, Zigbee, IEEE 802.15.11 or WLAN (such as an IEEE 802.11 standard protocol) compliant transceiver. In another aspect, the wireless transceiver may operate using RFID, short-range radio frequency, an infrared link, or other short-range wireless communication protocol. In another aspect, the wireless transceiver may also include or, alternatively, include an interface for communicating over a cellular network. The transceiver 112 may also include a wired transceiver interface, e.g., a USB port or other type of wired connection, for communication with one or more other devices over a LAN, MAN and/or WAN. The transceiver 112 may include a wireless or wired transceiver configured to communicate with a vehicle or its components over a controller area network (CAN), Local Interconnect Network (LIN), Flex Ray, Media Oriented Systems Transport (MOST), (On-Board Diagnostics II), Ethernet or using another type of network or protocol. The biosensor 100 may transmit health data using the transceiver 112 over a wide area network, such as a cellular network, to a third-party service provider, such as a health care provider or emergency service provider.

The biosensor may also include a motion sensor, e.g., an accelerometer, configured to detect the motion of the biosensor or patient.

Embodiments of the biosensor may detect a concentration level of one or more substances within blood flow using PPG techniques. For example, the biosensor may detect nitric oxide (NO) concentration levels and correlate the NO concentration level to a blood glucose level. The biosensor may also detect oxygen saturation ($SaO_2$ or $SpO_2$) levels in blood flow. The biosensor may also be configured to detect a liver enzyme cytochrome oxidase (P450) enzyme and correlate the P450 concentration level to a blood alcohol level.

Note that NO is associated with vasodilation, and local differences in vasodilation may reflect tissue processes proximate to the sensor.

The spectral response obtained at each wavelength may be aligned based on the systolic and diastolic points in their respective spectral responses. This alignment is useful to associate each spectral response with a particular stage or phase of the pulse-induced local pressure wave within the blood vessel (which roughly mimics the cardiac cycle and thus includes systolic and diastolic stages and sub-stages thereof). This temporal alignment helps to determine the absorption measurements acquired near a systolic point in time of the cardiac cycle and near the diastolic point in time of the cardiac cycle associated with the local pressure wave within the user's blood vessels. This measured local pulse timing information may be useful for properly interpreting the absorption measurements in order to determine the relative contributions of the AC and DC components measured by the biosensor.

The systolic and diastolic points of the spectral response are then determined. Because the human pulse is typically on the order of magnitude of one 1 Hz, typically, the time differences between the systolic and diastolic points are on the order of magnitude of milliseconds or tens of milliseconds or hundreds of milliseconds. Thus, spectral response measurements may be obtained at a frequency of around 10-100 Hz over the desired measurement period. The spectral responses are obtained over one or more cardiac cycles, and systolic and diastolic points of the spectral responses are determined. Preferably, the spectral response is obtained over at least three cardiac cycles in order to obtain a heart rate. A low pass filter (such as a 5 Hz low pass filter) is applied to the spectral response signal. The relative contributions of the AC and DC components are obtained $1_{AC+DC}$ and $1_{AC}$. A peak detection algorithm is applied to determine the systolic and diastolic points. If not detected concurrently, the systolic and diastolic points of the spectral response for each of the wavelengths may be aligned or may be aligned with systolic and diastolic points of a pressure pulse waveform or cardiac cycle.

Beer-Lambert equations are then applied. For example, the $L_\lambda$ values are then calculated for the first wavelength $\lambda_1$ and the second wavelength $\lambda_2$.

One or more types of artificial neural networks (a.k.a. machine learning algorithms) may be implemented herein to determine health data from PPG signals. For example, neural networks may be used to obtain a concentration level of NO or glucose or other health data from input data derived from PPG signals. Neural network models can be viewed as simple mathematical models defining a function $f$ wherein $f: X \rightarrow Y$ or a distribution over X or both X and Y. Types of neural network engines or APIs currently available include, e.g., TensorFlow™, Keras™, Microsoft®, CNTK™, Caffe™, Theano™ and Lasagne™.

Sometimes the various machine learning techniques are intimately associated with a particular learning rule. The function f may be a definition of a class of functions (where members of the class are obtained by varying parameters, connection weights, thresholds, etc.). The neural network learns by adjusting its parameters, weights, and thresholds iteratively to yield the desired output. The training is performed using a defined set of rules, also known as the learning algorithm. Machine learning techniques include ridge linear regression, a multilayer perceptron neural network, support vector machines and random forests. For example, a gradient descent training algorithm is used in the case of a supervised training model. In case the actual output is different from the target output, the difference or error is determined. The gradient descent algorithm changes the weights of the network in such a manner to minimize this error. Other learning algorithms include back propagation, least mean square (LMS) algorithm, etc. A set of examples or a training set is used for learning by the neural network. The training set is used to identify the parameters [e.g., weights] of the network.

A pressure pulse wave propagates from deeper tissue to shallower tissue, and thus a phase difference is generated between the pressure pulse wave in the IR and UV signals. As the arteries vasodilate and vasoconstrict, the resistance to the pressure pulse wave changes and changes the propagation time from the deeper tissue to the shallower tissue. This change in propagation time also changes the phase difference between the pressure pulse wave in the IR and UV signals. This phase difference provides a measure of the effects of vasodilation and vasoconstriction. By comparing changes in the phase difference between the UV & IR, the effects of vasodilation and vasoconstriction may be measured.

At the same input power, light at higher wavelengths (IR light) penetrates vascular tissue deeper than light at lower wavelengths (UV light). The optical properties of the tissue are affected by many factors, including but not limited to, skin-tone, tissue hydration, and tissue chemistry. In a sensor configuration where the light from the light source is backscattered to a sensor on the same surface, the optical signal at the sensor includes a sum of all light backscattered that makes it to the focal surface after interacting with the tissue. With the optical power being the same across all wavelengths, some of the light backscattered from the IR light penetrates deeper into the tissue than the UV light does. This means that the different wavelengths of light probe different depths of tissue. Near the surface of the skin, the density of arterial blood vessels is much higher (i.e., the amount of arterial blood) than at the deeper tissue depths. This means that while the IR light is affected by the arterial blood at the shallower depths, the majority of the IR signal is reflected from the deeper arterial blood.

When the heartbeats, the arteries swell as fluid is pushed out of the heart. The leading edge of the swelling or pressure wave moves like a "bulge" through the arterial system. This system can be thought of as an elastically dampened hydraulic system. The pressure wave or bulge in the pulsatile blood flow moves from the lower tissue to the upper tissue. Thus, the deeper penetrating wavelengths (such as IR light) detect a pressure wave first, followed by the lesser penetrating wavelengths (such as visible then UV light). The time delay in the "bulge" or pressure wave moving from the lower tissue into the upper tissue thus creates a time delay in a pressure waveform seen in the PPG signals at different wavelengths. For example, as seen in FIG. 15, a waveform in the UV range has a time delay compared to a waveform in the IR range and a waveform in the visible range (390 nm to 700 nm). This time delay in the different wavelengths is thus due to the depth of penetration into the skin of each wavelength.

Vasodilation/vasoconstriction changes the propagation of the pressure wave, starting in the deeper, larger arteries and then moving to the shallower, smaller ones. In addition, the UV light at 395 nm is absorbed by blood more than at 940 nm. Thus, less blood is needed to obtain the same intensity to sample the PPG signal. Because the deeper arteries are "closer" in the arterial structure to the main arteries supplying blood to the tissue site, they are less rigid than the arterioles that are closer to the surface of the skin (where the majority of the UV signal is reflected). The deeper arteries are more affected by vasodilation and vasoconstriction.

This change in the propagation of the pressure wave can be measured in the change in transfer function from a wavelength that penetrates the tissue deeply (e.g., in the IR range) to a wavelength that penetrates tissue much less deeply (e.g., in the visible or UV range). This means that by measuring the change in shape and time delay of PPG signals of two or more wavelengths with different penetration depths (e.g., wherein at least one is in the near-IR window and one is not), information about vasodilation/vasoconstriction may be determined. Also, because the transfer function between the two depths of penetration is affected by blood pressure, blood viscosity, tissue absorption, and, in general, cardiovascular health, these other parameters can be characterized as well. Features or parameters of the PPG signal that can be examined include, but are not limited to, the time delay between the systolic points and diastolic points in different wavelengths and the difference in dicrotic notch suppression between wavelengths.

Vasoconstriction forces a greater volume of blood out of the tissue site. This will lead to a decrease in absorption in the field of view of the sensor because, in general, the blood absorbs more light than tissue. There will be an increase in the intensity of the reflected light detected at the biosensor because less light is being absorbed (because there is less blood to absorb it). This will lead to a sharp increase in the "DC" signal. Additionally, because the surface area of the blood vessels is decreased, the intensity of the pulsating signal due to the pressure pulse wave (the AC signal) is decreased.

Vasodilation or vasoconstriction may also change the color or hue of the skin tissue due to expansion or contraction of the vessels. This increase or decrease of blood flow may change the hue of the skin. By monitoring the hue of the skin, the biosensor 100 may detect vasodilation or other changes in blood circulation in the tissue. For example, a PPG signal in a visible light range such as at a yellow (590 nm-560 nm) or Red (564 nm-580 nm) or Blue (490 nm-450 nm) wavelength may be used to detect a change in hue of the skin.

Endothelial cells also mediate rapid responses to neural signals for blood vessel dilation by releasing NO to make smooth muscles relax in the vessel wall. Production of NO counteracts or mediates the constricting effects of ET-1 in response to insulin in vasculatures. Insulin stimulates NO production in endothelial cells by subsequently activating the intracellular enzymes 1-phosphatidylinositol 3-kinase (PI3-kinase) and Akt, which activates endothelial NO synthase. NO, stimulated by higher insulin doses, is thought to be the underlying agent in insulin-mediated, endothelium-dependent vasodilation. In healthy arteries, smaller levels of ET-1 are produced in comparison to NO levels, and so the bioavailability of NO is preserved.

In vascular dysfunction, there is an increased expression of ET-1 in smooth muscle cells and macrophages. There is also an increased expression of $ET_B$ receptors on smooth muscle cells mediating vasoconstriction. In addition, ET-1 may decrease endothelial NO synthase (eNOS) expression, thereby reducing NO production. Both the $ET_A$ and the $ET_B$ receptors on smooth muscle cells may mediate formation of superoxide in endothelial dysfunction. Superoxide will decrease the biological activity of NO by forming peroxynitrate ($ONOO^-$). This increases the effect of ET-1 and decreases the effect of NO on smooth muscle cells. Clinical evidence in obesity and diabetes suggest Endothelial dysfunction as a failure to vasodilate adequately after application of an endothelium-dependent vasodilator but also excess vasoconstrictor tone. Thus, ET-1 contributes to endothelial dysfunction both directly, through its vasoconstrictor effects, and indirectly, through inhibitory effects on NO production.

Collectively, the balance of these effects in endothelial dysfunction is shifted towards more vasoconstriction, inflammation, and oxidative stress. This pathogenic role of the altered expression and biological actions of ET-1 in vascular dysfunction may lead to the development of a cardiovascular disease, atherosclerosis, and hypertension. For example, dysfunction of the vascular endothelium is an early finding in the development of cardiovascular disease and is closely related to clinical events in patients with atherosclerosis and hypertension.

As discussed above, in the vascular system, insulin stimulates both ET-1 and NO activity. An imbalance between the efficacy of these substances may be involved in the pathophysiology of heart disease, hypertension, and atherosclerosis. Thus, a device and method to determine the balance of these substances in vivo would be important in determining insulin-resistance and vascular health. At "rest", a body responds to caloric intake by releasing insulin into the bloodstream. This insulin release stimulates ET-1 and NO activity.

The vasoconstriction in response to insulin release is thus affected by the balance of ET-1 and NO as well as vascular disease such as atherosclerosis. By measuring the relative vasoconstriction or relative change in arterial diameter in response to insulin release, vascular health may be assessed using the biosensor.

In healthy persons, arterial walls are more flexible and thus have a greater relative change in diameter in response to insulin. The Pulse Shape Correlation and Phase Delay signals reflect a greater change in signal levels in response to insulin. The R value pulses are correspondingly more pronounced. The phase timing is inversely proportional to the arterial diameters.

In patients having endothelium dysfunction, the arteries exhibit stiffness with a decreased relative change in diameter. Endothelium dysfunction may be found in patients with diseases such as atherosclerosis, hypertension, and diabetes. The Pulse Shape Correlation and Phase Delay respond with a decreased relative amplitude change during an insulin release event. The Pulse Shape Correlation and Phase Delay may thus be used to determine arterial stiffness and vascular health.

The phase delay, pulse shape correlation, and R value may also be used to determine whether ET-1 or NO is more dominant in response to insulin. For example, the average or mean-range of one or more of these measurements in a healthy population is measured. Then, an individual measurement is compared to the average or mean range of one or more of phase delay, pulse shape correlation, and R value. The comparison may be used to obtain whether an imbalance is present between the effects of ET-1 and NO. An imbalance in the effects of the two substances has an increased vasoconstrictor effect on vessels due to an increase in ET-1 activity. In addition, this change in the propagation of the pressure wave can be measured in the change in transfer function from a wavelength that penetrates the tissue deeply (e.g. in the IR range) to a wavelength that penetrates tissue much less deeply (e.g., in the visible or UV range). This means that by measuring the change in pulse shape and phase delay of the PPG signals at two or more wavelengths with different penetration depths (e.g., wherein at least one is in the near-IR window and one is not), information about a level of vasoconstriction/vasodilation may be determined.

The parameters from the sensors may be processed using artificial intelligence (AI) or machine learning technique. The AI processing device may be pre-configured with weights, parameters, or other learning vectors derived from a training set. The training set preferably includes the same input parameters and known values. During a learning stage, the neural network adjusts parameters, weights, and thresholds iteratively to yield a known output from the input parameters (PPG parameters, patient vitals and/or patient data). The training is performed using a defined set of rules, also known as the learning algorithm. For example, a gradient descent training algorithm is used in the case of a supervised training model. In case the actual output is different from the target output, the difference or error is determined. The gradient descent algorithm changes the weights of the network in such a manner to minimize this error. Other learning algorithms that may be implemented include back propagation, least mean square (LMS) algorithm, a "random forest," deep belief network trained using restricted Boltzmann machines, or support vector machine. The analysis may use any known regression analysis technique, such as, for example, and without limitation, random forests, support vector machines, or a deep belief network trained using restricted Boltzmann machines. In another embodiment, the machine learning process may include a classifier type algorithm. Other types of AI processing models may also be implemented to analyze the plurality of parameters (PPG parameters, patient vitals and patient data) to obtain the desired output response. As an alternative to AI processing, the plurality of parameters may also be processed using a custom algorithm or processing model to obtain the output of glucose in 4814.

A multi-parameter approach may be used to diagnose health conditions, such as kidney function, heart failure, atrial fibrillation, other heart conditions, atherosclerosis, pneumonia, staph infections, sepsis, other types of infections, respiratory function, COPD, diabetes, Type I diabetes, or Type II diabetes. A plurality of PPG parameters is input into a neural network or AI classifier model that has been trained with data of patients clinically diagnosed with the target health condition. The plurality of parameters preferably includes a multiplicity of R values, each obtained using different wavelength ratios and a multiplicity of L values obtained at different wavelengths.

It is an object to provide a biometric system, comprising: a plurality of wearable or implantable sensors, each sensor comprising: a housing; a power supply; at least one physiological transducer configured to sense a respective physiological condition of a user local to the respective physiological transducer; and a communication port configured to transmit physiological data derived from the sensed physiological condition; and a personal mobile electronic device configured to: analyze spatial and temporal differences of physiological data received from each of the plurality of wearable or implantable sensing devices; and produce an output responsive to the spatial and temporal differences.

It is also an object to provide a biometric monitoring method, comprising: providing a plurality of wearable or implantable sensors, each sensor comprising a housing, a power supply, at least one physiological transducer configured to sense a respective physiological condition of a user local to the respective physiological transducer, and a communication port configured to transmit physiological data derived from the sensed physiological condition; analyzing spatial and temporal differences of physiological data received from each of the plurality of wearable or implantable sensing devices with an automated processor in a personal mobile electronic device; and producing an output responsive to the spatial and temporal differences.

It is a further object to provide a method of denoising physiological signals received from a plurality of interconnected devices, comprising: providing a plurality of interconnected devices, each comprising a housing, a power supply, at least one physiological transducer configured to sense a respective physiological condition of a user dependent on a location of the respective physiological transducer with respect to the user, and a communication port configured to transmit time-coded physiological data derived from the sensed physiological condition; communicating the physiological data from the plurality of interconnected devices to a personal mobile electronic device; and denoising the physiological signal in the personal mobile electronic device by performing a spatial and temporal analysis of the physiological data from the plurality of interconnected devices according to a predictive statistical model of the user.

It is also an object to provide a method of denoising physiological signals from a plurality of interconnected devices, comprising: providing a plurality of interconnected devices, each comprising a housing, a power supply, at least one physiological transducer configured to sense a respective physiological condition of a user dependent on a location of the respective physiological transducer with respect to the user, and a communication port configured to transmit time-coded physiological data derived from the sensed physiological condition and to receive time-coded physiological data derived from the sensed physiological condition from another interconnected device; communicating the physiological data from the plurality of interconnected devices to a personal mobile electronic device; and denoising the physiological signal by performing a spatial and temporal analysis of the physiological data from at least two of the interconnected devices according to a predictive statistical model of the user.

The communication port may transmit wirelessly through a wireless local area network (LAN), a wireless personal area network (PAN), and/or a wireless body area network (BAN).

The physiological data may be selected from the group consisting of a cardiac activity, a muscular activity, a galvanic skin response, an electrophysiological activity; a temperature, a blood pressure, a glucose level, an oxygen saturation, a nitric oxide level, a vasodilation level, an extravascular fluid condition, a physical balance, a muscular coordination, a physical exhaustion, an endurance limit.

The plurality of wearable or implantable sensors may comprise a first wearable or implantable sensor located on a right extremity, and a second a wearable or implantable sensor located on a left extremity, to thereby provide bilateral sensing. A third wearable or implantable sensor device may be located on a torso. The plurality of wearable or implantable sensors may comprise a respective wearable sensor device in each ear canal.

Each respective wearable sensor device in each ear canal may comprise at least one microphone and a speaker, wherein each respective wearable sensor device has a first mode in which the at least one microphone is used for voice amplification and the speaker is used for audio reproduction, and a second mode in which the at least one microphone is used to acquire vascular sounds and the vascular sounds are not reproduced by the speaker.

Each of the plurality of wearable or implantable sensors may comprise an optical sensing device, a mechanical sensing device, a chemical sensing device, and/or an electromagnetic signal sensing device (e.g., light, electric field, magnetic field).

The personal mobile electronic device may comprise a smartwatch, having at least one physiological sensor to sense a respective physiological condition of the user at a respective wrist.

The personal mobile electronic device may be further configured for filtering the physiological data from each physiological transducer based on correlations of the physiological data from the plurality of plurality of wearable or implantable sensors.

The personal mobile electronic device may be further configured to apply statistical techniques to the physiological data from each physiological transducer to classify a physiological condition of the user. The personal mobile electronic device may be further configured to statistically classify a spatial and temporal pattern of the physiological data from each physiological transducer, and to selectively produce an output dependent thereon.

The personal mobile electronic device may be further configured to adaptively update a statistical model of the user in dependence on the physiological data from each physiological transducer, to predict a spatial and temporal pattern of the physiological data, and to statistically determine significant changes of the user in dependence on a deviation of a spatial and temporal pattern of the physiological data from each physiological transducer from the predicted spatial and temporal pattern.

The personal mobile electronic device may be further configured to implement a hidden Markov model (HMM) of the user, and to determine a probability of future user states in dependence on the hidden Markov model.

It is also an object to provide a system for acquiring and analyzing a biometric data from a user, the system comprising: a plurality of interconnected devices, each interconnected device comprising at least one wearable or implantable sensor for acquiring physiological data; and a personal mobile electronic device wirelessly connected to each of the plurality of interconnected devices, and being configured to receive and analyze physiological data acquired by each of the plurality of interconnected devices.

The plurality of interconnected wearable devices is interconnected wirelessly through a wireless local area network (LAN), a wireless personal area network (PAN), a wireless body area network (BAN), a cellular network, a wideband communication network, or the like.

The physiological data may be selected from the group consisting of a temperature, a heart rate, a heart pattern, an electrocardiogram (ECG), an electrostatic potential, an electrophysiological signal; a blood pressure, a glucose level, an acceleration, a brainwave, a neuronal oscillation, an electroencephalogram, an oxygen saturation, a nitric oxide level, an ear canal pressure, a muscular tone, a physical activity, physical exhaustion, an endurance limit, a physical activity level, a number of steps, a distance of walking, distance of running, a movement, a velocity, an acceleration, a number of calories, and a sleep stage.

The plurality of interconnected devices may comprise a first device located on a right extremity, and a second device is located on a left extremity to provide bilateral sensing. A third device may be located on the torso of the user. At least one sensor may be provided on each limb of the user. The plurality of interconnected wearable devices may be at least five devices, one on each limb and one on the torso or head of the user. The plurality of interconnected devices may include devices provided in each ear canal. The interconnected devices may be located on one of a face, a forehead, and a head of the user. The interconnected device may comprise a pair of hearing aids, a pair of headphones, and a pair of earpods or earbuds, i.e., audio reproduction devices that are inserted into the aural canal, and typically wirelessly connect with an audio source using Bluetooth or BLE. Each of the pair of hearing aids, pair of headphones, and pair of earpods may comprise a microphone. Each of the pair of hearing aids, pair of headphones, and a pair of earpods is configured to measure pressure inside a respective ear canal.

The sensor may be selected from the group consisting of a thermometer, a diode, a galvanic skin response sensor, an oximeter, a microphone, a light sensor, a glucose sensor, an electrocardiographic sensor, an electroencephalographic sensor, and an accelerometer.

At least one wearable device may be a bracelet, a band, a smartwatch, a ring, an anklet, a cuff, a chest strap, a headband, a hearing aid, an earphones, an earpod, an earring, and/or eyeglasses.

The personal mobile electronic device may be selected from the group consisting of a smartphone, a smartwatch, a personal digital assistant (PDA), and a tablet.

The personal mobile electronic device may be further configured to compute a physiological parameter from a plurality of physiological data sets related to the physiological parameter, wherein each physiological data set of the plurality of physiological data sets is acquired by a different interconnected device located at different locations on the body of the user. The personal mobile electronic device may be further configured for computing the physiological parameter by averaging the physiological data.

The personal mobile electronic device may be configured for computing the physiological parameter by using noise-filtering on the plurality of data sets related to the physiological parameter. The personal mobile electronic device may be configured for computing the physiological parameter by using statistical techniques for analyzing the plurality of data sets related to the physiological parameter. The personal mobile electronic device may be further configured to compute a physiological parameter depending on the value of at least one other physiological parameter acquired by a different interconnected device. The personal mobile electronic device may be configured to compute a difference between the same physiological parameter acquired on opposite extremities. The personal mobile electronic device may be configured to compute a bilateral difference between arms, hands, legs, feet, ears, breasts, cheeks, temples, and eyes. The personal mobile electronic device may be configured to compare an electroencephalogram (EEG) acquired from the opposite lobes of the brain. The personal mobile electronic device may be configured to compare the same physiological parameter acquired from opposite lungs. The personal mobile electronic device may be configured to compare the computed difference to a predetermined threshold.

A regime of operation of a first of the plurality of interconnected devices may depend on a signal received from a second of the plurality of interconnected devices.

A remote server wirelessly accessible by the personal mobile electronic device may be provided, e.g., through the Internet or a cellular data network, or Internet of Things (IoT) network. The remote server may be accessible by a healthcare provider.

The personal mobile electronic device may be configured to generate an alert if the computed difference exceeds the predetermined threshold value.

The personal mobile electronic device may comprise machine learning software, and may actively learn and/or adapt to signals receive or an environment of operation. The personal mobile electronic device may receive parameters dependent on machine learning for executing an algorithm on the sensor data. The machine learning software may be one of a neural network and a deep neural network trained to recognize a likely health issue based on the data sets received from the plurality of interconnected devices.

It is another object to provide a method of controlling a first device of by a second device of a plurality of interconnected devices, comprising: operatively connecting the first device of the plurality of interconnected devices with the second device the plurality of interconnected devices into a local network; sending a signal from the second device to the first device; receiving a signal by the first device from the second device; and changing a regime of operation of the first device depending on the signal received from the second device.

The interconnected devices may be wearable devices or implanted devices.

The local network may be one of a wireless local area network (LAN), a wireless personal area network (PAN), and a wireless body area network (BAN).

It is a further object to provide a method of denoising a physiological signal received from a plurality of interconnected devices, the method comprising the steps of: sending a plurality of signals related to the physiological signal from at least two of the plurality of interconnected devices to a personal mobile electronic device; receiving the plurality of signals by the personal mobile electronic device; and denoising the physiological signal by comparing the plurality of signals related to the physiological signal received from at least two of the plurality of interconnected devices, wherein the denoising is performed using the personal mobile electronic device.

It is a still further object to provide a method of computing a physiological signal received from at least two interconnected devices, the method comprising the steps of: sending data sets related to the physiological signal from at least two of interconnected devices to a personal mobile electronic device; receiving the data sets by the personal mobile electronic device; and computing the value of the physiological signal by averaging the values in data sets related to the physiological signal received from at least two interconnected wearable devices, wherein the averaging is performed by the personal mobile electronic device.

It is also an object to provide a method of computing a physiological signal received from a plurality of interconnected wearable devices, the method comprising the steps of: sending a plurality of signals related to the physiological parameter from at least two interconnected devices to a personal mobile electronic device; receiving the plurality of signals by the personal mobile electronic device; and computing the physiological signal by statistical analysis on the plurality of signals related to the physiological parameter received from at least two interconnected devices, wherein the statistical analysis is performed using the personal mobile electronic device.

The plurality of interconnected wearable devices may communicate through a network selected from the group consisting of a wireless local area network (LAN) and a body local area network (BAN).

The method may further comprise sending the computed physiological signal to a healthcare provider.

A further object provides a method of detecting a cerebrovascular accident (stroke) in a user, comprising: measuring a muscle tone in a muscle on the right side of the user's body using a first wearable device; measuring a muscle tone in a corresponding muscle on the left side of the users body using a second wearable device; sending the first value corresponding to muscle tone in a muscle on the right side of the user's body to a personal mobile device; sending the second value corresponding to muscle tone in a muscle on the left side of the user's body to the personal mobile device; comparing the first value with second value to compute a delta, the computing done by the personal mobile device; comparing the delta with a predetermined threshold value, the comparison performed by the personal mobile device; and if the delta exceeds the predetermined threshold value, execute by the personal mobile device a predetermined set of steps. The predetermined set of steps may be at least one of notifying the user, notifying the user's next of kin, notifying the user's healthcare provider, notifying the users caretaker, notifying an ambulance, notifying police, notifying a first responder, sounding an alarm, and instructing an implanted device to release an anti-stroke medication.

A still further object provides a biometric sensor, comprising: a power source; at least one sensor, selected from the group consisting of an electrochemical sensor, an electrophysiological sensor, a photoplethysmographic sensor, a microphone sensor, an accelerometer, a pressure sensor, a photometric sensor, and an ultrasonic sensor; a radio transceiver; a memory; and at least one microcontroller, configured to receive data from the at least one sensor, process the data to form a digital stream, store the digital stream in the memory; perform data compression to produce compressed data, transmit the compressed data through the radio transceiver using a reliable protocol, and perform a time synchronization with at least one other biometric sensor.

Another object provides a physiological sensor node of an ad hoc wireless body network, comprising: a self-contained power source; a microcontroller; at least one memory; at least one physiological sensor; and a transceiver, wherein the microcontroller is controlled in dependence on instruction codes stored in the at least one memory, and powered by the self-contained power source, to: synchronize a timebase based on communications through the transceiver; acquire time-coded sensor data from the at least one physiological sensor, process the time-coded sensor data to normalize a sensor reading; prepare at least one data packet selectively dependent on the processed time-coded sensor data and identifying the physiological sensor node; transmit the at least one packet to at least one other node of the ad hoc wireless body network according to a communication parameter; receive information selectively dependent on a state of the ad hoc wireless body network; and modify the communication parameter selectively dependent on the received information.

A further object provides a control node of an ad hoc wireless body network, comprising: a self-contained power source; a microcontroller; at least one memory; and a first transceiver, a second transceiver; wherein the microcontroller is controlled in dependence on instruction codes stored in the at least one memory, and powered by the self-contained power source, to: receive time-stamped sensor data from a plurality of different physiological sensor devices of the ad hoc wireless body network through the first transceiver, analyze the received time-stamped sensor data to quantitatively determine relative timing of corresponding features reflected in the time-stamped sensor data between the plurality of different physiological sensor devices, quantitatively analyze the determined relative timing and sensor data for the plurality of different physiological sensor device, and qualitatively characterize an event with respect to at least historical sensor data; determine occurrence of an abnormal event based on at least the quantitative and qualitative analysis; transmit at least one packet over the second transceiver, according to an encrypted protocol; determine a state of the ad hoc wireless body network; and transmit at least one packet over the first transceiver selectively dependent on a state of the ad hoc wireless body network.

Another object provides a control node of an ad hoc wireless body network, comprising: a microcontroller; a transceiver, wherein the microcontroller is controlled in dependence on stored instruction codes, to: receive time-coded sensor data from a plurality of physiological sensor devices through the transceiver, analyze the received time-coded sensor data to determine relative timing of corresponding features; quantitatively analyze the determined relative timing and received time-coded sensor data; qualitatively characterize the received time-coded sensor data, based on both current time-coded sensor data and historical time-coded sensor data; determine occurrence of an event based on at least the quantitative analysis and the qualitative analysis; transmit at least one packet over the second transceiver, according to an encrypted protocol, based on the received time-coded sensor data from at least one physiological sensor device, comprising an adaptation parameter for altering operation of a respective physiological sensor device, and determined state of the ad hoc wireless body network.

The control node of the ad hoc wireless body network may be associated with a physiological sensor node of the ad hoc wireless body network, comprising: a microcontroller, at least one physiological sensor, and a transceiver, wherein the microcontroller is controlled in dependence on stored instruction codes, to: synchronize a timebase based on communications with the control node through the transceiver; acquire time-coded sensor data from the at least one physiological sensor, transmit at least one data packet selectively dependent on the time-coded sensor data and identifying the physiological sensor node, according to a communication parameter; receive information selectively dependent on the state of the ad hoc wireless body network from the control node through the transceiver, and modify the communication parameter selectively dependent on the received information.

A further object provides a system for acquiring and analyzing a biometric data from a user, the system comprising: (i) at least two wireless devices capable of measuring at least one physiological parameter, wherein the at least two wireless devices are being configured to be located at different location of the user's body for measuring the same at least one physiological parameter at the location; and (ii) a personal mobile electronic device wirelessly connected to each of the at least two wireless devices, wherein the at least two wireless devices being configured to transmit biometric data acquired by measuring at least one physiological parameter to the personal mobile electronic devise, wherein the personal mobile electronic device being configured to receive and compare the biometric data about the same physiological parameter measured at two different locations and transmitted by the at least two wireless devices.

Each of the wireless devices may be one of a wearable device and an implantable device.

Each of the at least two wireless devices may be wirelessly connected to the personal mobile electronic device via wireless personal area network (WPAN). The WPAN may operate using at least one of a Bluetooth, Infrared Data Association protocol (IrDA), 802.15, and a WiFi.

The physiological parameter may be selected from the group consisting of a temperature, a heart rate, a heart pattern, an electrocardiogram (ECG), a galvanic skin potential, an electrophysiological signal, a blood pressure, a glucose level, a brainwave, a neuronal oscillation, an electroencephalogram, an oxygen saturation, a nitric oxide level, an ear canal pressure, and muscular tone.

The at least two wireless devices may comprise a first device located on a right extremity, and a second device is located on a left extremity, to provide bilateral sensing and comparison. The at least two wireless devices may comprise a first device located on a right side of the user's body, and a second device is located symmetrically on a left side of the users body, to provide bilateral sensing and comparison. The at least two wireless devices may comprise a first device located on a right extremity, and a second device is located on a left extremity, to provide bilateral sensing and comparison. The at least two wireless devices may comprise a first device located on a right hand of the user, and a second device is located on a left hand of the user, to provide bilateral sensing and comparison. The at least two wireless devices may comprise a first device located on a right leg of the user, and a second device is located on a left leg of the user, to provide bilateral sensing and comparison. The at least two wireless devices may be at least four wireless devices that comprise a first device located on a right hand of the user, a second device is located on a left hand of the user, a third device located on a right leg of the user, and a second device is located on a left leg of the user, to provide bilateral sensing and comparison. The at least two wireless devices may be one of a pair of hearing aids, a pair of headphones, and a pair of earpods. The at least two wireless devices may be interconnected in one of a wireless personal area network (WPAN) and body area network (BAN) (en.wikipedia.org/wiki/Body_area_network).

A first of the at least two wireless devices may be provided in a first ear canal and a second of the at least two wireless devices is provided in a second ear canal.

Each of the wireless devices may comprise a sensor selected from the group consisting of a thermometer, a diode (bipolar junction), a galvanic skin response sensor, an oximeter, a microphone, a light sensor, a glucose sensor, an electrocardiographic sensor, an electroencephalographic sensor, and an accelerometer.

At least one of the at least two wireless devices may be a wearable device selected from the group consisting of a bracelet, a band, a smartwatch, a ring, an anklet, a cuff, a chest strap, a headband, a hearing aid, an earphone, an earpod, an earring, and eyeglasses.

The personal mobile electronic device may be selected from the group consisting of a smartphone, a smartwatch, a personal digital assistant (PDA), and a tablet.

The personal mobile electronic device may be further configured to compute a physiological parameter from a plurality of physiological data sets related to the physiological parameter, wherein each physiological data set of the plurality of physiological data sets is acquired by different device of at least two wireless devices located at different locations on the body of the user.

The personal mobile electronic device may be further configured to compute a physiological parameter by averaging values in the plurality of physiological data sets.

The personal mobile electronic device may be further configured for computing the physiological parameter by using statistical techniques for analyzing the plurality of data sets related to the physiological parameter.

The personal mobile electronic device may be further configured to compute a difference between the same physiological parameter acquired on opposite extremities.

It is also an object to provide a method of computing a difference between values of a physiological parameter received from at least two wireless devices located on the opposite sides of a user, the method comprising the steps of: measuring a value of the physiological parameter at a first location by a first of the at least two wireless devices; measuring a value of the physiological parameter at a second location by a second of the at least two wireless devices; sending a first data related to the values the physiological parameter from a first of the at least two wireless devices to a personal mobile electronic device; sending a second data related to the values of the physiological parameter from a second of the at least two wireless devices to a personal mobile electronic device; receiving the first data by the personal mobile electronic device; receiving the second data by the personal mobile electronic device; and computing the difference between values of the physiological parameter measured on the opposite sides of the users body by subtracting the values of the physiological parameter from the second data from the values of the physiological parameter from the first data.

The method may further comprise comparing differences between physiological parameters measured at two locations with a predetermined threshold; and if the difference is greater than the predetermined threshold, alerting at least one of the user, a user's caretaker, a user's designated person, and a healthcare provider.

BRIEF DESCRIPTION OF THE DRAWINGS

The embodiments herein will be better understood in view of the description of the drawings, which are as follows.

DETAILED DESCRIPTION OF THE INVENTION

Figure 1:
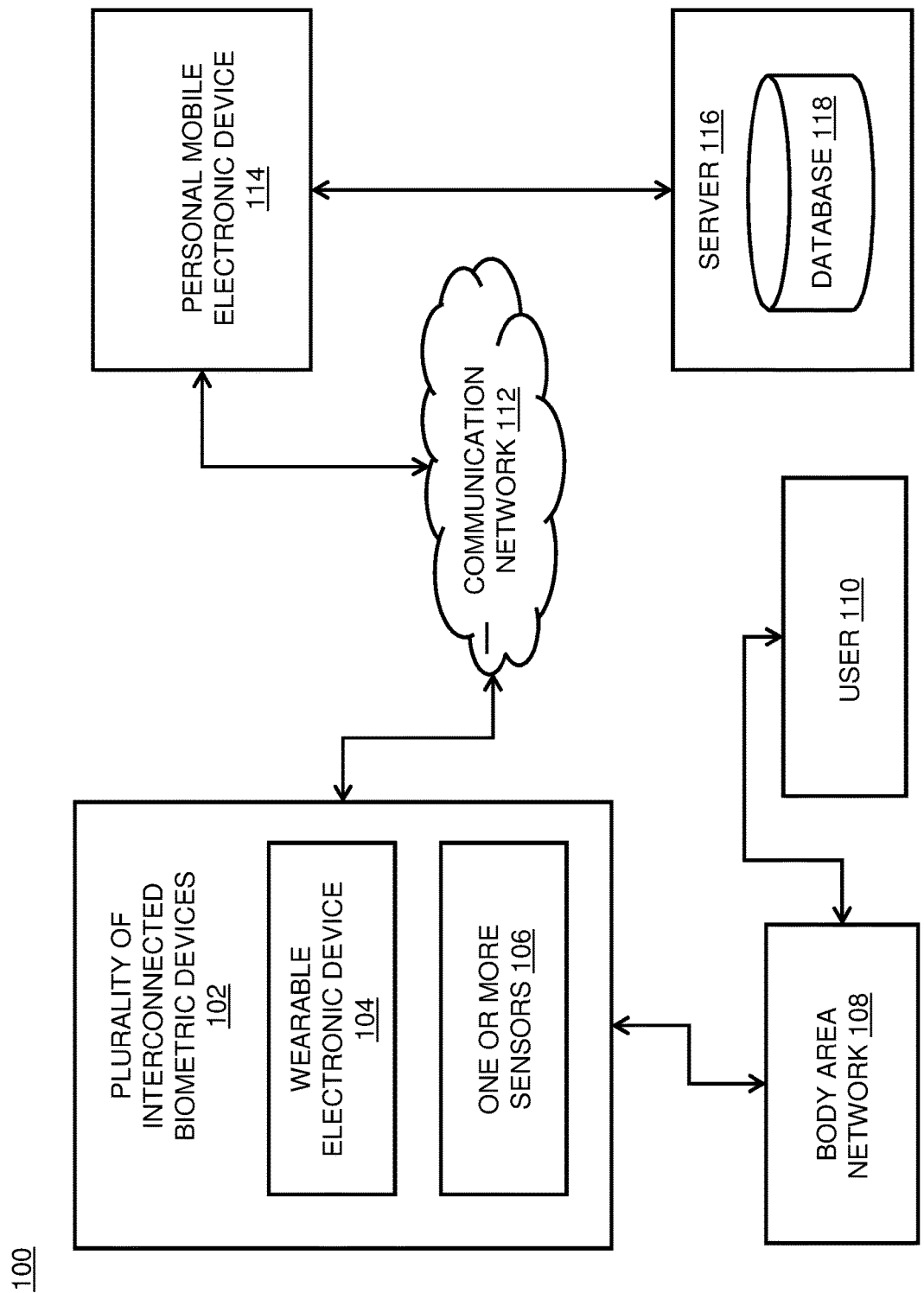
FIG. 1 illustrates a general overview of a system for acquiring and analyzing wearable data from a user, in accordance with various embodiments of the present disclosure.

The embodiments herein and the various features and advantageous details thereof are explained more fully with reference to the non-limiting embodiments that are illustrated in the following detailed description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims. The terms like can be, shall be, could be, and other related terms herein disclosed in the foregoing and later parts of the specification in any means do not limit or alter the scope of the present invention. The terms are provided just for the mere understanding of the main invention and its embodiments.

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

The described implementations may be implemented in any device, apparatus, or system. In one example, the described implementations may be implemented in an implant device or implantable medical device. For example, the described implementations may be implemented in a battery-powered implantable medical device, such as a neurostimulator. Some of the described implementations may be implemented in an interrogator device for communicating with an implant device. Nonetheless, the teachings are not intended to be limited to the implementations depicted solely in the Figures, but instead, have wide applicability as will be readily apparent to one having ordinary skill in the art.

More generally, the power source for the physiological sensor device, which includes a housing, may be a battery, supercapacitor, electrochemical cell (e.g., glucose oxidase), fuel cell, flowing electrolyte cell, metal-air cell, photovoltaic cell, thermionic cell, nuclear fission-powered cell, energy harvesting device (vibration/acceleration, moveable magnet-in-coil, solenoid to gather stray magnetic fields, radiofrequency energy harvesting, piezoelectric harvesting, thermoelectric harvesting, etc.). In an energy harvesting system, the power directly available from the harvesting mechanism may be beneath the peak power requirements of the system. (An RFID system with active interrogation is a counterexample, where power during interrogation equals or exceeds the operating power of the transponder). Therefore, a rechargeable battery (e.g., lithium-ion) and/or supercapacitor is provided to store power. The device housing is preferably sealed, and therefore where a direct charging mechanism is provided, it is by inductive coupling, e.g., to a coil located within the housing. Due to possible corrosion and/or skin allergies, ohmic contacts are not preferred, though a robust set of gold surface (e.g., solid, plated) contacts, or other insert conductive material (e.g., carbon-loaded silicone polymer) may be employed. Due to cost and space limitations, it is often efficient to employ the same coil for both inductive coupling for power transfer to the system, as for communications, and in such a system, RFID technologies may be employed. Multiple considerations are involved in the selection of communication standards. Lower frequencies may have lower power requirements and thus longer range for the same power requirements, but for optimal operation may require physically larger antennae. However, other issues involve congestion of the communication channel or band by other users/uses, interference, data rate, compatibility with other devices (e.g., smartphone: Bluetooth, BLE, NFC, WiFi, 2.4 GHz, 5 GHz, 6 GHz, 60 GHz, 4G, LTE, 5G [low, mid, high), computational complexity, etc. Thus, there is no single optimum design absent consideration of context-dependent externalities. However, it is useful the for the device to be compatible with common smartphone communication modalities, which include Bluetooth/BLE, WiFi, cellular 4G, LTE, 5G, NFC, IR, optical, and acoustically-coupled, and in rare instances, use of the inertial management unit (IMU) sensors as data communication ports (e.g., magnetometers to detect low-frequency magnetic field modulation).

The device requires an embedded microprocessor, and cost and power constraints weigh toward the integration of the processor with the communications controller. Such devices typically provide an ARM M0 or M3 core running at a relatively low clock rate, and which can provide data acquisition and logging, data normalization and initial analysis, and communication control. According to a preferred aspect of the invention, the physiological sensor devices are capable of intercommunicating according to an ad hoc communication protocol, independent of a centralized controller, to provide reliable data acquisition, analysis of multi-sensor data for alert or alarm states, and efficient extra ad hoc network communications.

According to a preferred embodiment, the physiological sensor network is an "open" network, permissive of compatible devices of different types, and not requiring particular constellations of sensors. However, it may be efficient to require a single control node, which may be independent or part of a sensor device. Thus, a chest-wall mounted cardiac sensor device (typically by adherent pads with skin electrodes) may be provided as a core device, which provides a common gateway for external communications and centralized network control. However, it is preferred that the core device be closed, i.e., have a "proprietary" interface which ensures privacy, security, and limited vulnerability footprint for intrusions, attacks, and the like. On the other hand, the core device may also implement a virtual private network through a potentially untrusted standard-based relay device to a remote or cloud server. See, U.S. Pat. Nos. 10,841,104; 10,305,695; 9,942,051; and 9,215,075, expressly incorporated herein by reference in their entirety. The core device advantageously is involved in time synchronization of the network, for example, by transmitting timecodes or time-stamping samples received in real-time, or by other methods.

In a typical implementation, transmit operations consume more power than receive, and longer range communications consume more power than shorter ones. Collisions entail either data loss or retransmission costs. Further, data packets are typically sized such that multiple packets are not required for average communications, and given that some sensors may have larger payloads than others, packets may be transmitted at less than capacity. This leads to a store-and-forward possibility, in which nodes of the network transmit at the minimum power for reliable communication to an available recipient, and the recipient then aggregates the received data, appends its own data, and forwards to the next node in the chain. Typically, the number of hops to the core device will be one or two, but in some cases may be three or more. For example, in very short-range communications, e.g., 10 cm, the range from ankle to core device on chest wall may be ~15 hops. However, this leads to the further enhancement of variable power transmission, wherein each node transmits with sufficient power to reliably reach the next node in sequence, unless an efficiency algorithm reveals that a different destination is preferable. Also, given short-range communications, spatial division multiplexing may be employed to permit non-interfering concurrent communications between different nodes.

In order to arbitrate communications and reduce unnecessary redundant communications (reliable communications may require some redundancy, e.g., error correction and detection codes, retransmissions, etc.) an inferred state of the system based on proper operation may be propagated, such as in the form of a state vector or a hash of the state vector, for example representing communications that should have occurred at a given time. Any node on the network may compare its network state vector estimate with that communicated or its hash. If the network state vector differs, the node may mark an exception and take remedial action, such as by retransmission, persistent storage of potentially missed data, the transmission of an exception flag to other nodes, etc. On the other hand, if the network state vector is consistent, then the node may continue to operate in the same manner, or even implement a reductive algorithm to reduce resource expenditure, until reliability is impaired, at which time the prior reliable state may be reimplemented (potentially subject to further optimization). The reductive algorithm may be, for example, a genetic algorithm operating on transmission power, modulation type, symbol encoding, transmission rate, hopping strategy, data storage strategy, etc. Thus, many factors within the system may be jointly optimized and adaptively reoptimized over time to ensure reliability and minimization of resource consumption for limiting resources, which will generally be dominated by power consumption. Once the system is operating reliably, and within its power budget, the optimization may tend toward a strategy of testing for changed conditions that might compel reoptimization.

Some of the variables may be hyperdynamic; for example, a ring sensor may directly communicate with the core device when the arm is bent, but may require a second hop or increased power when the arm is expended. Where the core device implements NFC, a passive backscatter communication mode may be employed when sensors are in-range, and an active transmission employed when the sensors are out of range. The passive backscatter communication transmission may be the same or different from the active transmission; i.e., when out of range, the sensor device may actively transmit a signal compatible with the passive backscatter receiver. Alternately, the communication modes may be different.

An ultrawideband (UWB) communication may be employed (en.wikipedia.org/wiki/Ultra-wideband), either using a dedicated UWB radio device (e.g., NXP NCJ29D5; NXP SR100T; Apple U1; Qorvo DW1000; Qorvo DW3000; or 3 dB 3DB6830), or a transmitter implemented by the microcontroller of the device to emit broadband pulses based on its own protocol.

In a preferred environment of operation, the network includes at least two sensors of the same type, reading the same physiological parameters from different separated locations. Typically, the sensors will be bilaterally located to measure right-left differences. For example, photoplethysmographic sensors for blood oxygenation or hyperspectral PPG sensors for sensing other parameters are provided on hands and/or feet. The sensors naturally reveal pulse, and therefore the spatially distant sensors will provide distinct pulse delay, which is a function of distance, vascular elasticity/stiffness, and potential obstructions. A pulse oximeter measures local capillary hemoglobin oxygenation, which is largely a result of central effects. However, local readings may reveal local differences in tissue perfusion, and deep penetrating IR may be used to determine subcutaneous organ perfusion. See www.edwards.com/devices/hemodynamic-monitoring/ForeSight?. As a result, the readings at different locations provide different information.

Typically, the sensors are applied to a stable user/patient, who is not undergoing an acute event. Therefore, the sensors (sensor network) may themselves establish a baseline and baseline statistics. Similarly, if we assume that the usage commences under non-acute stresses or no acute pathology, the initial data may be used to train a neural network or other machine learning algorithm to capture normal states. Thereafter, the system may monitor the sensors to determine if there is a deviation from the normal (chronic) state. Such patient-specific normalization may be quite sensitive to changes and independent of sensor calibration, and the like. When the network detects an aberration, which is, for example, a deviation from statistical norms of the chronic sensor readings, an alarm may be generated, generally from the core device. While individual physiological sensor devices may also recognize deviations from normal, the relay and analysis by the core device is preferred since it permits analysis of data from all sensors and because it permits the alert functions to be centralized.

For example, in the event of a transient ischemic attack (TIA), one might see localized cerebral oxygen desaturation from transcranial PPG, possible changes in glucose and nitric oxide, possible bilateral thermal differences, differences in motor neuron electrophysiological activity, and differences in EEG activity. Many of these findings require head-mounted sensors, such as scalp electrodes, intraaural sensors, etc., but in some cases the motor effects are caudal.

While compatibility with available infrastructure is useful for consumer devices without likely adverse health impact in the event of malfunction, in other cases, isolation from shared infrastructure may be desirable. Such isolation may largely be achieved in two different ways: physical, by using separate hardware and distinct communication channels, and logical, by creating information channels and repositories which do not overlap with other channels and repositories. In the former case, the sensor network may communicate over a non-standards-based system or obscure standards-based system, for example using ISO11784/785 134 or 125 kHz, an RFID standard incompatible with NFC, to communicate with a special-purpose reader with data analysis, storage, remote communication/output and alert capability. In the latter case, communications may be through BLE or NFC ISO/IEC 15693 to a smartphone, over an SSL/TLS channel, and further forwarded using a VPN as necessary for remote analysis, interpretation, and conveyance.

The disclosure is generally related to systems, methods, and devices for providing secure communication between the implant device and one or more remote devices.

According to some embodiments, time synchronization of multiple measurements made by different sensors at different locations is affected by time-stamping a sensor reading (or processed output) based on the acquisition time. In a related case, sensor readings or processed readings are transmitted in real-time such that the time of sensing may be inferred by the time of receipt. In any case, the multiple readings are captured at different locations, and the analysis is implemented to ensure that the correct samples or interpolations/extrapolations are compared. In some cases, the sensors are intentionally undersampled, i.e., acquire sensor readings at a rate below the Nyquist frequency of significant elements of the sensor signal. However, for periodic signals, the readings may be aliased by carefully timing the sensor readings. See, en.wikipedia.org/wiki/Undersampling, Bandpass Sampling, Proakis & Manolakis 6.4, www.ws.binghamton.edu>II-2 BP Sampling_2007; Vaughan, Rodney G., Neil L. Scott, and D. Rod White. "The theory of bandpass sampling." IEEE Transactions on signal processing 39, no. 9 (1991): 1973-1984. This allows lower sampling rates, with corresponding fewer data samples to transmit and analyze, which is typically useful when trying to conserve power.

For example, a differential plethysmographic analysis may seek to determine the delay in pulse peak, as well as tissue optical properties as a function of the pulse. While the local properties may be determined without time synchronization between sensors, slight changes in phase delay would require tight timing control. For example, if the sensor network is implemented to monitor vascular status against coagulopathies and emboli, the slight difference over time in pulse waveform, delay, peak height, and local tissue chemistry readings (differential optical absorption at multiple wavelengths), are relevant. In most cases, the readings of interest are characteristic of the tissue, and dynamic changes in readings due to movement, accelerations, or the like are not of particular interest, and rather changes that persist over timescales of over 15 seconds, e.g., 30 seconds, 60 seconds, 120 seconds, 180 seconds, 240 seconds 300 seconds, etc., are most interesting. On the other hand, chronic conditions, while also relevant to the health of patent, are best picked up during a proper medical exam using direct measurement and not inferential or indirect readings. Indeed, the sensors may be self-calibrated on the patient in a stable state, and the sensors used to monitor changes in that state, for better or worse. The sensor network may thus monitor both health decline and healing, disease, and recovery.

While a single sensor might monitor a single location, the sensor would be subject to various ambiguities when seeking to interpret the data. An inferred increase in pulse peak might be due to either increased peripheral vascular resistance or increased cardiac output. An unchanged pulse peak could result from a compensating effect and hide pathology. Further, a single peripheral sensor is limited to monitoring its own location.

Therefore, a sensor communication protocol is provided, which tags sensor readings with time-code of acquisition, sensor identification, optional error detection and correction codes, optional reliable transactional messages, and optional protocol administration messages. In a typical implementation, the sensors accumulate readings and periodically transmit the readings to a central processing node. While various WBAN technologies are usable, a preferred implementation employs Bluetooth Low Energy (BLE) to communicate with a smartphone, which itself has an app for interfacing with the sensors, receiving and storing the sensor data, and locally performing analysis and communicating the data to a central server or cloud processing system. The sensor-smartphone communications may be unencrypted or lightly encrypted, while communications between the smartphone, over the cellular carrier or WiFi, to the Internet, and hence to the server or cloud is encrypted according to secure cryptographic standards such as SSL/TLS.

The analysis preferably includes a location of each sensor on the body, which may influence interpretation according to a body model or the like. However, the sensors do not need to be intrinsically encoded with their location, and in some cases, may be movable or relocatable.

When analyzing pulsatile waveforms, and in particular waveforms based on the same excitation (i.e., different representations of the same heartbeat), time-domain analysis, frequency transform domain analysis, and wavelet transform domain analysis may be used. Likewise, other types of transform may be used. In a time-domain analysis algorithm, the relevant parameters include delay, and more particularly, changes in a characteristic delay of the waveform between different sensors; pulse shape, and pulse peak. The pulse waveform may be obtained by a pressure or strain sensor over a vessel, optical changes in tissue due to perfusion, an accelerometer to measure tissue mechanical disturbance, or the like. As discussed above, when an optical sensor is employed, it can be useful to employ multiple wavelengths, which can determine blood and tissue chemistry. In some cases, the pulse waveform may remain unchanged, while tissue chemistry changes due to a condition. For example, tissue oxygenation, pH, lactic acid, sodium/potassium ratio, redox potential, nitric oxide, glucose, calcium, or other blood chemistry may change in response to health issues.

Another sensor type is an electromyographic, or more generally, a cell depolarization sensor, to detect cell electrophysiology. These sensors generally do not need to be synchronized, and further, the sensor outputs may be statistical measures of signals, representing frequency distributions, though not necessarily requiring a formal frequency domain transform.

Chan, Gregory S H, Paul M. Middleton, Branko G. Celler, Lu Wang, and Nigel H. Lovell. "Automatic detection of left ventricular ejection time from a finger photoplethysmographic pulse oximetry waveform: comparison with Doppler aortic measurement." Physiological measurement 28, no. 4 (2007): 439.

Allen, John, Crispian P. Oates, Timothy A. Lees, and Alan Murray. "Photoplethysmography detection of lower limb peripheral arterial occlusive disease: a comparison of pulse timing, amplitude and shape characteristics." Physiological measurement 26, no. 5 (2005): 811.

Allen, John, Klaus Overbeck, Alexander F. Nath, Alan Murray, and Gerard Stansby. "A prospective comparison of bilateral photoplethysmography versus the ankle-brachial pressure index for detecting and quantifying lower limb peripheral arterial disease." J. vascular surgery 47, no. 4 (2008): 794-802.

Lin, Chia-Hung. "Assessment of bilateral photoplethysmography for lower limb peripheral vascular occlusive disease using color relation analysis classifier." Computer methods and programs in biomedicine 103, no. 3 (2011): 121-131.

Wu, Jian-Xing, Chien-Ming Li, Yueh-Ren Ho, Ming-Jui Wu, Ping-Tzan Huang, and Chia-Hung Lin. "Bilateral photoplethysmography analysis for peripheral arterial stenosis screening with a fractional-order integrator and info-gap decision-making." IEEE Sensors J. 16, no. 8 (2015): 2691-2700.

Shariati, Nastaran Hesam, Edmond Zahedi, and Hassan Mansouri Jajai. "Classification of vascular function in upper limb using bilateral photoplethysmographic signals." Physiological measurement 29, no. 3 (2008): 365.

Wu, Jian-Xing, Chia-Hung Lin, Ming-Jui Wu, Chien-Ming Li, Bee-Yen Lim, and Yi-Chun Du. "Bilateral photoplethysmography analysis for arteriovenous fistula dysfunction screening with fractional-order feature and cooperative game-based embedded detector." Healthcare technology letters 2, no. 3 (2015): 64-69.

Monnet, Xavier, Nadia Anguel, Brice Naudin, Julien Jabot, Christian Richard, and Jean-Louis Teboul. "Arterial pressure-based cardiac output in septic patients: different accuracy of pulse contour and uncalibrated pressure waveform devices." Critical Care 14, no. 3 (2010): R109.

The technology described by Peltokangas is of particular interest, and the below references describe exemplary sensors and signal analysis, expressly incorporated herein by reference (as with all references cited herein).

Peltokangas, Mikko, Antti Vehkaoja, Matti Huotari, Jarmo Verho, Ville M. Mattila, Juha Röning, Pekka Romsi, Jukka Lekkala, and Niku Oksala. "Combining finger and toe photoplethysmograms for the detection of atherosclerosis." Physiological measurement 38, no. 2 (2017): 139.

Peltokangas, Mikko, Antti Vehkaoja, Jarmo Verho, Matti Huotari, Juha Röning, and Jukka Lekkala. "Monitoring arterial pulse waves with synchronous body sensor network." IEEE J. biomedical and health informatics 18, no. 6 (2014): 1781-1787.

FIG. 1 illustrates a general overview of a system 100 to acquire and analyze a biometric data from a user 110, in accordance with various embodiments of the present disclosure. The system 100 describes an environment suitable for interactive reception and processing of the biometric data of the user. The system 100 is configured to provide a setup for a plurality interconnected wearable devices the 102 for acquiring and analyzing the biometric data of a body of the user 110. The biometric data includes a temperature, a heart rate, an electrocardiogram (ECG), an electrostatic potential, a blood pressure, a pressure inside ear canal, a glucose level, an acceleration, a brainwave, a neuronal oscillation, an electroencephalogram, and an oxygen saturation, and the like.

The system 100 includes the plurality of interconnected wearable devices 102, a body area network 108, the user 110, a communication network 112, a personal mobile electronic device 114, a server 116, and a database 118. In addition, the plurality of interconnected wearable devices 102 includes but may not be limited to an implanted medical device and the wearable electronic device 104. In an embodiment of the present disclosure, the wearable electronic device 104 includes a bracelet, a band, a smartwatch, a ring, an anklet, a cuff, a chess strap, a headband, and glasses. The plurality of interconnected wearable devices 102 utilizes one or more sensors 106 to measure physiological data of the body of the user 110. In addition, the one or more sensors 106 are integrated inside each of the plurality of integrated wearable devices 102. In an embodiment of the present disclosure, one or more sensors 106 include but may not be limited to a thermometer, a diode, a potentiometer, and an accelerometer. In an embodiment of the present disclosure, the plurality of interconnected wearable devices 102 is at least two devices. In addition, the first device of the at least two devices is located on the right one of an arm and a leg. Further, the second device of the at least two devices is located on the left one of an arm and a leg. In another embodiment of the present disclosure, the plurality of interconnected wearable devices 102 is at least three devices. In addition, the first device of at least three devices is located on the right one of an arm and a leg. Further, the second device of at least two devices is located on the left one of an arm and a leg. Furthermore, the third device of at least three devices is located on a torso of the body of the user 110. In yet another embodiment of the present disclosure, the plurality of interconnected wearable devices 102 is at least four devices. In addition, the first two of at least four devices are located on the opposite arms of the user, and the second two of the at least four devices are located on the opposite legs of the user 110. In yet another embodiment of the present disclosure, the plurality of interconnected wearable devices 102 is at least five devices. In addition, the first two of at least four devices are located on the opposite arms of the user 110. In addition, the second two of at least four devices are located on the opposite legs of the user 110. Further, at least the fifth device is located on the torso of the user 110. In yet another embodiment of the present disclosure, the plurality of interconnected wearable devices 102 is at least five devices. In addition, the first two of at least four devices are located on the opposite arms of the user 110. Further, the second two of at least four devices are located on the opposite legs of the user 110, and at least the fifth device is located on the head of the user 110.

The system 100 includes the body area network 108. In general, the body area network corresponds to the wireless network of a wearable computing device. In addition, the wearable computing device is placed over the human body in a particular position. Further, the body area network is utilized to transmit data generated by the wearable computing device placed over the human body. In an embodiment of the present disclosure, the plurality of interconnected wearable devices 102 is interconnected electrically with the body of the user 110 through the body area network 108. The plurality of interconnected wearable devices 102 receives physiological data associated with the body of the user 110 through the body area network 108. In addition, the body area network 108 is installed inside the medical implant device, and the wearable electronic device 104. The plurality of interconnected wearable devices 102 is connected to the personal mobile electronic device 114 through the communication network 112.

The system 100 includes the communication network 112. The communication network 112 provides a medium to the plurality of interconnected wearable devices 102 to connect with the personal mobile electronic device 114. The communication network 112 use protocols to connect the plurality of interconnected wearable devices 102 with the personal mobile electronic device 114. In an embodiment of the present disclosure, the communication network 112 facilitates transmission of the biometric data to the personal mobile electronic device 114. In general, a communication network is associated with hardware devices that is capable of transmitting data.

The plurality of interconnected wearable devices 102 is hardware devices capable of transmitting the biometric data of the body of the user 110 to the personal mobile electronic device 114. In addition, biometric data of the body of the user 110 is transmitted with the facilitation of the communication network 108. Further, the plurality of interconnected wearable devices 102 is associated with the personal mobile electronic device 114 through the communication network 112. The communication network 112 provides a medium to the personal mobile electronic device 114 to receive the biometric data of the body of the user 110. The communication network 112 provides network connectivity to the personal mobile electronic device 114 using a plurality of methods. The plurality of methods is used to provide network connectivity to the personal mobile electronic device 114 include 2G, 3G, 4G, 5G, 6G (as currently proposed), WiFi 5, WiFi 6, Bluetooth 5, 5.1, 5.2, BLE, (IEEE-802.15.4, IEEE-802.15.6), IEEE 802.11, e.g., 11ay, LAN, VPN, WAN and the like. In one example, the communication network 112 includes but may not be limited to a local area network, a metropolitan area network, a wide area network, a virtual private network, a global area network, and a home area network.

In an embodiment of the present disclosure, the communication network 112 is any type of network that provides internet connectivity to the personal mobile electronic device 114. In an embodiment of the present disclosure, the communication network 112 is a wireless mobile network. In another embodiment of the present disclosure, the communication network 112 is a wired network with finite bandwidth. In yet another embodiment of the present disclosure, the communication network 112 is a combination of the wireless and the wired network for optimum throughput of data transmission. In yet another embodiment of the present disclosure, the communication network 112 is an optical fiber high bandwidth network that enables high data rate with negligible connection drops.

The system 100 includes the personal mobile electronic device 114. In an embodiment of the present disclosure, the personal mobile electronic device 114 includes but may not be limited to of smartphone, a smartwatch, and a tablet. In one example, the personal mobile electronic device 114 includes a mobile smartphone such as an iPhone, an Android, a Linux or other Unix variant phone, or any other suitable smartphone. In another example, the personal mobile electronic device 114 includes a tablet computer (such as a computer tablet), a notebook computer, or any other suitable computing device. In addition, these may include an IPad, an Android tablet, a Windows tablet, or any other suitable tablet. In yet another example, the personal mobile electronic device 114 may include a desktop computer or a laptop computer with a sophisticated operating system, such as Windows operating system, a Macintosh operating system or a Linux or Unix-based operating system. In one example, the personal mobile electronic device 114 also includes a screen or another suitable visual or tactile communications interface. In addition, the screen is a touch-sensitive screen display and is configured to receive gesture-based user input (including touch input) and display an output to the user. Further, the personal mobile electronic device 114 may also include one or more physical or virtual buttons, for example, a button, to facilitate a user's interaction with the screen. In an embodiment of the present disclosure, the personal mobile electronic device 114 is configured to compute a physiological parameter from a plurality of data related to the physiological parameter, each data acquired by different wearable devices of the plurality of interconnected wearable devices 102 located at different locations. The personal mobile electronic device 114 is configured to compute the physiological parameter by one of averaging the physiological parameter acquired by different wearable devices, using noise filters on the plurality of data related to the physiological parameter, and using statistical techniques to analyze the plurality of data related to the physiological parameter.

The personal mobile electronic device 114 is configured to compute the physiological parameter depending on the value of at least one other physiological parameter acquired by different wearable devices of the plurality of interconnected wearable devices. The personal mobile electronic device 114 is further configured to compute the difference between the same physiological parameter acquired on the opposite extremities. In an embodiment of the present disclosure, a regime of operation of the first at least one of the plurality of interconnected wearable devices 102 depends on a signal received from a second at least one of the plurality of interconnected wearable devices 102.

The system 100 includes the server 116. In an embodiment of the present disclosure, the personal mobile electronic device 114 is connected with the server 116. In another embodiment of the present disclosure, the server 116 is part of the personal mobile electronic device 114. The server 116 handles each operation and task performed by the personal mobile electronic device 114. The server 116 stores the one or more instructions and the one or more processes for performing various operations of the personal mobile electronic device 114. In an embodiment of the present disclosure, the server 116 is a cloud server. The cloud server is built, hosted, and delivered through a cloud computing platform. In general, cloud computing is a process of using remote network server that are hosted on the internet to store, manage, and process data. Further, the server 116 includes the database 118.

The system 100 includes the database 118. The database 118 is used for storage purposes. The database 118 is associated with the server 116. In general, database is a collection of information that is organized so that it can be easily accessed, managed and updated. In an embodiment of the present disclosure, the database 118 provides storage location to all data and information required by the personal data electronic device 114. In an embodiment of the present disclosure, the database 118 may be at least one of a hierarchical database, a network database, a relational database, an object-oriented database and the like. However, the database 118 is not limited to the above-mentioned databases.

Figure 2:
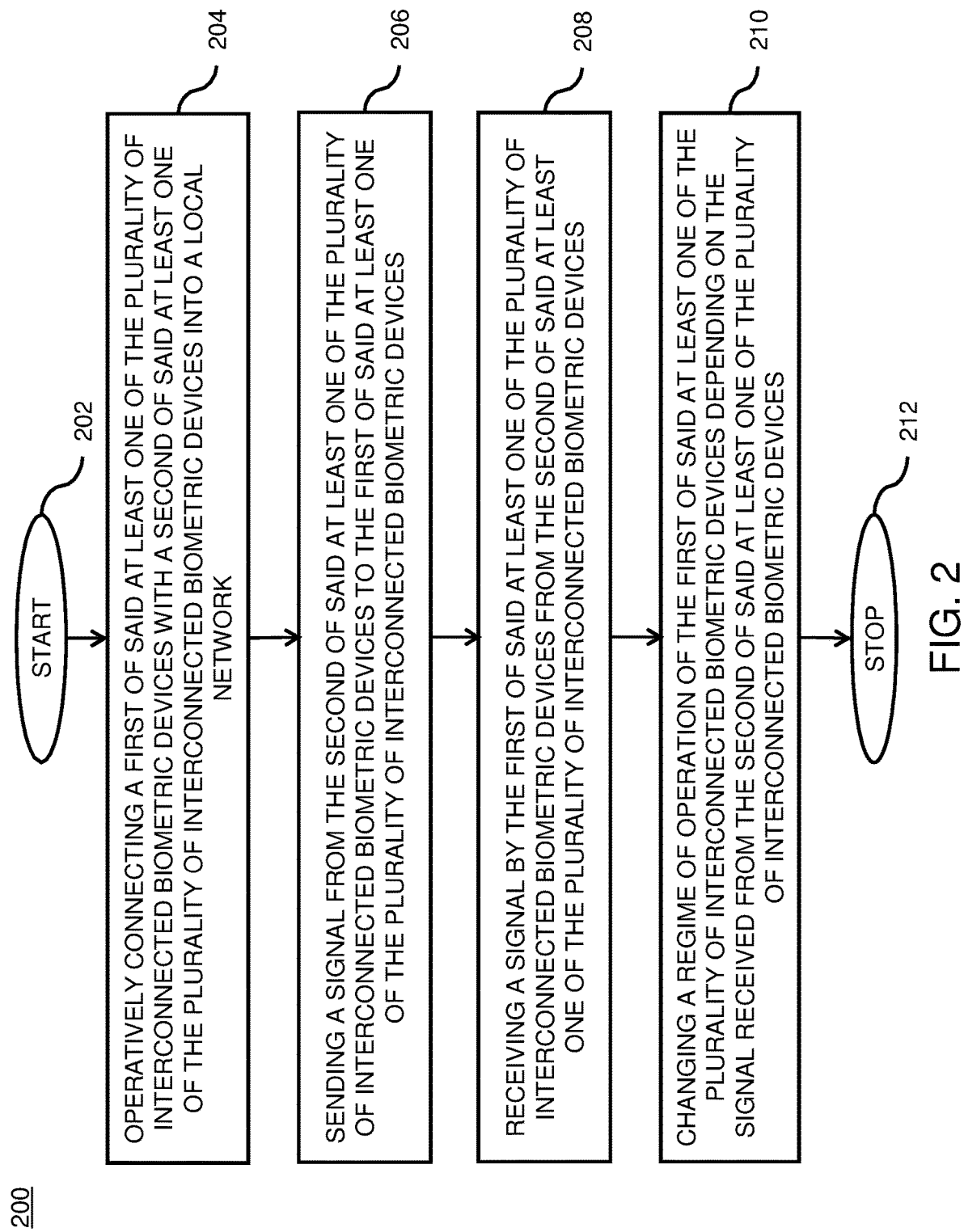
FIG. 2 illustrates a flow chart describing a method for controlling the first at least one of the plurality of interconnected wearable devices by the second at least one of the plurality of interconnected wearable devices, in accordance with various embodiments of the present disclosure.

FIG. 2 illustrates a flow chart 200 describing a method to control the first at least one of the plurality of interconnected wearable devices 102 by the second at least one of the plurality of interconnected wearable devices 102, in accordance with various embodiments of the present disclosure. The flow chart 200 initiates at step 202. At step 204, the method includes to operatively connect the first of least one of the plurality of interconnected wearable devices 102 with the second at least one of the plurality of interconnected wearable devices 102 into a local network. At step 206, the method includes to send a signal from the second at least one of the plurality of interconnected wearable devices 102 to the first at least one of the plurality of interconnected wearable devices 102. At step 208, the method includes receiving a signal by the first at least one of the plurality of interconnected wearable devices 102 from the second at least one of the plurality of interconnected wearable devices 102. At step 210, the method includes changing a regime of operation of the first at least one of the plurality of interconnected wearable devices 102 depending on the signal received from the second at least one of the plurality of interconnected wearable devices 102. The local network is one of a wireless local area network (LAN) and the body local area network 108. The flow charts 200 terminates at step 212.

Figure 3:
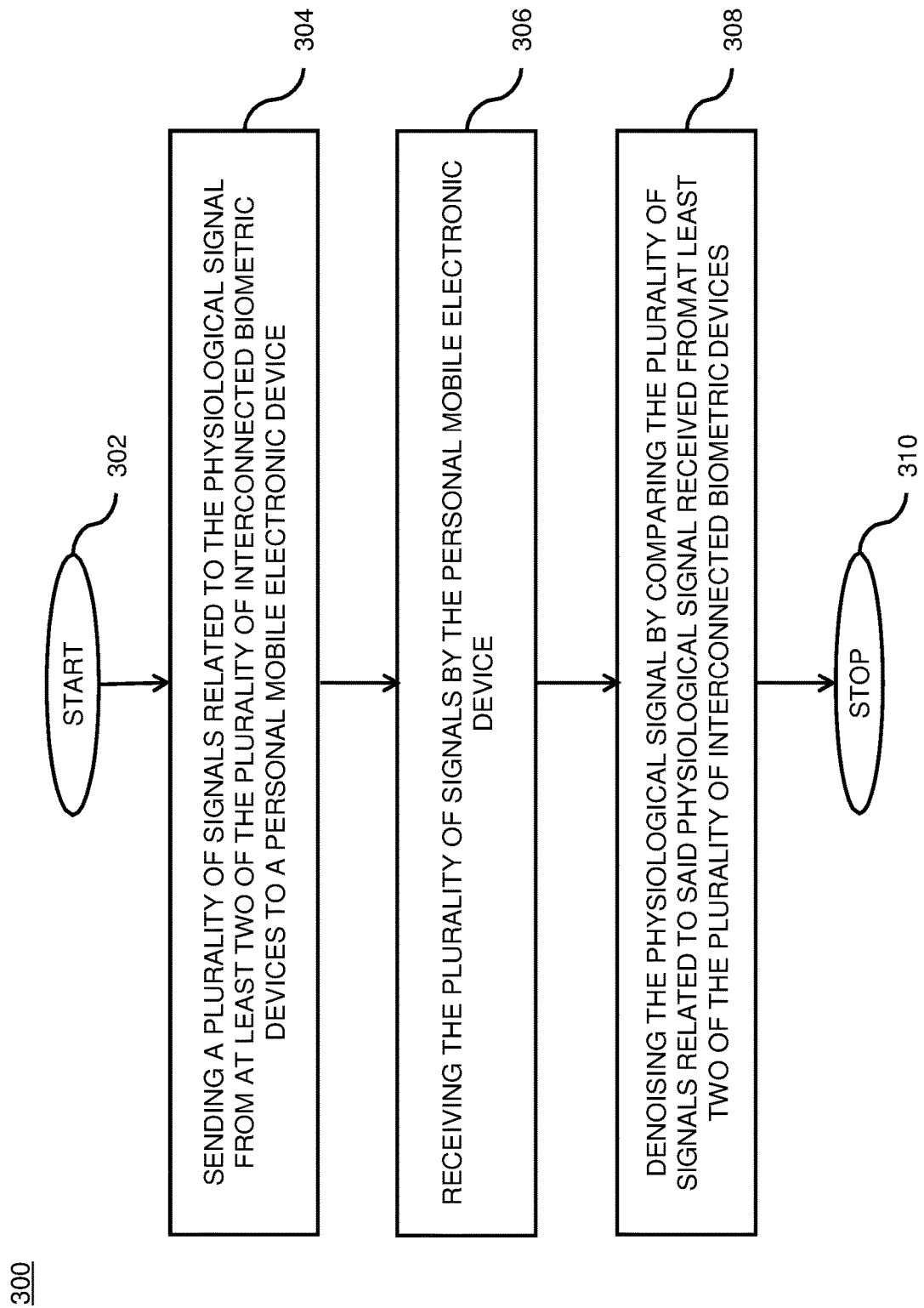
FIG. 3 illustrates the flow chart describing the method for denoising a physiological signal received from the plurality of interconnected wearable devices, in accordance with various embodiments of the present disclosure.

FIG. 3 illustrates the flow chart 300 describing the method to denoise a physiological signal received from the plurality of interconnected wearable devices 102, in accordance with various embodiments of the present disclosure. The flow chart 300 initiates at step 302. At step 304, the method includes sending a plurality of signals related to the physiological signal from at least two of the plurality of interconnected wearable devices 102 to the personal mobile electronic device 114. At step 306, the method includes receiving the plurality of signals by the personal mobile electronic device 114. At step 308, the method includes denoising the physiological signal by comparing the plurality of signals related to the physiological signal received from at least two of the plurality of interconnected wearable devices 102, the denoising done by the personal mobile electronic device 114. The flow chart 300 terminates at step 310.

Figure 4:
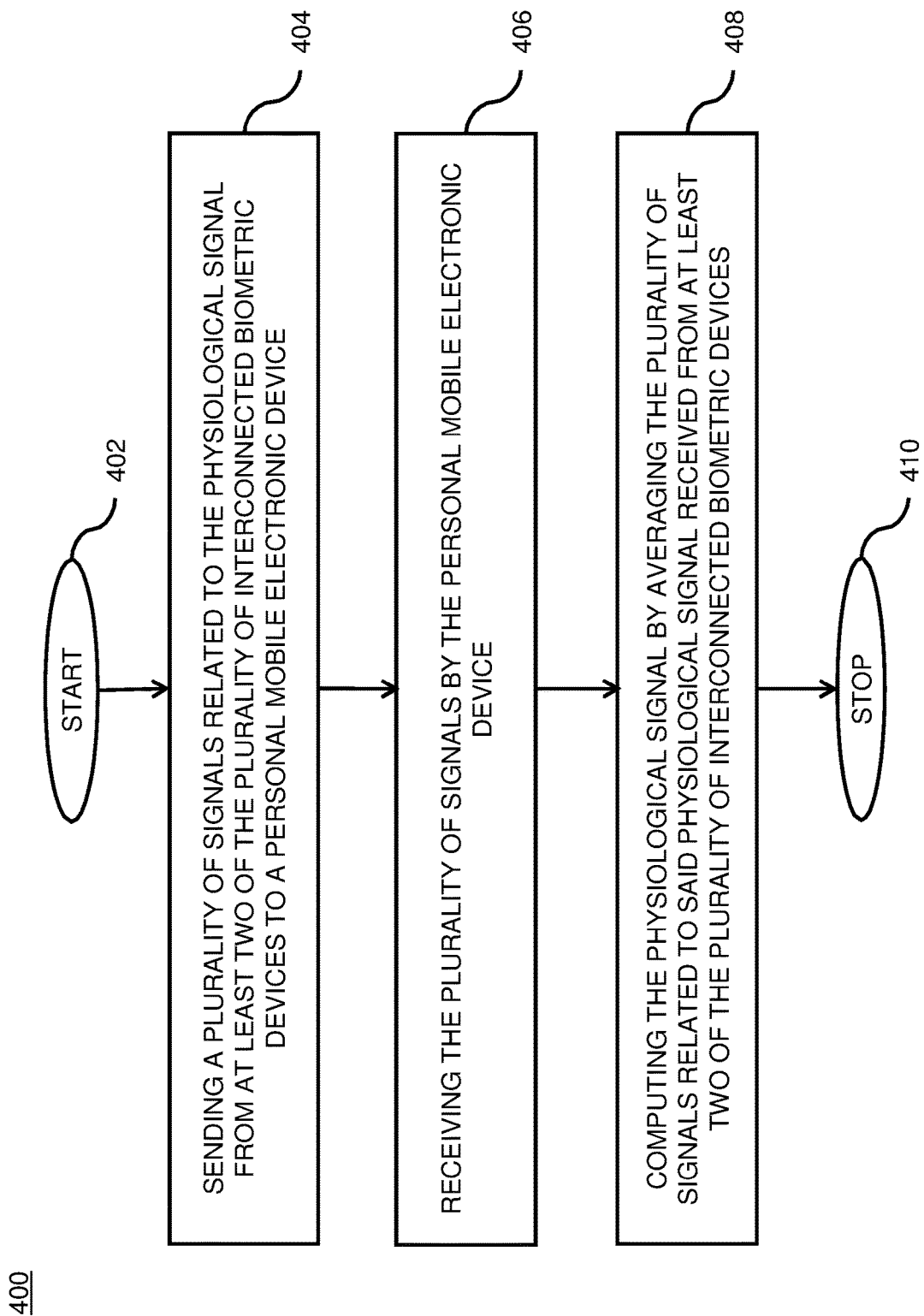
FIG. 4 illustrates the flow chart describing the method for computing the physiological signal received from the plurality of interconnected wearable devices, in accordance with various embodiments of the present disclosure.

FIG. 4 illustrates the flow chart 400 describing the method to compute the physiological signal received from the plurality of interconnected wearable devices 102, in accordance with various embodiments of the present disclosure. The flow chart 400 initiates at step 402. At step 404, the method includes sending a plurality of signals related to the physiological signal from at least two of the plurality of interconnected wearable devices 102 to the personal mobile electronic device 114. At step 406, the method includes receiving a plurality of signals by the personal mobile electronic device 114. At step 408, the method includes computing the physiological signal by averaging the plurality of signals related to the physiological signal received from at least two of the plurality of interconnected wearable devices. In addition, the averaging done by the personal mobile electronic device 114. The flow chart 400 terminates at step 410.

Figure 5:
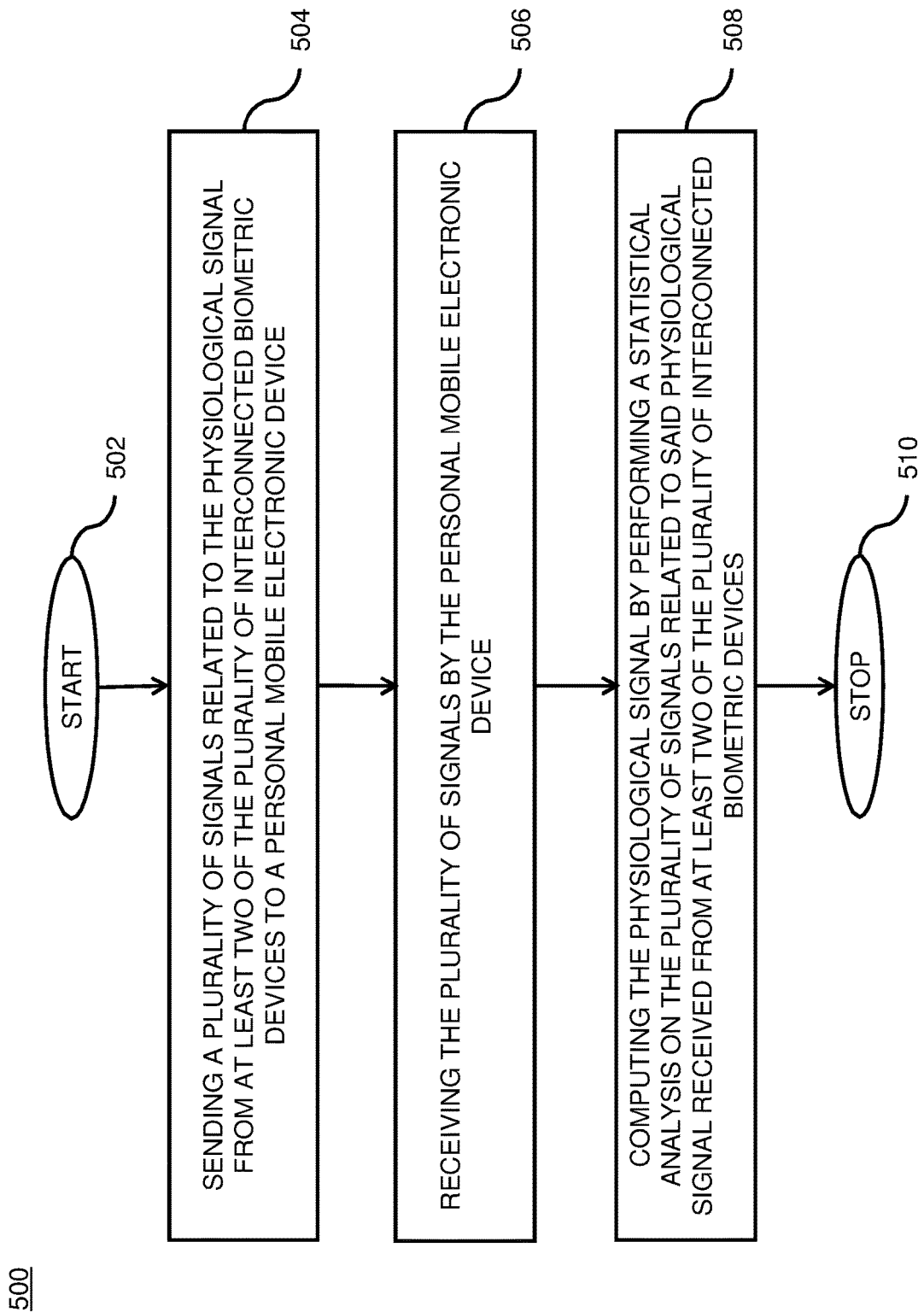
FIG. 5 illustrates the flow chart describing the method for computing the physiological signal received from the plurality of interconnected wearable devices, in accordance with various embodiments of the present disclosure.

FIG. 5 illustrates the flow chart 500 describing the method to compute the physiological signal received from the plurality of interconnected wearable devices 102, in accordance with various embodiments of the present disclosure. The flow chart 500 initiates at step 502. At step 504, the method includes sending the plurality of signals related to the physiological signal from at least two of the plurality of interconnected wearable devices 102 to the personal mobile electronic device 114. At step 506, the method includes receiving the plurality of signals by the personal mobile electronic device 114. At step 508, the method includes computing the physiological signal by performing a statistical analysis on the plurality of signals related to the physiological signal received from at least two of the plurality of interconnected wearable devices 102. In addition, the statistical analysis done by the personal mobile electronic device 114. The local network is one of a wireless local area network (LAN) and the body local area network 108. The method further includes a step of sending computed physiological parameter to a healthcare provider. The flow charts 500 terminates at step 510.

Figure 6:
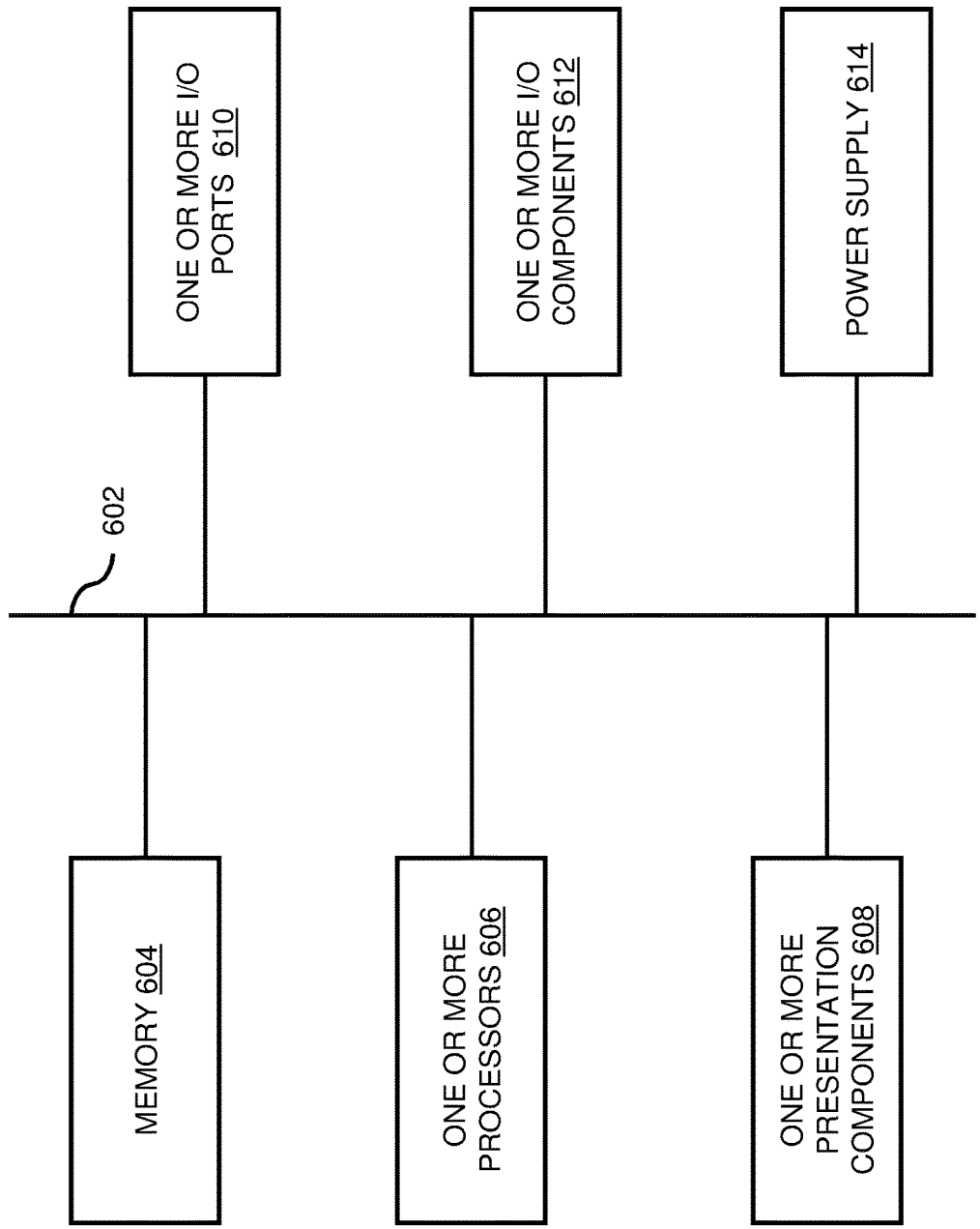
FIG. 6 illustrates a block diagram of a hardware framework of the system of FIG. 1, in accordance with various embodiments of the present disclosure.

FIG. 6 illustrates a block diagram of a hardware framework 600 of the system 100 of FIG. 1, in accordance with various embodiments of the present disclosure. The hardware framework 600 is required to run the system 100. The hardware framework 600 includes various components that work synchronously to enable processing of the system 100 and allows storing of data in the system 100. The hardware framework 600 includes a bus 602 that directly or indirectly couples the following devices: memory 604, one or more processors 606, one or more presentation components 608, one or more input/output (I/O) ports 610, one or more input/output components 612, and an illustrative power supply 614. The bus 602 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component, such as a display device to be an I/O component. Also, processors have memory. The inventors recognize that such is the nature of the art and reiterate that the diagram of FIG. 6 is merely illustrative of an exemplary hardware framework 600 that can be used in connection with one or more embodiments of the present invention. The distinction is not made between such categories as "workstation," "server," "laptop," "hand-held device," etc., as all are contemplated within the scope of FIG. 6 and reference to "hardware framework."

The hardware framework 600 typically includes a variety of computer-readable media. The computer-readable media can be any available media that includes both volatile and nonvolatile media, removable and non-removable media. By way of example, and not limitation, the computer-readable media may comprise computer storage media and communication media. The computer storage media includes volatile and nonvolatile, removable and non-removable media implemented in any method or technology for storage of information such as computer-readable instructions, data structures, program modules or other data. The computer storage media includes, but is not limited to, a non-transitory computer-readable storage medium that stores program code and/or data for short periods of time such as register memory, processor cache, and random access memory (RAM), or any other medium which can be used to store the desired information. The computer storage media includes, but is not limited to, non-transitory computer-readable storage medium that stores program code and/or data for longer periods of time, such as secondary or persistent long term storage, like read-=only memory (ROM), EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information. The communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 604 includes computer-storage media in the form of volatile and/or nonvolatile memory. The memory 604 may be removable, non-removable, or a combination thereof. Exemplary hardware devices include solid-state memory, hard drives, optical-disc drives, etc. The hardware framework 600 includes one or more processors 606 that read data from various entities such as memory 604 or I/O components 612. The one or more presentation components 608 present data indications to a user or other device. Exemplary presentation components include a display device, speaker, printing component, vibrating component, etc.

Figure 7:
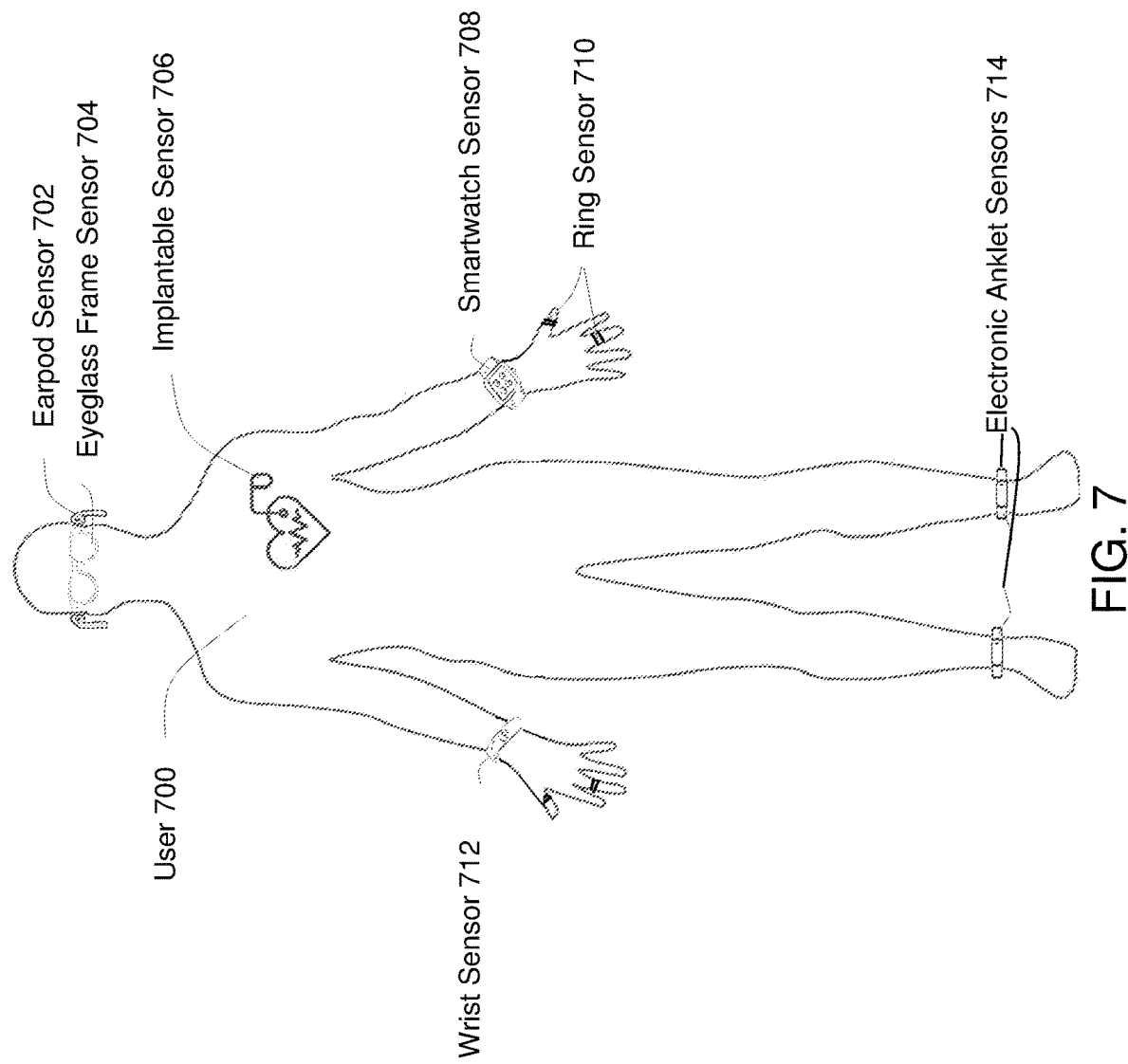
FIG. 7 shows a schematic diagram of a sensor network on a user, including redundant sensors and a plurality of different types of sensors.

FIG. 7 shows a user 700 with a set of sensors, which may be multiplicated. Some sensors may be special purpose, while others may be general-purpose and/or providing data according to an open protocol, such as ANT or BLE, or a WBAN protocol. For example, an Earpod Sensor 702 may be a customized sensor system, having a variety of sensors, such as electrophysiological sensors, photoplethysmographic sensors, microphones, pressure sensors, electrochemical sensors, galvanic skin response sensors, etc. Alternately, the Earpod Sensors 702 may be stock Apple Air Pods, with microphone sensors only. In the latter case, the microphone may be used to pick up biometric voice signals and patterns, heartbeat and murmurs, bruits, upper respiratory sounds, and the like.

The sensors may also include Eyeglass Frame Sensors 704, which in addition to supporting eyeglass lenses, may also provide a graphic projection display and speakers and read signals from ocular muscles (EOG, EMG), electroencephalographic (EEG) signals, accelerometers, gyroscopes, and magnetometers to provide multiaxis sensing of head position and tremor, and microphones.

Implantable Sensors 706 may be integrated into the system, such as a pacemaker, which reads EKG signals and may provide automated drug infusion, ion sensing, glucose sensing, etc. Implantable sensors typically do not communicate using Bluetooth and rather may use an inductive coupling connection, WBAN technology, RFID (backscatter, energy harvesting), or other low power, power saving, or externally powered system.

A Smartwatch Sensor 708 may be provided, which, similar to the Earpod Sensor 702, may be a standard type device that provides photoplethysmographic (PPG) sensing, electrocardiographic (ECG) sensing on demand, accelerometer, and the like. Further, a Smartwatch may also contain a full 4G/LTE radio or IOT communication. The Smartwatch may support downloadable (or intrinsic) apps, and therefore represent the hub or centralized processor for the network. Alternately, a smartphone or infrastructure element (not shown) may serve as the master node of the network and perform system-level processing of sensor signals. In one embodiment, the sensor network communicates by Bluetooth to a router, which then permits remote processing on a Cloud server. The router may be a smartphone or a smarthome device, such as Alexa, Google Home, or the like. In another embodiment, a special-purpose master processing node device may be provided.

A set of Ring Sensors 710, or Wrist Sensors 712, or Electronic Anklet Sensors 714 may also be provided to provide bilateral sensing, typically of circulatory or vascular status, vasoconstriction, tremor, and the like.

The present invention has various advantages over the prior art. The present invention provides the programmable flex application to allocate dynamic bandwidth based on user requested bandwidth. In addition, the programmable flex application avoids wastage of bandwidth. Further, the programmable flex application configures the physical channel in an automatic manner. Furthermore, the programmable flex application continuously monitors and performs re-tuning of the optical line system spectrum during the identification of issues generated in the optical line system. Moreover, the programmable flex application helps in the dynamic adjustment of the channel and allows users priority traffic to remain non-interrupted. Aspects of the system may be implemented according to designs disclosed in, for example, U.S. patent application and patent Nos. 20140316235; 20140313303; 20140304122; 20140303994; 20140295786; 20140286566; 20140285634; 20140276239; 20140272894; 20140272847; 20140266604; 20140258110; 20140257047; 20140251233; 20140244514; 20140244495; 20140244494; 20140204229; 20140204190; 20140164111; 20140161412; 20140133658; 20140108151; 20140052555; 20140044304; 20140040041; 20140039571; 20140029809; 20130325493; 20130311329; 20130223673; 20130093829; U.S. Pat. Nos. 8,878,749; 8,874,760; 8,867,139; 8,867,131; 8,866,702; 8,862,764; 8,860,787; 8,856,948; 8,854,282; 8,838,708; 8,833,934; 8,831,879; 8,827,445; 8,823,740; 8,820,934; 8,817,379; 8,812,419; 8,811,951; 8,798,336; 8,786,953; 8,775,844; 8,773,599; 8,767,306; 8,767,305; 8,764,185; 8,762,895; 8,760,765; 8,750,541; 8,749,886; 8,738,723; 8,738,292; 8,724,206; 8,705,177; 8,686,924; 8,676,893; 8,670,000; 8,665,178; 8,661,053; 8,659,433; 8,629,815; 8,612,211; 8,611,015; 8,593,795; 8,558,759; 8,542,879; 8,510,166; 8,508,851; 8,506,080; 8,505,090; 8,457,367; 8,411,909; 8,384,617; 8,332,424; 8,319,746; 8,316,319; 8,311,289; 8,303,110; 8,294,994; 8,275,893; 8,235,529; 8,228,315; 8,223,088; 8,223,024; 8,217,856; 8,209,183; 8,203,502; 8,199,126; 8,194,036; 8,190,749; 8,184,070; 8,184,067; 8,179,604; 8,176,437; 8,175,297; and 8,146,156.

A typical master node (e.g., smartphone) will provide a quad-core ARM architecture processor with GPU, random access memory, flash memory, WiFi and Bluetooth connectivity, optionally 3G, 4G, 5G and/or LTE connectivity, an LCD, OLED, and/or heads-up display projecting an image to the eye within the eyeglass frames, a sensor package including still/video cameras, microphone, accelerometer, magnetometer, gyroscope, touchpad, fingerprint scanner, hand-gesture sensor, a rechargeable lithium-ion battery, speaker(s), and other standard elements.

Electrophysiological sensor electronics typically employ instrumentation amplifiers configured to provide a high differential gain with a high common mode rejection ratio, and preferably a digitally controllable gain or automatic gain control (AGC). The amplified signal(s) are digitized, and according to a preferred embodiment of the invention, the digitized signals are communicated through a Bluetooth or WBAN connection. To the extent available, the sensor device itself may perform signal processing, as may be constrained by power, processing capability/availability, and signal availability. The recipient device of the signal stream may perform the most complex signal processing. It is to be understood, however, that even though numerous characteristics and advantages of the present invention have been set forth in the foregoing description, together with details of the structure and function of the invention, the disclosure is illustrative only. Changes may be made in the details, especially in matters of shape, size, and arrangement of parts within the principles of the invention to the full extent indicated by the broad general meaning of the terms mentioned.

What is claimed is:

1. A biometric system, comprising:
a plurality of wearable or implantable sensors adapted to be spatially separated by a distance, each sensor comprising:
a housing;
a power supply;
at least one physiological transducer configured to sense a respective physiological condition of a user local to the respective physiological transducer; and
a communication port configured to transmit physiological data derived from the sensed physiological condition; and
a personal mobile electronic device comprising at least one automated processor configured to:
analyze spatial and phase delay differences of the transmitted physiological data associated with a common event perturbing the respective physiological condition received from each of the plurality of wearable or implantable sensing devices, wherein the spatial and phase delay differences of the physiological data result from the spatial separation by the distance of the plurality of wearable or implantable sensing; and
produce an output responsive to at least spatial and phase delay differences of the physiological data.

2. The biometric system of claim 1, wherein the communication port comprises a wireless transmitter configured to communicate through a wireless local area network (LAN).

3. The biometric system of claim 1, wherein the communication port transmits wirelessly comprises at least one of a wireless personal area network (PAN) transceiver and a wireless body area network (BAN) transceiver.

4. The biometric system of claim 1, wherein the physiological condition is selected from the group consisting of a cardiac activity, a muscular activity, a galvanic skin response, an electrophysiological activity, a temperature, a blood pressure, a glucose level, an oxygen saturation, a nitric oxide level, a vasodilation level, an extravascular fluid condition, a physical balance, a muscular coordination, a physical exhaustion, an endurance limit, and wherein at least two of the plurality of wearable or implantable sensors sense the same physiological condition.

5. The biometric system of claim 1, wherein the plurality of wearable or implantable sensors comprising a first wearable or implantable sensor located on a right extremity, and a second a wearable or implantable sensor located on a left extremity, to thereby provide bilateral sensing.

6. The biometric system as of claim 5, wherein the plurality of wearable or implantable sensors further comprise a third wearable or implantable sensor device located on a torso.

7. The biometric system of claim 1, wherein each respective wearable sensor device in each ear canal comprises at least one microphone and a speaker, and has a first mode in which the at least one microphone is used for voice amplification and the speaker is used for audio reproduction, and a second mode in which the at least one microphone is used to acquire vascular sounds and the vascular sounds are not reproduced by the speaker.

8. The biometric system of claim 1, wherein the plurality of wearable or implantable sensors comprise a plurality of optical sensing devices.

9. The biometric system of claim 1, wherein the plurality of wearable or implantable sensors comprise a plurality of mechanical sensing devices.

10. The biometric system of claim 1, wherein the plurality of wearable or implantable sensors comprise a plurality of chemical sensing devices.

11. The biometric system of claim 1, wherein the plurality of wearable or implantable sensors each comprises an electromagnetic signal sensing device.

12. The biometric system of claim 1, wherein the personal mobile electronic device comprises a smartwatch, having at least one physiological sensor configured to sense a respective physiological condition of the user at a respective wrist.

13. The biometric system of claim 1, wherein the personal mobile electronic device is further configured to filter the physiological data from each physiological transducer based on correlations of the physiological data from the plurality of wearable or implantable sensors.

14. The biometric system of claim 13, wherein the personal mobile electronic device is further configured to apply at least one statistical classification technique to the physiological data from each physiological transducer to classify a physiological condition of the user.

15. The biometric system of claim 1, wherein:
the physiological data is time-coded, the phase delay differences are calculated by the at least one processor dependent on the time coding, and
the personal mobile electronic device is further configured to statistically classify a spatial and temporal pattern of the time-coded physiological data from each physiological transducer, and to selectively produce the output dependent thereon.

16. The biometric system of claim 15, wherein the personal mobile electronic device is further configured to adaptively update a statistical model in dependence on the time-coded physiological data from each physiological transducer, to predict a spatial and temporal pattern of the time-coded physiological data, and to statistically determine significant changes of the user in dependence on a deviation of a spatial and temporal pattern of the time-coded physiological data from each physiological transducer from the predicted spatial and temporal pattern of the time-coded physiological data.

17. The biometric system of claim 1, wherein the personal mobile electronic device is further configured to implement a hidden Markov model (HMM), and to determine a probability of future user states in dependence on the hidden Markov model.

18. A biometric monitoring method, comprising:
providing a plurality of spatially separated wearable or implantable sensors, each sensor comprising a housing at a respective different location on a user, a power supply, at least one physiological transducer configured to sense a perturbation of a respective physiological condition of the user at the respective different location local to the respective physiological transducer resulting from a common event and producing physiological data, and a communication port configured to transmit the physiological data derived from the sensed respective physiological condition;
analyzing spatial and phase delay differences dependent on the spatial separation of the physiological data received from each of the plurality of wearable or implantable sensing devices at the respective different location resulting from the common event with an automated processor in a personal mobile electronic device; and
producing an output responsive to the spatial and phase delay differences of the physiological data.

19. A method of denoising physiological signals from a plurality of interconnected devices, comprising:
providing a plurality of spatially separated interconnected devices, each comprising a housing, a power supply, at least one physiological transducer configured to sense a respective physiological condition of a user associated with a common event dependent on a respective spatially-separated different location of the respective physiological transducer with respect to the user, and a communication transceiver configured to:
transmit time-coded physiological data derived from the sensed physiological condition associated with the common event, and
receive time-coded physiological data derived from the sensed physiological condition associated with the common event from another interconnected device;
communicating the physiological data associated with the common event from the plurality of interconnected devices to a personal mobile electronic device, wherein at a portion of the time-coded physiological data associated with the common event is communicated from a first interconnected device through a second interconnected device to the personal mobile electronic device; and denoising the physiological signal by performing a spatial and temporal analysis of the time coded physiological data associated with the common event, from at least two of the interconnected devices according to a predictive statistical model of the user and dependent on the spatially-separated different location of each respective physiological transducer.

\* \* \* \* \*